US012073058B1

(12) United States Patent
Vesterman et al.

(10) Patent No.: US 12,073,058 B1
(45) Date of Patent: Aug. 27, 2024

(54) EMERGENCY MANAGEMENT SYSTEM

(71) Applicant: Raptor Technologies LLC, Houston, TX (US)

(72) Inventors: James J. Vesterman, Houston, TX (US); Peter J. Trate, Fresno, TX (US); Darren Ansley, Houston, TX (US); Christopher Pace, Houston, TX (US)

(73) Assignee: Raptor Technologies LLC, Houston, TX (US)

( * ) Notice: Subject to any disclaimer, the term of this patent is extended or adjusted under 35 U.S.C. 154(b) by 258 days.

(21) Appl. No.: 17/344,889

(22) Filed: Jun. 10, 2021

Related U.S. Application Data

(60) Provisional application No. 63/056,334, filed on Jul. 24, 2020, provisional application No. 63/043,755, filed on Jun. 24, 2020.

(51) Int. Cl.
*G06F 3/0482* (2013.01)
*G06F 3/04845* (2022.01)
*G08B 25/10* (2006.01)

(52) U.S. Cl.
CPC ........ *G06F 3/0482* (2013.01); *G06F 3/04845* (2013.01); *G08B 25/10* (2013.01)

(58) Field of Classification Search
CPC .... G06F 3/0482; G06F 3/04845; G08B 25/10
See application file for complete search history.

(56) References Cited

U.S. PATENT DOCUMENTS

| | | | |
|---|---|---|---|
| 6,600,812 B1 | 7/2003 | Gentillin et al. | |
| 7,468,658 B2 | 12/2008 | Bouressa | |
| 8,120,505 B2 | 2/2012 | Bouressa | |
| 8,185,623 B2* | 5/2012 | Lewis | G16H 40/20 709/224 |
| 8,484,352 B2 | 7/2013 | Piett et al. | |
| 8,516,122 B2 | 8/2013 | Piett et al. | |
| 8,751,265 B2 | 6/2014 | Piett et al. | |
| 8,825,687 B2 | 9/2014 | Marceau et al. | |
| 8,907,763 B2 | 12/2014 | Pineau et al. | |
| 8,941,474 B2 | 1/2015 | Mitchell | |
| 8,984,143 B2 | 3/2015 | Serra et al. | |
| 9,071,643 B2 | 6/2015 | Saito et al. | |

(Continued)

FOREIGN PATENT DOCUMENTS

| | | |
|---|---|---|
| CA | 2697986 A1 | 9/2010 |
| CA | 2737210 A1 | 10/2011 |

(Continued)

*Primary Examiner* — Phenuel S Salomon
(74) *Attorney, Agent, or Firm* — Fish & Richardson P.C.

(57) ABSTRACT

A method includes presenting, on a first computing device associated with a user, a user interface comprising a control for selecting an emergency response policy from a plurality of emergency response policies; receiving, by a server device, a signal indicating an emergency response policy selected by the user from the plurality of emergency response policies, the selected emergency response policy being associated with an institution and defining one or more emergency response protocols; storing, in a database, the selected emergency response policy; receiving, by the server device, a signal indicating a request to initiate an emergency response for the institution; and executing, by the server device, the emergency response based on the selected emergency response policy.

20 Claims, 56 Drawing Sheets

(56) References Cited

U.S. PATENT DOCUMENTS

| | | |
|---|---|---|
| 9,244,922 B2 | 1/2016 | Marceau et al. |
| 9,251,695 B2 | 2/2016 | McNutt et al. |
| 9,277,389 B2 | 3/2016 | Saito et al. |
| 9,286,790 B2 | 3/2016 | Lyman et al. |
| 9,454,890 B2 | 9/2016 | Lyman et al. |
| 9,454,891 B2 | 9/2016 | Lyman et al. |
| 10,176,692 B1 | 1/2019 | Vesterman et al. |
| 10,410,495 B1 | 9/2019 | Vesterman et al. |
| 10,446,005 B1 | 10/2019 | Vesterman et al. |
| 10,991,226 B1 | 4/2021 | Vesterman et al. |
| 2003/0069648 A1* | 4/2003 | Douglas ............ G05B 23/0272 340/568.1 |
| 2006/0118636 A1 | 6/2006 | Miles et al. |
| 2007/0194938 A1 | 8/2007 | Mitchell |
| 2007/0298758 A1* | 12/2007 | Verma ................. G08B 27/006 455/404.1 |
| 2010/0262367 A1 | 10/2010 | Riggins |
| 2010/0281405 A1* | 11/2010 | Whattam ............... G06N 5/025 715/764 |
| 2010/0282839 A1 | 11/2010 | Zura et al. |
| 2011/0188646 A1* | 8/2011 | Taylor .................... H04M 11/00 379/93.01 |
| 2012/0238234 A1 | 9/2012 | Duarte |
| 2012/0257729 A1 | 10/2012 | Piett et al. |
| 2013/0162397 A1 | 6/2013 | Cano et al. |
| 2013/0203039 A1 | 8/2013 | Piett et al. |
| 2014/0080519 A1 | 3/2014 | Ahmed |
| 2014/0365390 A1* | 12/2014 | Braun ................... H04W 4/023 705/325 |
| 2015/0065081 A1 | 3/2015 | Estes et al. |
| 2015/0195676 A1 | 7/2015 | Endress et al. |
| 2015/0199896 A1 | 7/2015 | Estes et al. |
| 2016/0006870 A1* | 1/2016 | Merjanian ............... H04W 4/02 379/45 |
| 2016/0086481 A1 | 3/2016 | McNutt et al. |
| 2016/0119424 A1* | 4/2016 | Kane ..................... G08B 25/08 709/203 |
| 2016/0183073 A1 | 6/2016 | Saito et al. |
| 2017/0278031 A1* | 9/2017 | Hautala ................. G06Q 50/18 |
| 2018/0053401 A1* | 2/2018 | Martin .................. H04M 11/04 |
| 2020/0135005 A1* | 4/2020 | Katz ................... H04M 7/0021 |
| 2020/0296565 A1* | 9/2020 | Glidewell ............. G16H 40/20 |

FOREIGN PATENT DOCUMENTS

| | | |
|---|---|---|
| CA | 2773881 A1 | 10/2012 |
| WO | WO2015034904 A1 | 3/2015 |

* cited by examiner

EMERGENCY MANAGEMENT SYSTEM

CROSS-REFERENCE TO RELATED APPLICATIONS

The present application claims priority to U.S. Provisional Patent Application Ser. No. 63/043,755, titled "Emergency Management System," which was filed on Jun. 24, 2020, and U.S. Provisional Patent Application Ser. No. 63/056,334, titled "Emergency Management System," which was filed on Jul. 24, 2020, the entirety of which are hereby incorporated by reference into the present application.

TECHNICAL FIELD

The present disclosure relates to facilitating the configuration of an emergency response application and the initiation of an emergency response using an emergency response application.

BACKGROUND

Recent decades have seen an unfortunate increase in emergency incidents at schools or other institutions. As a result, many institutions have adopted or implemented emergency response policies that enable to institution to effectively respond to an emergency. However, current systems used to initiate and manage an emergency response are not specific to the particular emergency response policies adopted by the particular institution. As a result, current systems often fail to effectively manage emergency responses in accordance with an institution's particular policy.

SUMMARY

The present disclosure describes apparatus, systems, and methods for configuring an emergency response system and initiating an emergency response using the emergency response system. In some implementations, an application is provided to select and customize an emergency response policy for the emergency response system and one or more emergencies can be initiated through an application according to the configured policy.

In some implementations, actions include presenting, on a first computing device associated with a user, a user interface comprising a control for selecting an emergency response policy from a plurality of emergency response policies; receiving, by a server device, a signal indicating an emergency response policy selected by the user from the plurality of emergency response policies, the selected emergency response policy being associated with an institution and defining one or more emergency response protocols; storing, in a database, the selected emergency response policy; receiving, by the server device, a signal indicating a request to initiate an emergency response for the institution; and executing, by the server device, the emergency response based on the selected emergency response policy.

Implementations of the present disclosure provide various technical advantages and/or improvements compared to traditional systems. For example, implementations can enable execution of an emergency response policy selected by a particular institution. In addition, implementations may allow for configuration of an emergency response policy that can be executed by an emergency response application on (e.g., portable) computing devices. By allowing an institution to select and/or customize the emergency response policy that is executed by an emergency response application, the emergency response initiated using the application can more closely align with the institution's emergency response practices and requirements. Implementations may also allow for storage and execution of one or more custom emergency drills using the emergency response application. In addition, implementations may allow a user to practice initiating an emergency response using the emergency response application using a practice mode of the emergency response application.

Implementations may also provide a user interface comprising a set of emergency response specific user selectable buttons. Each button may be linked to the execution of specific software code and rulesets that enable the immediate or near immediate execution of a particular set of emergency response protocols defined by a particular emergency response policy. It is well established that a person's motor and cognitive skills decline and this is especially true under the circumstances of a natural or criminal emergency. In some implementations, the user interface and underlying technology provide a rapid means for personnel to accurately initiate complex pre-planned emergency protocols while under stress.

It will also be appreciated that various aspects of the disclosure can include any one or more features described herein, and that advantageous examples are envisioned which combine various combinations of features and functions optimal for a given application.

The details of one or more embodiments are set forth in the accompanying drawings and the description below. Other features, objects, and advantages will be apparent from the description and drawings, and from the claims.

DETAILED DESCRIPTION

The present disclosure describes apparatus, systems, and methods for configuring an emergency response system and initiating an emergency response using the emergency response system. In some implementations, a user interface is provided to select and customize an emergency response policy for the emergency response system and one or more emergencies can be initiated through an application of the emergency response system according to the configured policy.

As used herein, an emergency may describe a human caused emergency, such as the occurrence or threat of a shooting, bombing, or other violence. An emergency may also be a naturally caused emergency, such as an earthquake, tsunami, volcanic activity, disease outbreak, or inclement weather event. Implementations may also be employed in response to other types of emergencies, emergency drills, or in other situations, without limitation.

As used herein, a student may describe any individual who is assisted during an emergency. Although examples herein may describe the use of implementations in a response to an emergency at a school, it will be understood that implementations may also be employed in other settings including but not limited to hospitals, elder care facilities, indigent care facilities, shelters, group homes, offices, residences, hotels, resort facilities, airports, train stations, planes, trains, ships, and so forth. Accordingly, a student may describe a patient, resident, or occupant of such settings who may need assistance during an emergency. A student may also include a non-human entity such as an animal. For example, implementations may be employed to keep track of animals at a zoo, wildlife preserve, farm, ranch, or other facility undergoing an emergency.

As used herein, a screen may describe a user interface or a portion of a user interface, such as one or more windows, frames, or other collection of presented elements.

As used herein, a gesture may describe any input made by a user to a user interface or to a portion of a user interface. A gesture may include inputs made to a touch-sensing display or other component of a device using a finger or other body part. A gesture may include a tap, tap-and-hold, swipe, pinch, or any combination of these or other inputs. A gesture may also include inputs made using an input actuator such as a pen or rod. A gesture may also include inputs made to a user interface using an input device including, but not limited to, a mouse, a keyboard, a joystick, a touchpad, and so forth. Gestures may also include audio inputs such as voice commands, or haptic inputs such as a shaking or other movement of all or part of a computing device.

Figure 1:
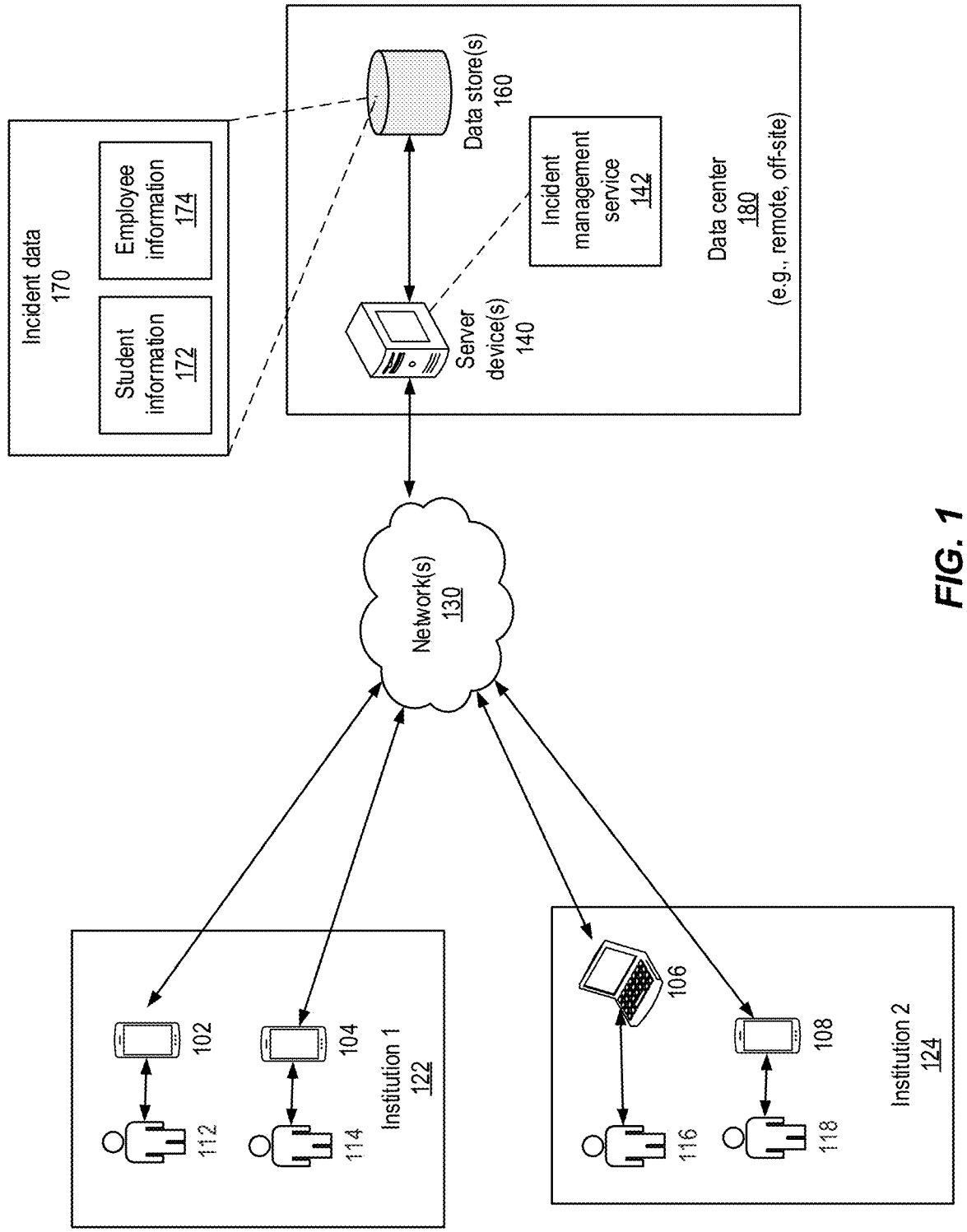
FIG. 1 depicts an example environment in which implementations of the present disclosure may be employed.

FIG. 1 depicts an example system 100 of multiple computing devices in accordance with implementations of the present disclosure. As shown in the example of FIG. 1, the system 100 may include several computing devices 102, 104, 106, 108 each corresponding to a respective user 112, 114, 116, 118 of the system 100. In addition, each user 112, 114, 116, 118 may be associated with a particular institution, such as institution 122 or institution 124. For example, institution 122 can be a school at which user 112 and user 114 are employed. Similarly, institution 124 can be another school at which user 116 and user 118 are employed.

The various computing devices 102, 104, 106, and 108 may communicate via one or more networks 130. The network(s) 130 may include public networks such as the internet, private networks such as an institutional or personal intranet, or any combination of private and public networks. The network(s) 130 may include any type of wired or wireless network, including but not limited to local area networks (LANs), wide area networks (WANs), wireless WANs (WWANs), or wireless LANs (WLANs). The network(s) 130 may also include mobile communications networks including, but not limited to, a 3G network, a 4G network, an Edge network, a Long Term Evolution (LTE) network, and so forth. In some implementations, the communications between computing devices 102, 104, 106, 108 over the network(s) 130 may be encrypted or otherwise secured. For example, communications may employ one or more public or private cryptographic keys, ciphers, digital certificates, or other credentials supported by a security protocol, such as any version of the Secure Sockets Layer (SSL) or the Transport Layer Security (TLS) protocol. In some cases, the network(s) 130 may include a WLAN that provides network accessibility in or near the incident area in which the emergency response is taking place. Such a WLAN may have been set up specifically to handle communications during the emergency response.

The computing devices 102, 104, 106, and 108 may employ the network(s) 130 to communicate with a data center 180 that includes one or more server devices 140 and one or more data stores 160. In some cases, the data center 180 may be remote or off-site with respect to the incident area. The server device(s) 140 may include any number and any type of computing devices, such as server computers, network computers, mainframe computers, distributed computing devices (e.g., cloud servers), and so forth. The server device(s) 140 may execute any number of software modules (not shown), such as processes, applications, libraries, interfaces, and so forth, to provide an incident management service 142. The data store(s) 160 may include any number and any type of data storage devices, storage nodes, databases, and so forth. The data store(s) 160 may be component(s) of the server device(s) 140, or may be external to the server device(s) 140. The data store(s) 160 may employ any type of data storage format, and may include relational databases or non-relational data stores. In some cases, at least a portion of the data stored in the data store(s) 160 may be received from other management services, such as a visitor management service that tracks the identify, location, status, or other information regarding visitors (e.g., guardians, vendors, contractors, emergency responders, media, volunteers, etc.) currently present at an institution 122, 124. The data store(s) 160 may store incident data 170 including, but not limited to, one or more of student information 172 and employee information 174. For example, the incident data 170 can include student information 172 related to students that attend institutions 122 and 124. Student information 172 may include any number of student records, each storing information regarding a student. A student record may include one or more of the following: the student's identification number, the student's name, a description of the student's appearance, an image of the student, the student's age, the student's grade, the student's teacher, the authorized guardian(s) of the student, or other information. The student record may also include information that may be updated during an emergency response situation, such as the current status of the student (e.g., injured, healthy, reunified, not reunified, missing, accounted for, and so forth), the current location of the student, the current status of the student, and so forth.

The employee information 174 may include any number of employee records, each storing information regarding an employee of an institution 122, 124. An employee record may include one or more of the following: the employee's identification number (e.g., driver's license number, social security number, and so forth), the employee's name, a description of the employee's appearance, the age of the employee, an image of the employee, the student(s) associated with the employee (e.g., if the employee is a teacher or instructor), the job position or role of the employee, or other information. The employee record may also include information that may be updated during an emergency response situation, such as the current location of the employee (e.g., classroom, front office, cafeteria, etc.).

The various computing devices 102, 104, 106, and 108 may communicate, over the network(s) 130, with the incident management service 142 running on the server device(s) 140. The computing devices 102, 104, 106, and 108 may provide data to be employed by the server device(s) 140 to update the incident data 170. The computing devices 102, 104, 106, and 108 can also receive, process, and present data that the server device(s) 140 have retrieved from the data store(s) 160.

Figure 2:
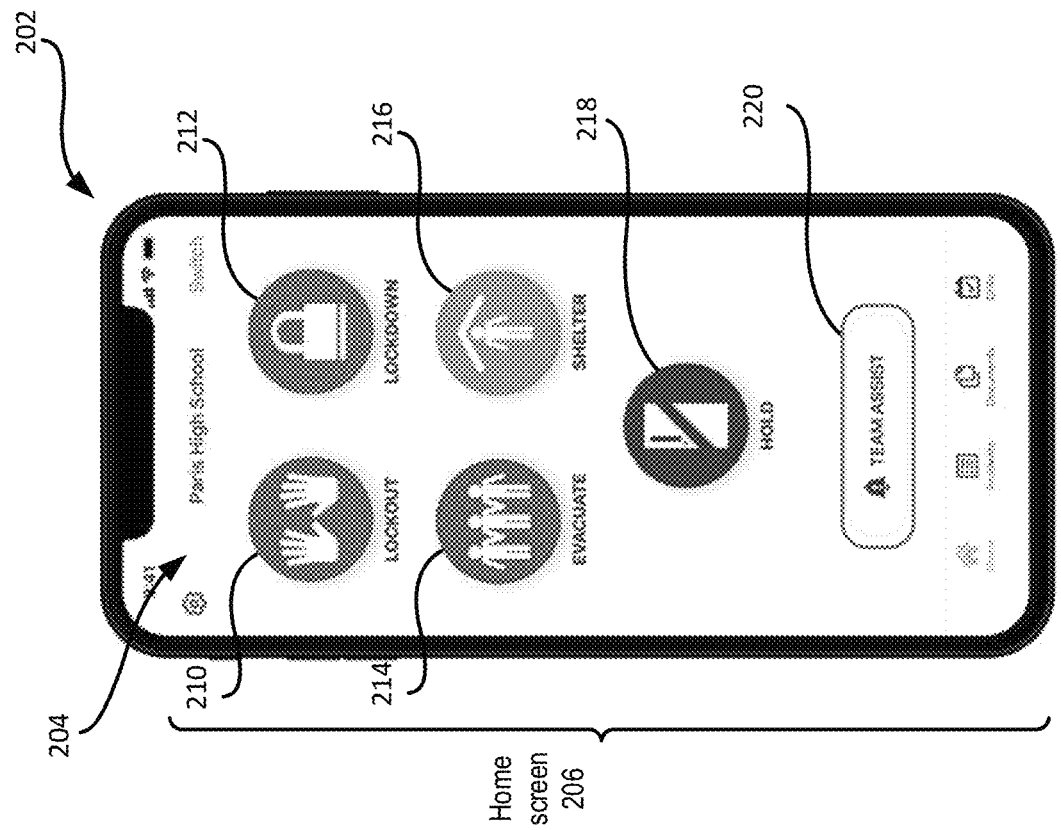
FIG. 2 depicts an example computing device executing an emergency response application in accordance with implementations of the present disclosure.

FIG. 2 depicts an example computing device 202 executing an application 204 in accordance with implementations of the present disclosure. In the example of FIG. 2, a user (e.g., user 112) has launched the application 204 on a computing device 202 and the computing device 202 is displaying a home screen 206 of the application 204.

As can be seen in FIG. 2, the home screen 206 of the application 204 includes one or more buttons 210, 212, 214, 216, 218 for initiating an emergency response corresponding to the respective button 210, 212, 214, 216, 218. For example, the application 204 includes a first button 210 for initiating a lockout emergency response, a second button 212 for initiating a lockdown emergency response, a third button 214 for initiating an evacuate emergency response, a fourth button 216 for initiating a shelter emergency response, and a fifth button 218 for initiating a hold emergency response. As will be described in further detail herein, each of the buttons 210, 212, 214, 216, 218 can correspond to a particular emergency response defined by a particular emergency response policy, and gestures to select one of the buttons 210, 212, 214, 216, 218 results in initiation of the respective emergency response according to the emergency response policy.

As depicted in FIG. 2, the home screen 206 of the application 204 can also include a button 220 for initiating a team assist feature of the application 204. As will be described in further detail herein, the team assist feature of the application 204 can be used to initiate a response to address a localized event, such as a fight between students or a medical event.

As previously discussed, emergency responses that can be initiated from the home screen 206 of the application 204 can be configured to correspond to a particular emergency response policy of an institution. A process for customizing an application 204 to correspond to a particular emergency response policy will now be described with reference to FIGS. 3-21.

Figure 3:
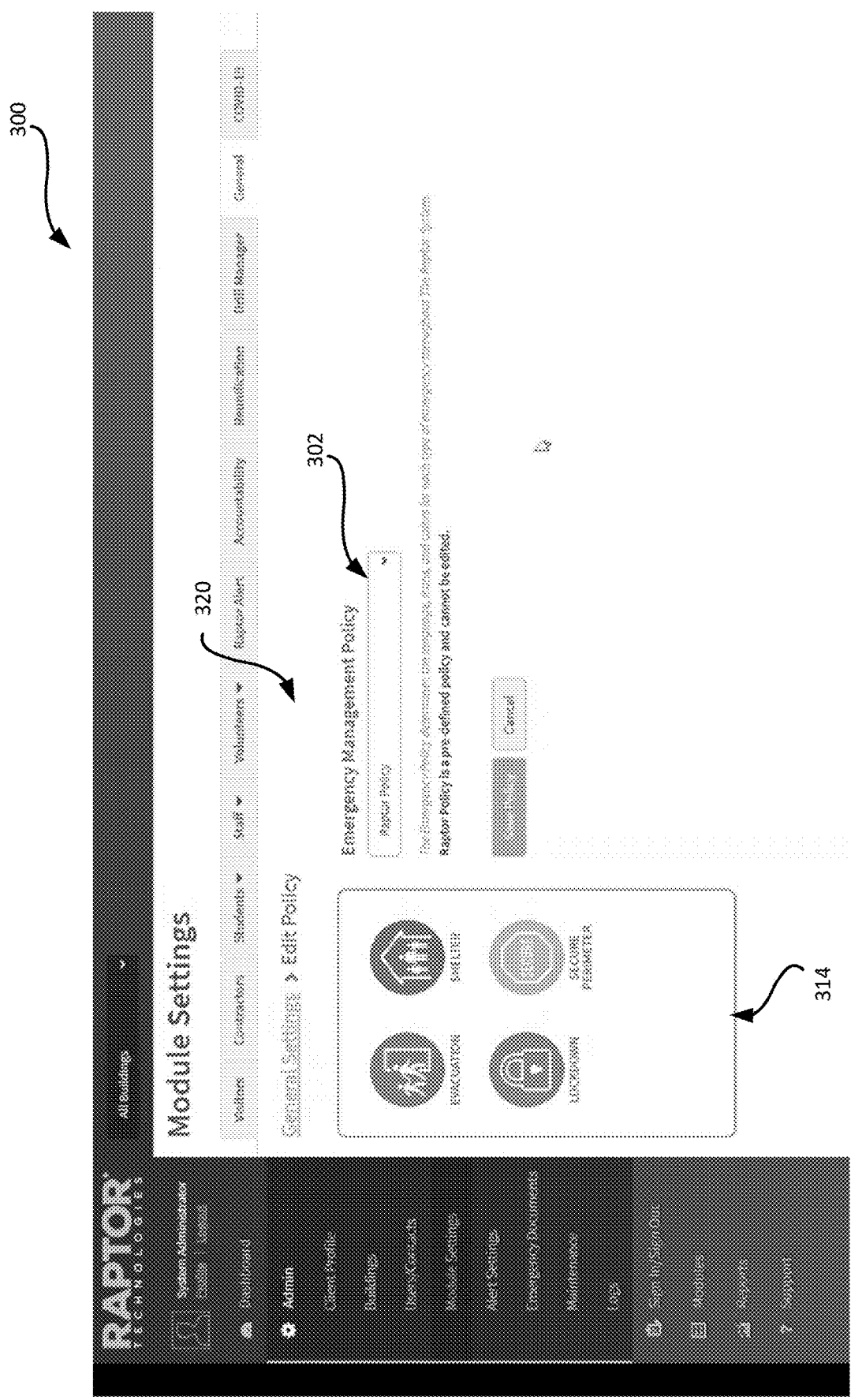
FIGS. 3-20 depict an example process for configuring an emergency response application for a particular institution in accordance with implementations of the present disclosure.

FIG. 3 depicts a user interface 300 for customizing the emergency response application 204. The user interface 300 includes a policy editing page 320 with a policy selection menu 302. In some implementations, as depicted in FIG. 4, the policy selection menu 302 includes a dropdown button that allows a user to select a particular policy to be implemented by the application 204.

Figure 4:
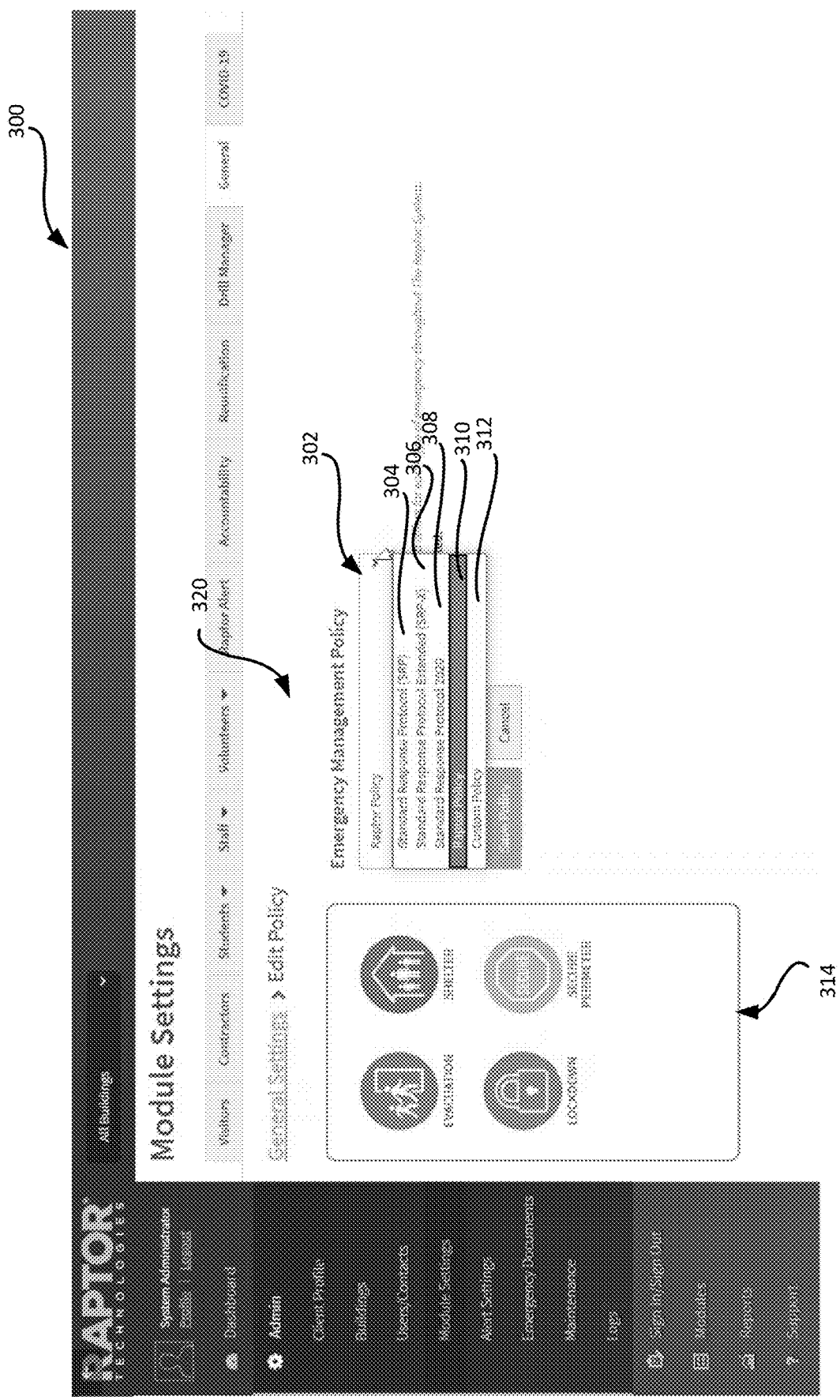

As depicted in FIG. 4, the policy selection menu 302 can provide the user with one or more options of emergency response policies that may be executed using the application 204. In some implementations, the policy selection menu 302 includes one or more predefined emergency response policies 304, 306, 308, 310 from which a user may select as the emergency response policy for the configuration of the application 204 for a particular institution. For example, as depicted in FIG. 4, the policy selection menu 302 includes four predefined emergency response policies: a Standard Response Protocol (SRP) policy 304, a Standard Response Protocol Extended (SRPX) policy 306, a Standard Response Protocol 2020 policy 308, and a Raptor policy 310. In some implementations, the policy selection menu 302 includes one or more predefined policies that correspond to the I LOVE YOU GUYS standard response protocol.

Each of the predefined emergency response policies 304, 306, 308, 310 listed in the menu 302 is associated with one or more predefined emergency types and a corresponding response protocol for each of the emergency types defined by the policy. As will be discussed in further detail herein, the application 204 provide buttons (e.g., buttons 210, 212, 214, 216, 218 of FIG. 2) for initiating each of the emergency response protocols defined by a corresponding emergency response policy.

In some implementations, the user interface 300 includes a preview module 314 that depicts a preview of the home screen 206 of the application 204 based on the currently selected emergency response policy. For example, as depicted in FIG. 3, the Raptor policy 310 is selected in the menu 302 as the emergency response policy, and, as a result, the preview module 314 depicts a preview of a home screen 206 of the application 204 configured to implement the Raptor policy 310. If a different predefined emergency response policy is selected from the policy selection menu 302, the preview module 314 is updated to depict the home screen 206 for the application 204 corresponding to the currently selected policy 304, 306, 308, 310.

Figure 5:
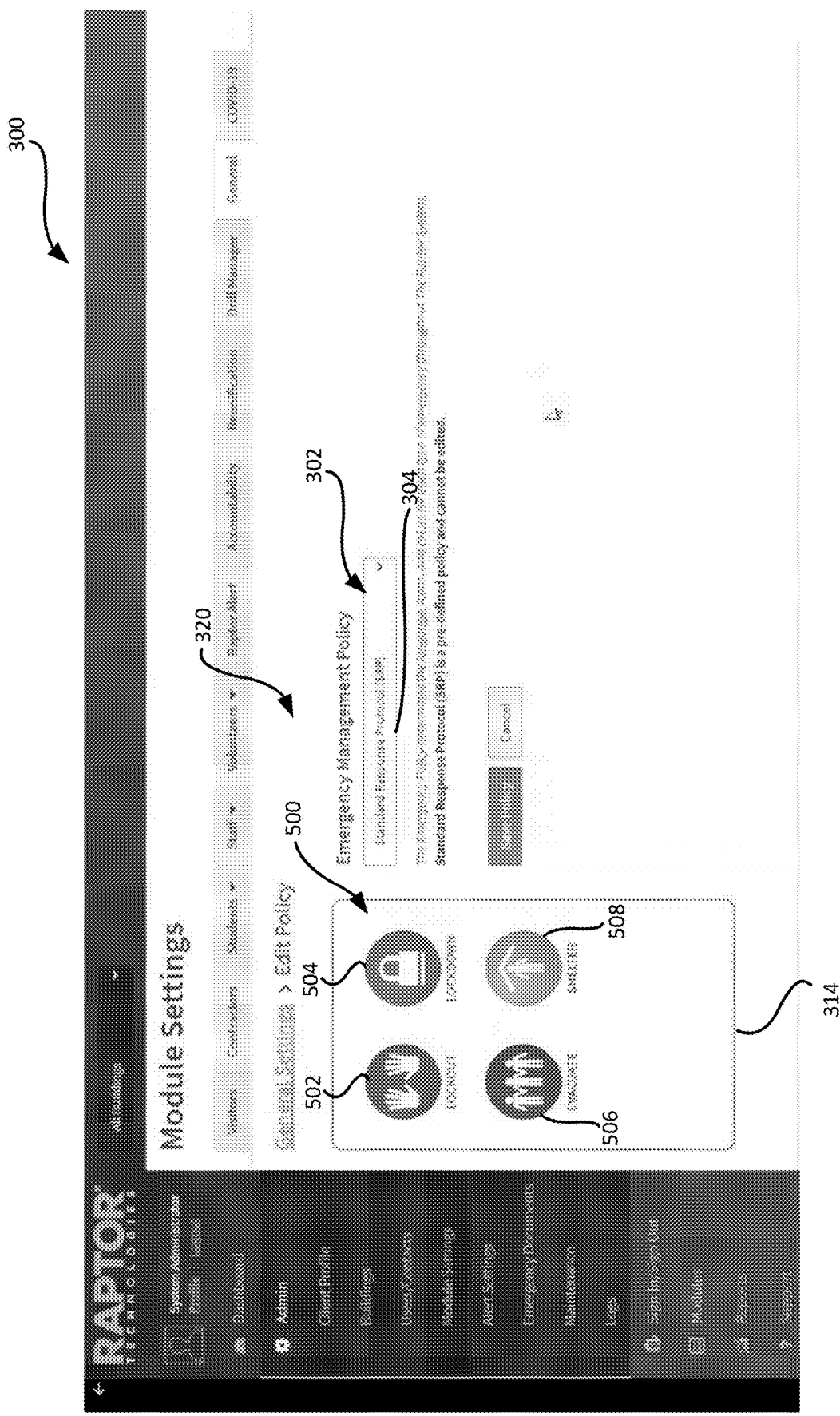

For example, as depicted in FIG. 5, if a user selects the Standard Response Protocol policy 304 from the policy selection menu 302, the preview module 314 is updated to display a preview 500 of home screen 206 of the application 204 when the application 204 is configured to implement the Standard Response Protocol policy 304. For instance, the Standard Response Protocol policy 304 can include a lockout emergency response, a lockdown emergency response, an evacuate emergency response, and a shelter emergency response. In order to implement each of these emergency responses defined by the Standard Response Protocol policy 304, the application 204 is configured to include a lockout emergency response button 502, a lockdown emergency response button 504, an evacuate emergency response button 506, and a shelter emergency response button 508, as depicted in the preview module 314 of FIG. 5. As will be described in further detail herein, selection of a particular emergency response using the respective button 502, 504, 506, 508 will initiate the respective emergency response according to respective response protocol defined by the Standard Response Protocol policy 304 policy.

Figure 6:
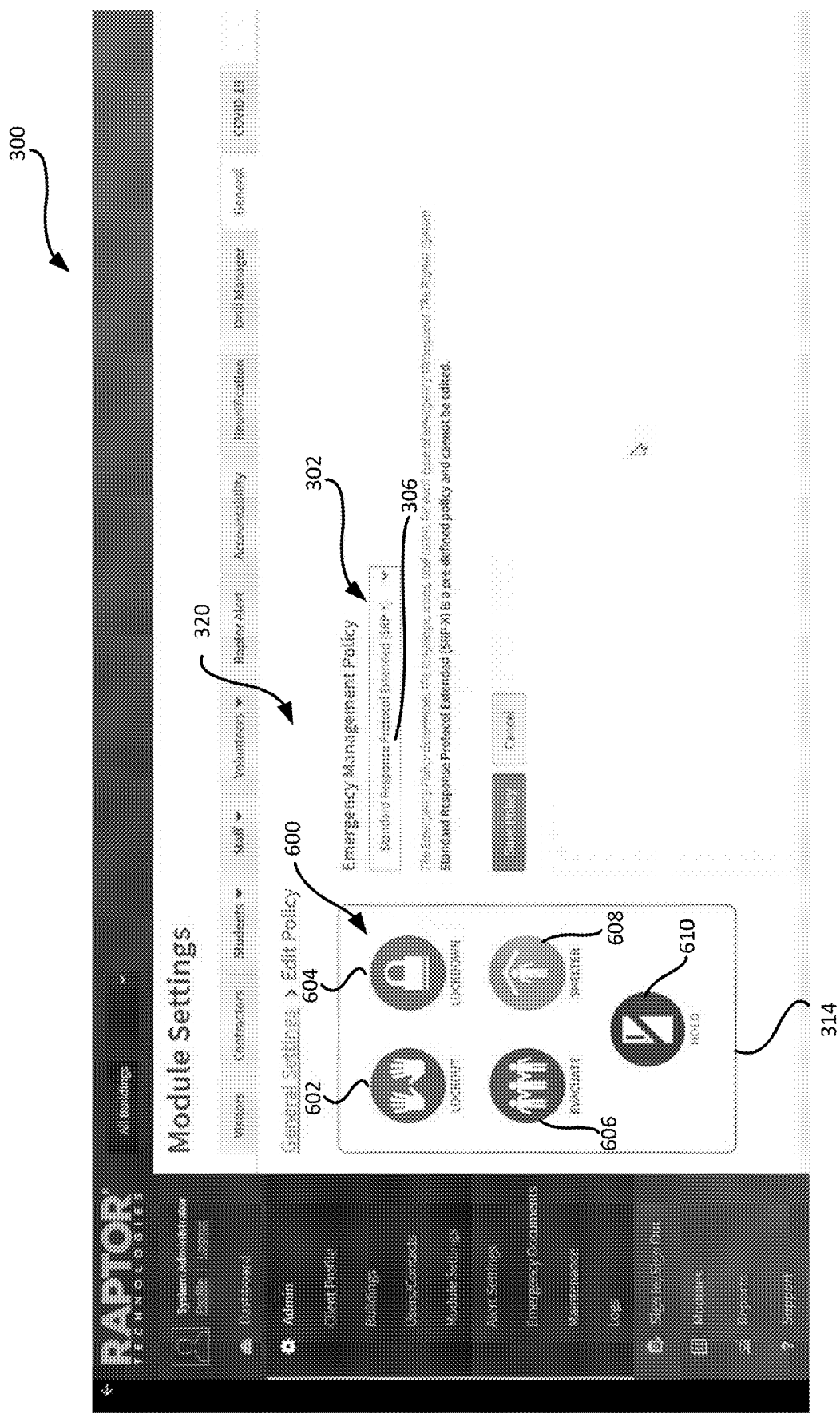

As another example, in FIG. 6, a user has selected the Standard Response Extended Protocol policy 306 and the preview module 314 of FIG. 6 is displaying a preview 600 home screen 206 of the application 204 when the application 204 is configured to implement the Standard Response Extended Protocol policy 306. For instance, the Standard Response Extended Protocol policy 306 can include a lockout emergency response, a lockdown emergency response, an evacuate emergency response, a shelter emergency response, and a hold response. In order to implement each of these emergency responses of the Standard Response Extended Protocol policy 306, the application 204 includes a lockout emergency response button 602, a lockdown emergency response button 604, an evacuate emergency response button 606, a shelter emergency response button 608, and a hold emergency response button 610, as depicted in the preview module 314 of FIG. 6.

Figure 7:
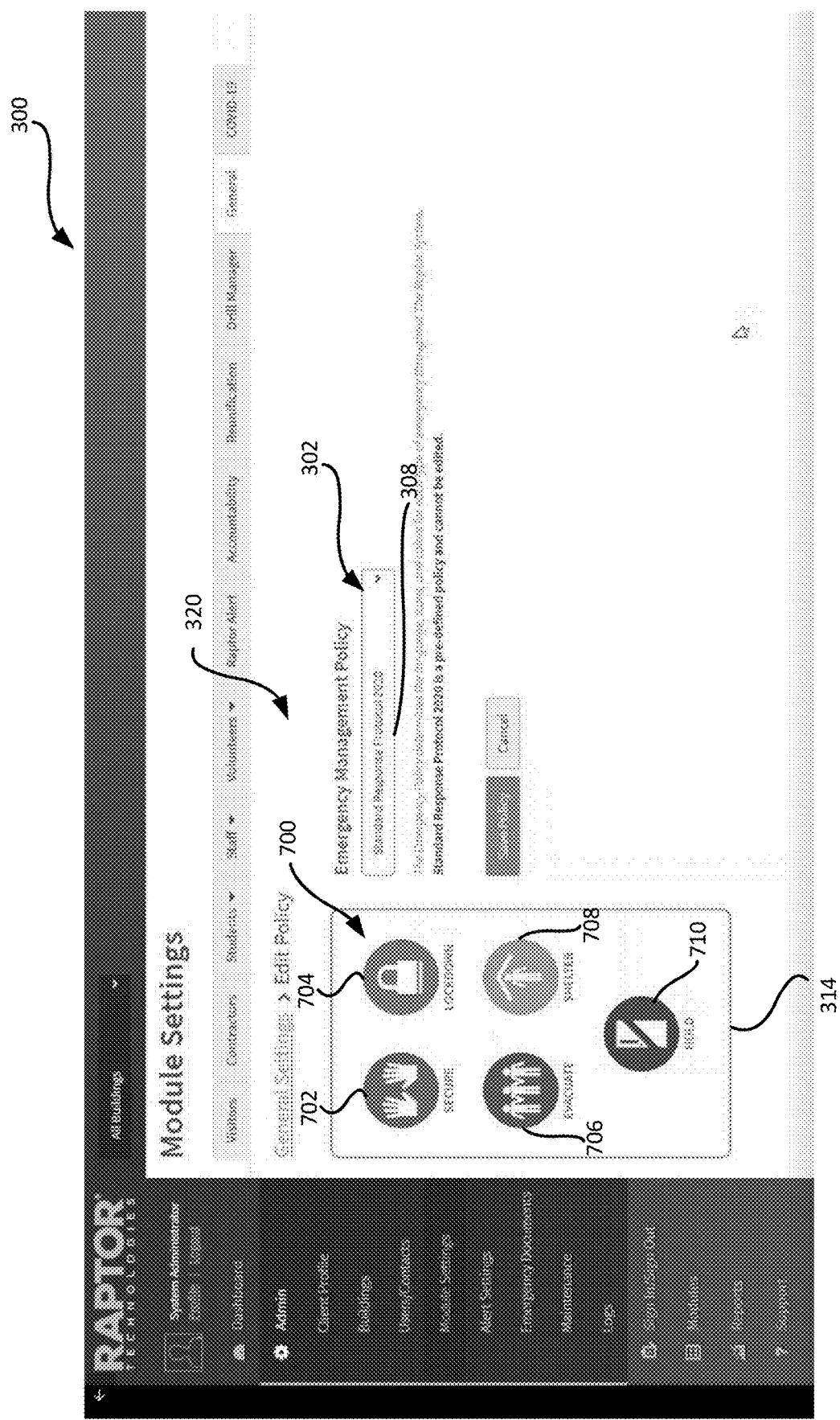

In FIG. 7, the Standard Response Protocol 2020 policy 308 has been selected and the preview module 314 of FIG. 7 is displaying a preview 700 of a home screen 206 of the application 204 when the application is configured to implement the Standard Response Protocol 2020 policy 308. For instance, the Standard Response Protocol 2020 policy 308 can include a secure emergency response, a lockdown emergency response, an evacuate emergency response, a shelter emergency response, and a hold response. In order to implement each of these emergency responses of the Standard Response Protocol 2020 policy 308, the application 204 includes a secure emergency response button 702, a lockdown emergency response button 704, an evacuate emergency response button 706, a shelter emergency response button 708, and a hold emergency response button 710, as depicted in the preview module 314 of FIG. 7.

Figure 8:
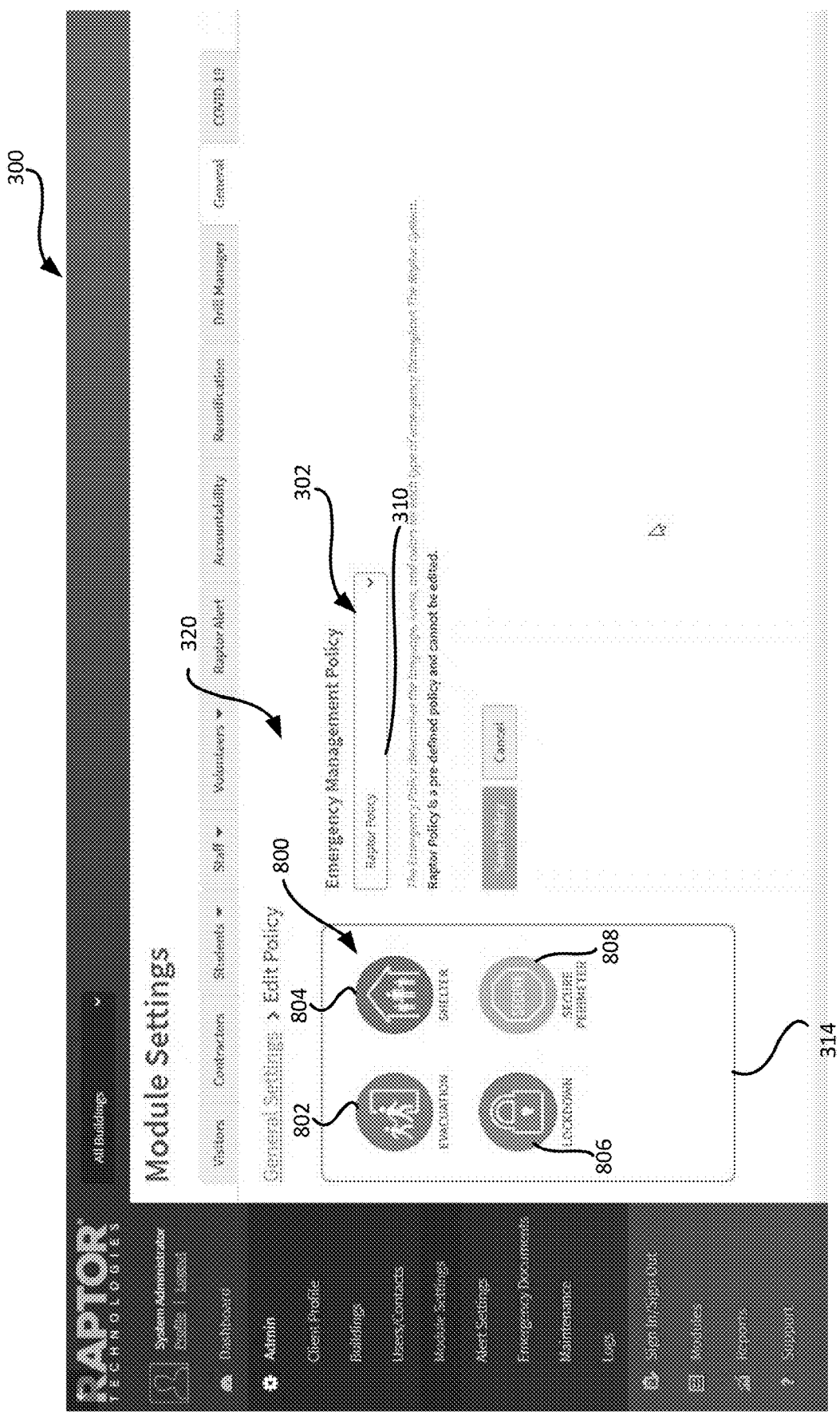

In FIG. 8, the Raptor policy 310 has been selected and the preview module 314 of FIG. 8 is displaying a preview 800 of a home screen 206 of the application 204 when the application 204 is configured to implement the Raptor policy 310. For instance, the Raptor policy 310 can include an evacuation emergency response, a shelter emergency response, a lockdown emergency response, and a secure perimeter response. In order to implement each of these emergency responses of the Raptor policy 310, the application 204 includes an evacuation emergency response button 802, a shelter emergency response button 804, a lockdown emergency response button 806, and a secure perimeter emergency response button 808, as depicted in the preview module 314 of FIG. 8.

In addition to using the user interface 300 to select a predefined emergency response policy 304, 306, 308, 310 and preview a home screen 206 corresponding to the selected predefined policy 304, 306, 308, 310, the user interface 300 can be used to generate a custom emergency response policy to be implemented by the application 204. For example, as depicted in FIG. 4, the policy selection menu 302 includes a Custom Policy option 312.

Figure 9:
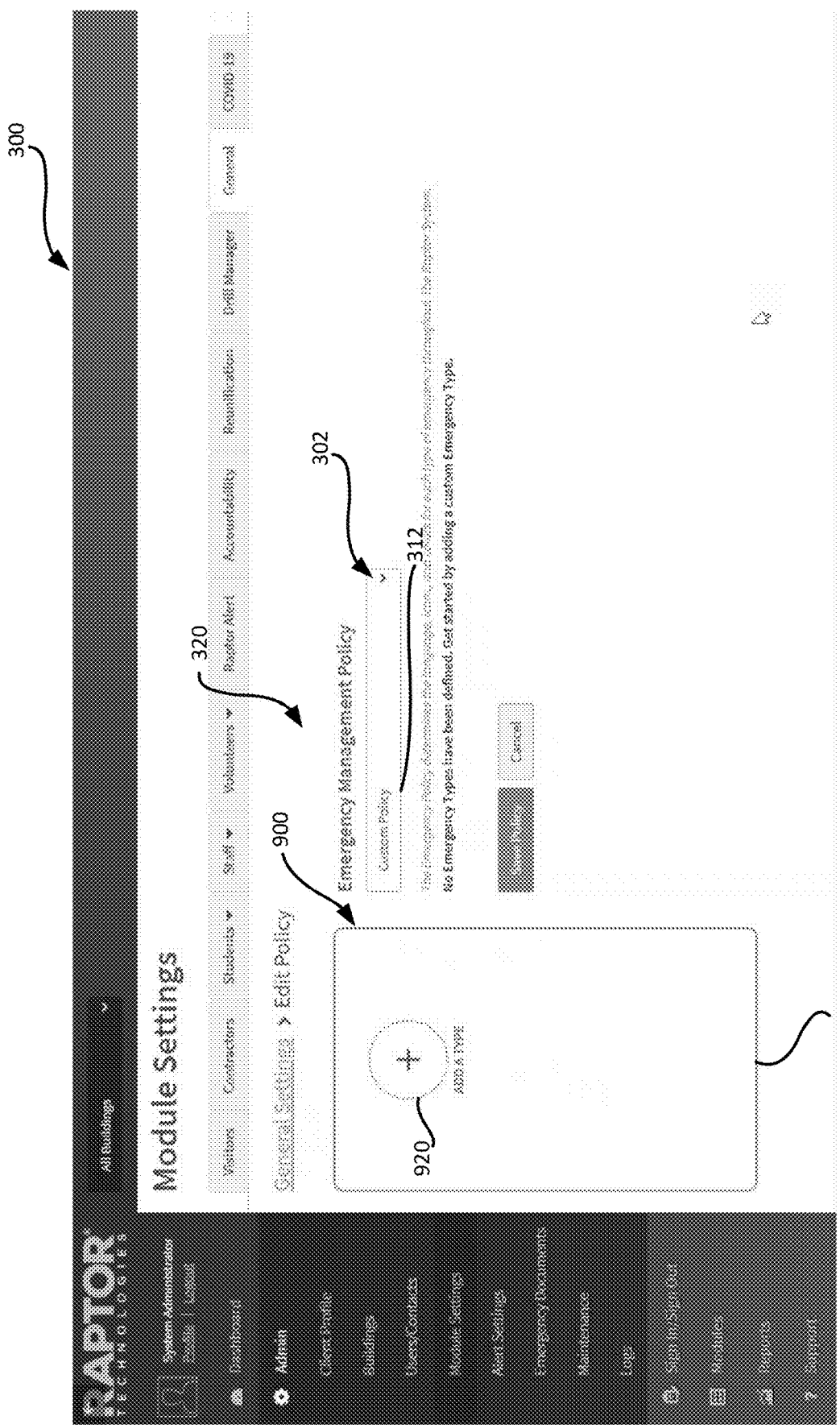
Figure 10:
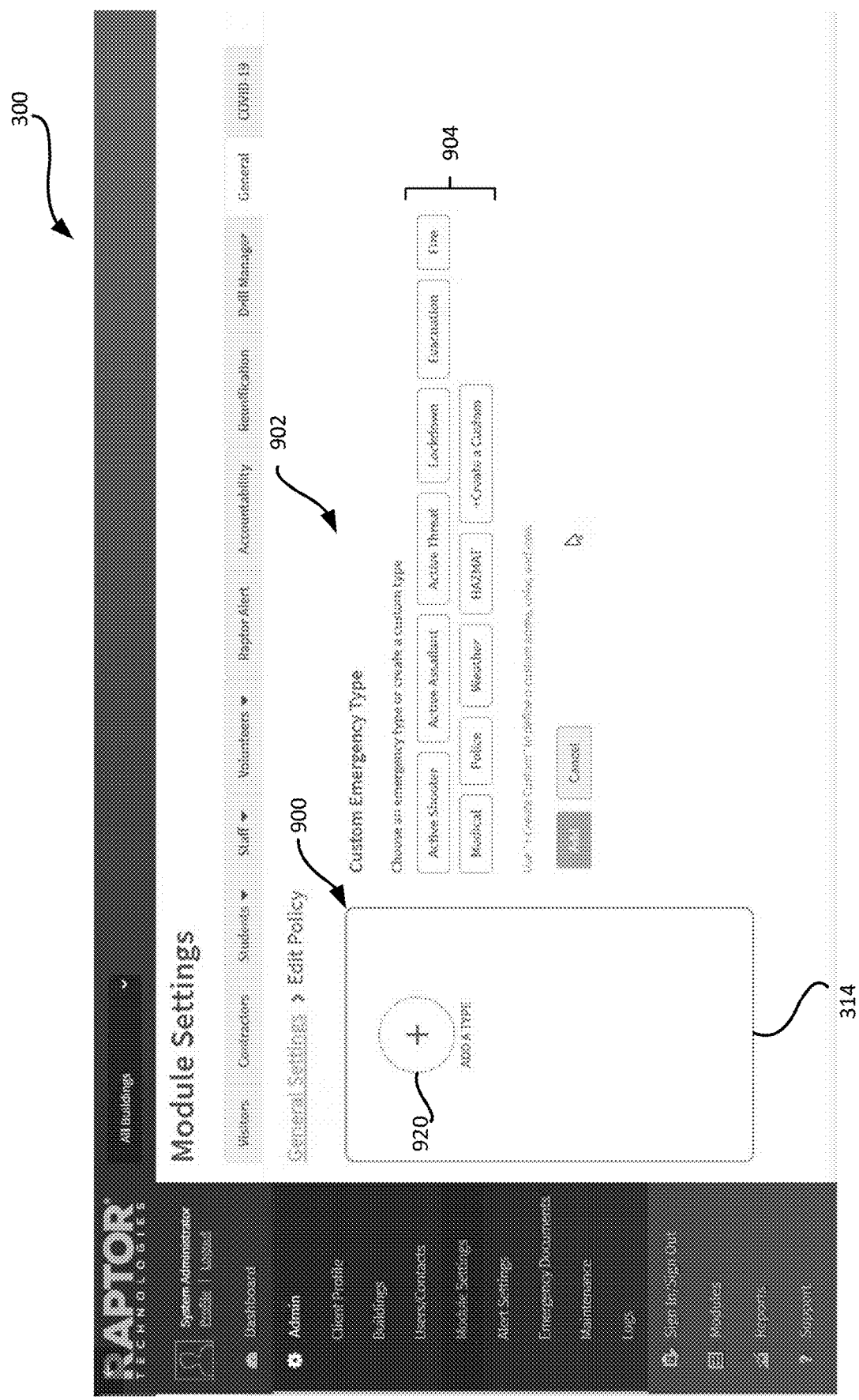

Referring to FIG. 9, in response to a user's selection of a custom policy 312 from the policy selection menu 302, the preview module 314 is updated to display a preview 900 of a home screen depicting a blank home screen with an "Add a Type" button 920. The "Add a Type" button 920 can be used to add a particular emergency response type to the custom policy 312 and add a corresponding button to the home screen 206 of the application 204. For example, as depicted in FIG. 10, in response to a user's selection of the "Add a Type" button 920, the user interface 300 displays an emergency type selection page 902 displaying several predefined emergency response types 904 that can be added to the custom policy 312. For example, as depicted in FIG. 10, the emergency type selection page 902 lists Active Shooter, Active Assailant, Active Threat, Lockdown, Evacuation, Fire, Medical, Police, Weather, and HAZMAT as possible predefined types of emergency responses 904 that can be added to the custom policy 312.

Figure 11:
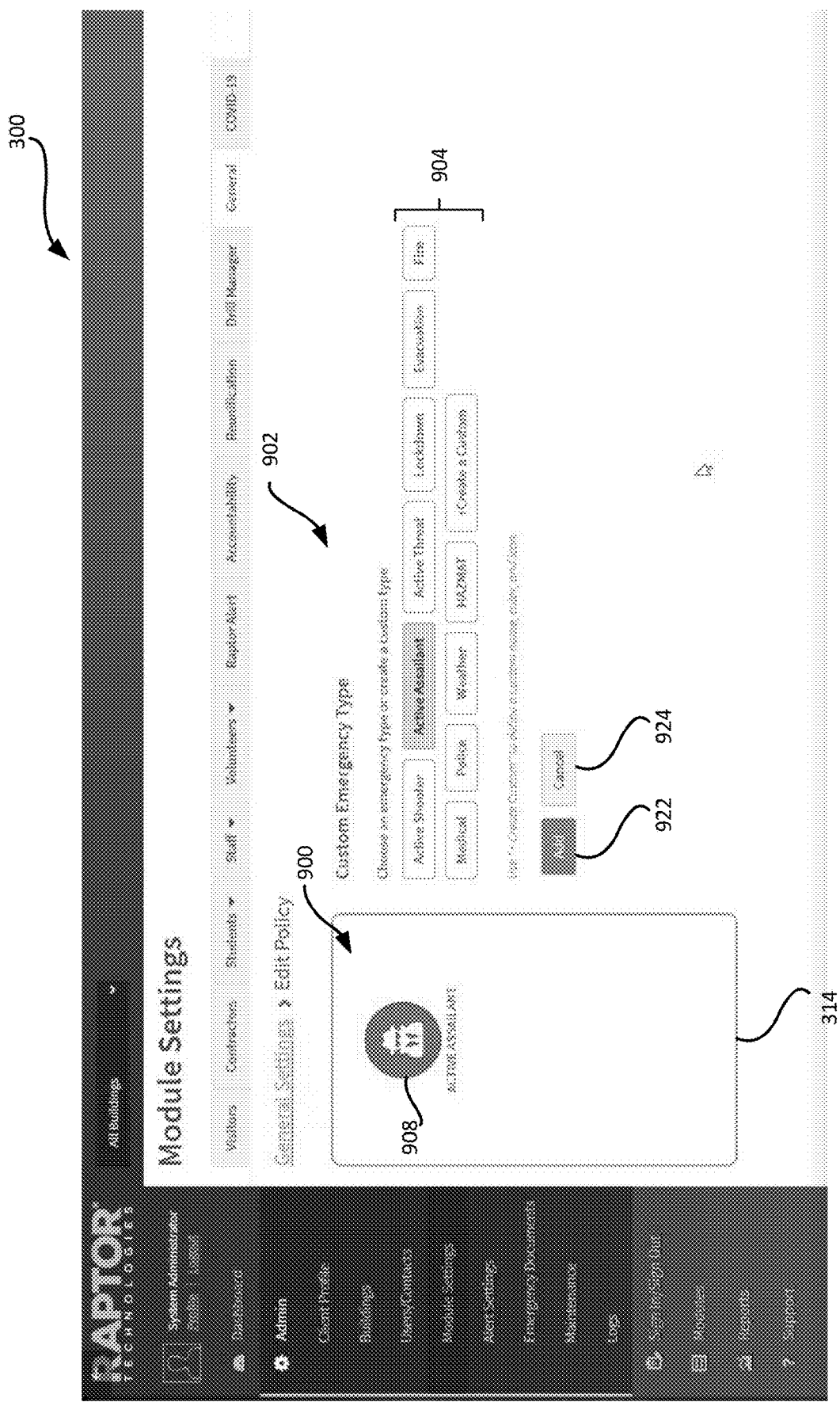

In response to a user's selection of one of the predefined emergency response types 904 listed in the emergency type selection page 902, a button corresponding to the selected emergency response type 904 is added to the home screen depicted in the preview module 314. For example, referring to FIGS. 11 and 12, in response to a user's selection of the Active Shooter emergency response, an emergency response button 908 corresponding to an active assailant emergency type is added to the custom policy 312 for the application 204 and a preview 900 of the home page of the application 204 is updated to display a button 908 for initiating an emergency response corresponding to an active assailant type emergency. In some implementations, as depicted in FIG. 11, the user interface 300 includes an "Add" button 922 to confirm the user's selection of emergency response type 904 and add the selected emergency response type 904 to the custom policy 312. In some implementations, the user interface 300 includes a "Cancel" button 924 to prevent a selection of a particular emergency response type 904 from being added to the custom policy 312.

Figure 12:
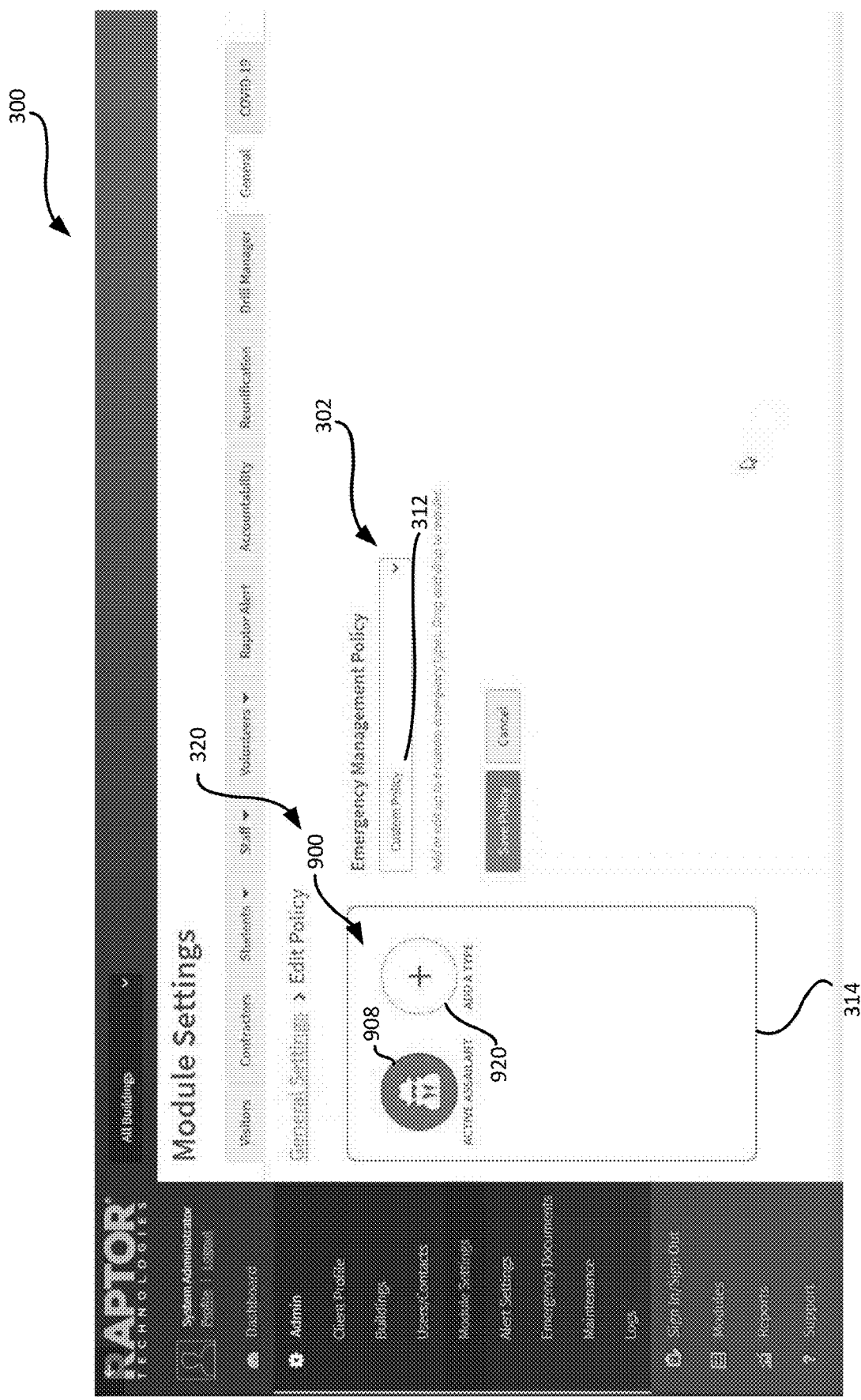

Referring to FIG. 12, once an emergency response type 904 has been added to the custom policy 312, the user interface 300 returns to the policy editing page 320 displaying a preview 916 of the home screen of the application 204 with a button 908 for the added emergency response type (e.g., Active Assailant type) and the "Add a Type" button 920. If desired, a user can select the "Add a Type" button 920 to add an additional emergency response type to the custom policy 312. For example, in response to selecting the "Add a Type" button 920, the user will be returned to the emergency type selection page 902 to select an additional emergency response type 904 to be added to custom policy 312.

In some implementations, a custom policy 312 can include up to a threshold number of emergency response types 904. For example, in some implementations, once a threshold number of emergency response types 904 have been added to the custom policy 312, the "Add a Type" button 920 is removed from the preview 916 of the home screen 906 and no additional emergency response types 904 can be added to the custom policy 312 for the application 204. In some implementations, a custom policy 312 can include up to a six emergency response types 904.

Figure 13:
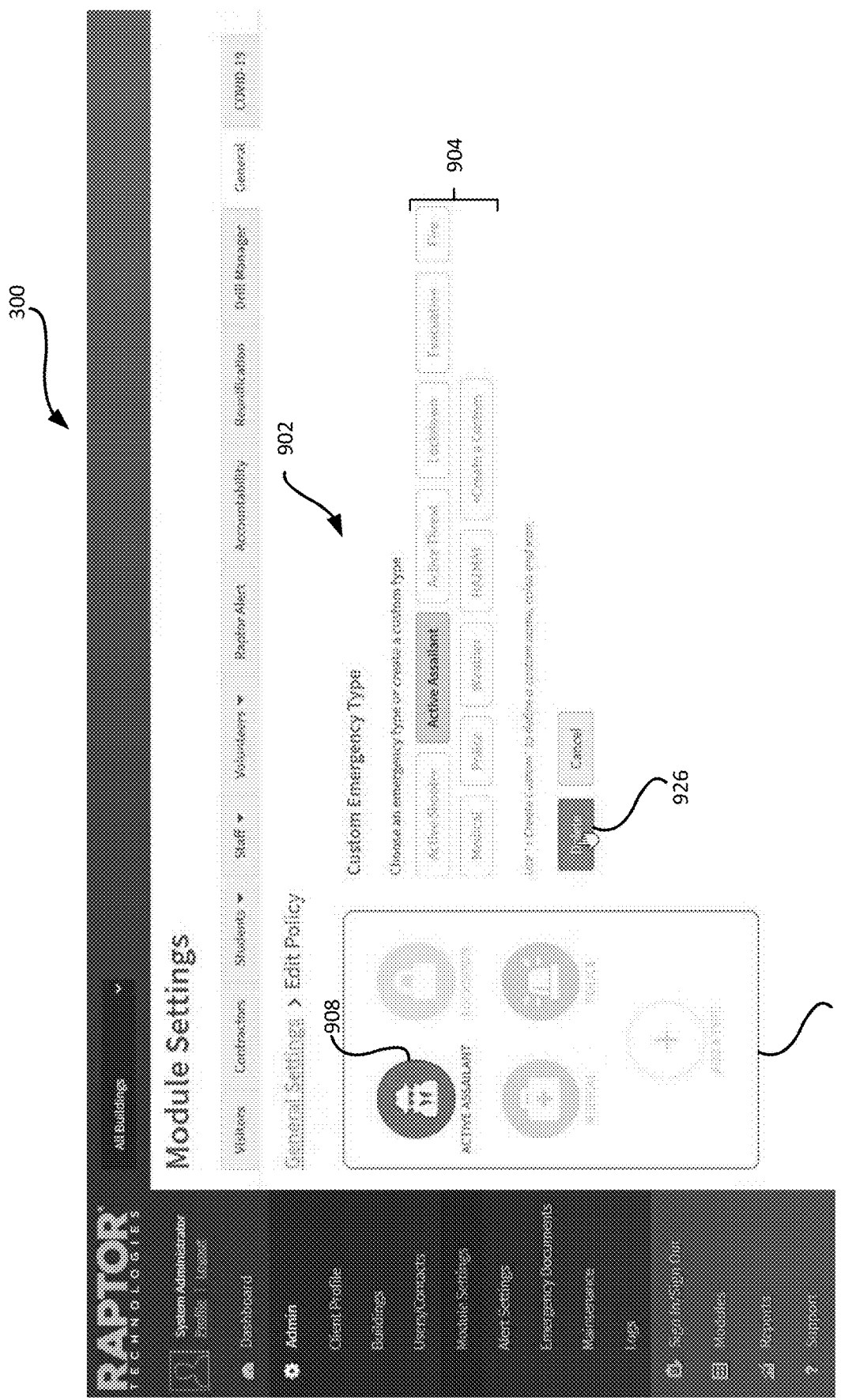

Referring to FIG. 13, in some implementations, the emergency type selection page 902 includes a "Delete" button 926 to remove an emergency type from the custom policy 312. For example, as depicted in FIG. 13, an Active Assailant emergency response type 904 has been added to the custom policy 312. As such, if the Active Assailant emergency response type 908 is selected again on the emergency type selection page 902, a "Delete" button 926 is provided on the emergency type selection page 902 to remove the Active Assailant emergency response type 908 from the custom policy 312. Removing an emergency response type 904 from the custom policy 312 using the "Delete" button 926 causes the corresponding button 908 to be removed from the preview 916 of the home screen 906 of the application 204.

In some implementations, a user is restricted from removing one or more emergency response types 904 after they have already been added to the custom policy 312 if certain conditions apply. For example, in some implementations, if an ongoing emergency response has been initiated using one or the emergency response types 904 selected for the custom policy 312, a user will be prevented from removing the respective emergency response type 904 until after the ongoing emergency response has been completed. As will be discussed in further detail herein, the emergency management policy 213 can be utilized to manage emergency response drills. As such, in some implementations, if a drill of a particular emergency response type 904 in the custom policy 312 has already been scheduled to be performed by the particular institution corresponding to the custom policy 312, a user will be prevented from removing the respective emergency response type 904 from the custom policy 312.

Figure 14:
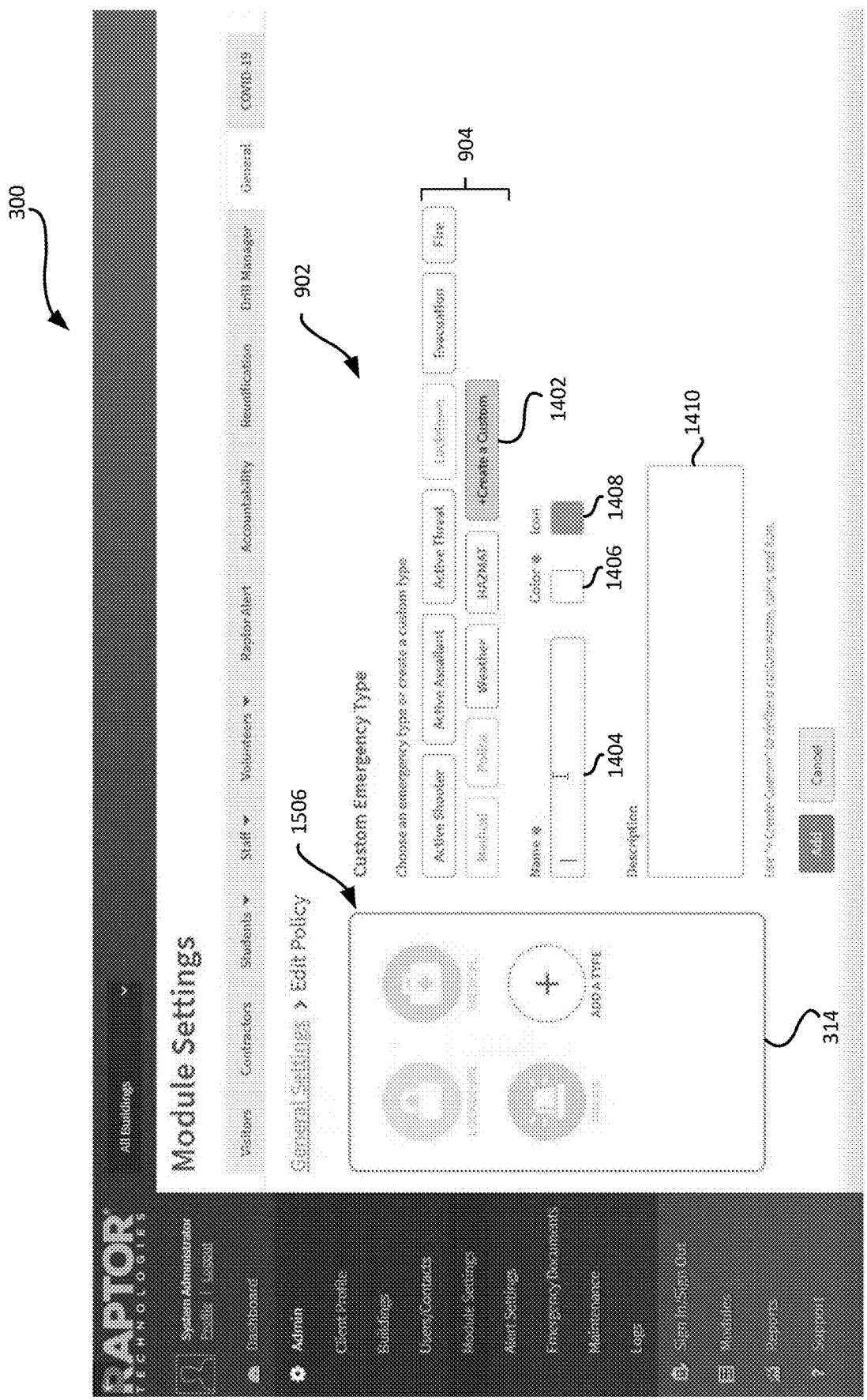

Referring to FIG. 14, in some implementations, the user interface 300 also enables a user to create a custom emergency response type to be added to the custom policy 312. As can be seen in FIG. 14, upon selection of the "Create a Custom" button 1402, the emergency type selection page 902 of the user interface 300 is updated to display several entry fields 1404, 1406, 1408, 1410 for a user to input information regarding the custom emergency response type.

Figure 15:
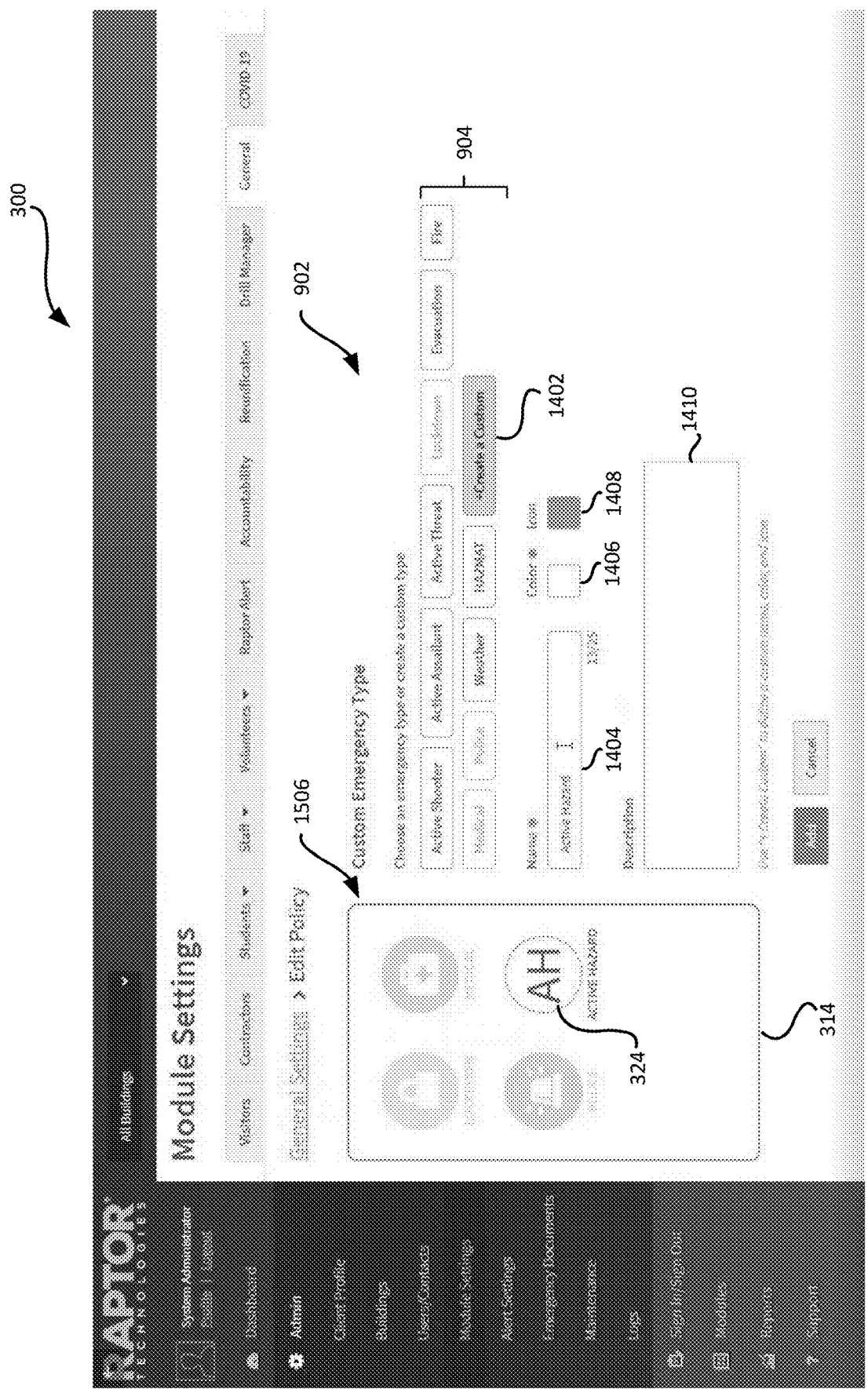

Referring to FIG. 15, a name for the custom emergency response type can be entered (e.g., typed) into the first entry field 1404. As can be seen in FIG. 15, once a name for the custom emergency response type has been entered into entry field 1404 a corresponding button 324 is added to the preview 1506 of the home screen depicted in the preview module 314.

Figure 16:
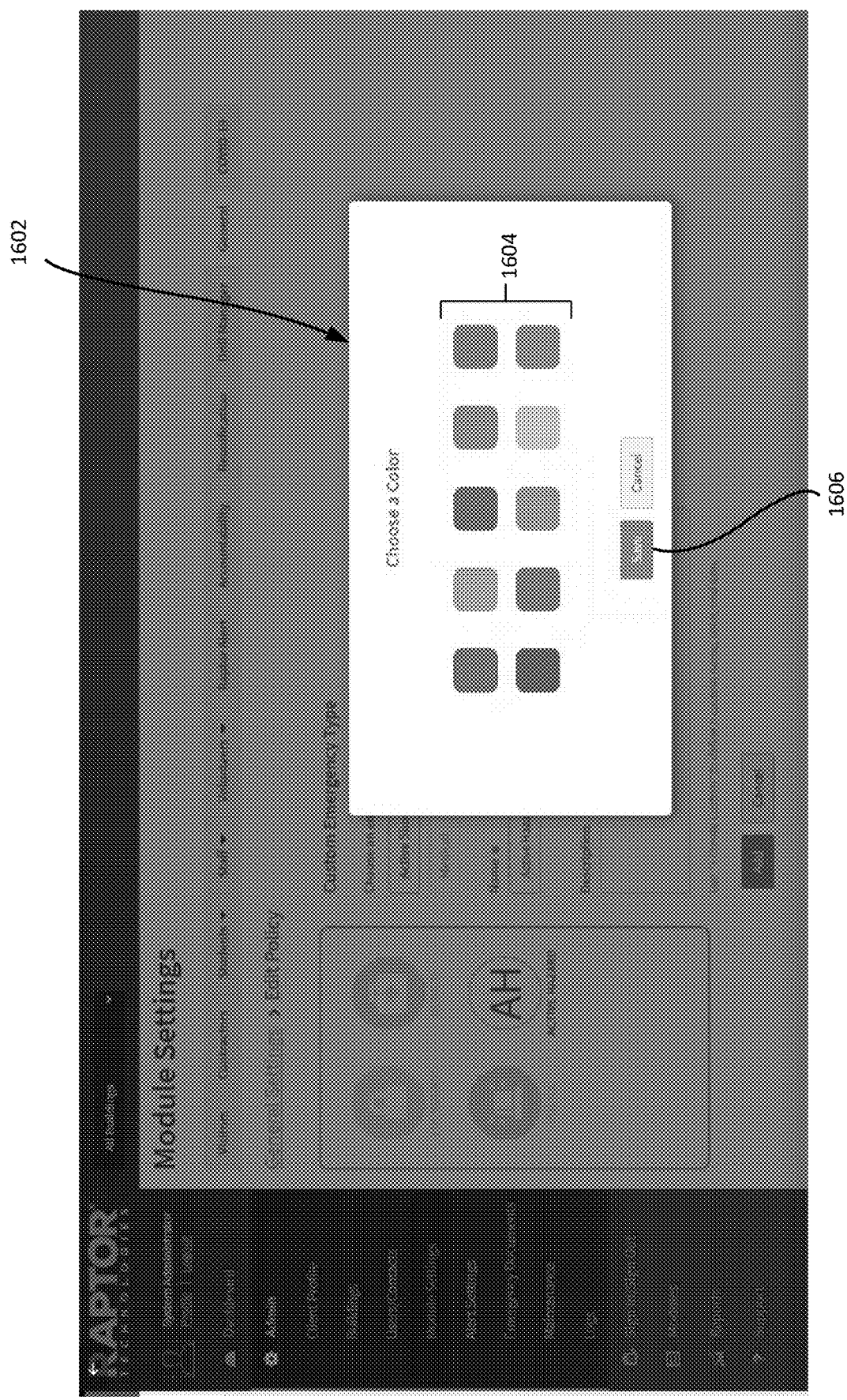
Figure 18:
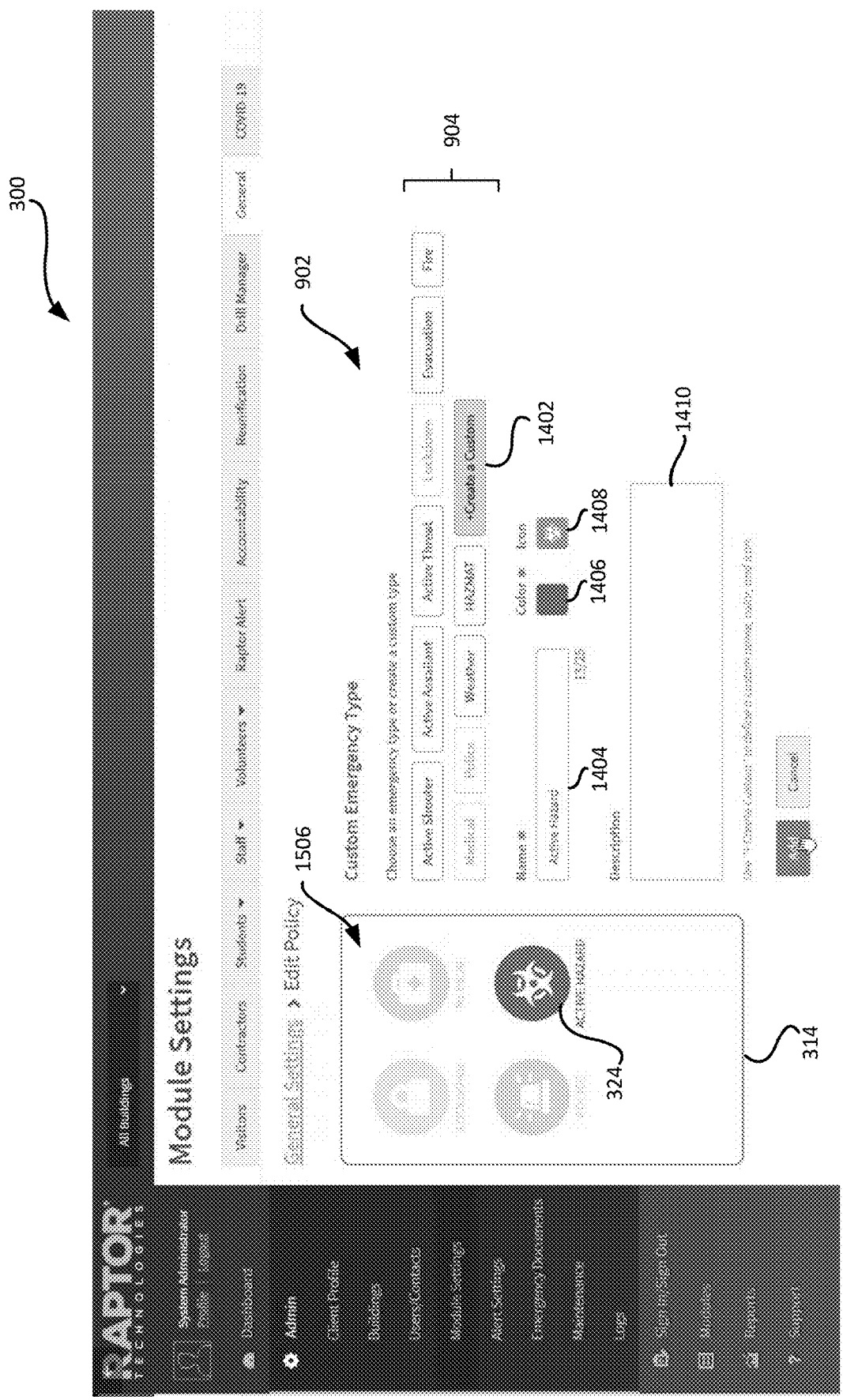

Referring to FIG. 16, in response to selection of the second entry field 1406, a color selection window 1602 is provided with one or more colors 1604 that can be used for the button 324 for the custom emergency response type. In some implementations, if a particular color in the color selection window 1602 has been previously selected for another emergency response type in the custom policy 312, a user will be prevented from selecting the previously-used color again in order to prevent multiple buttons of the configured application 204 being the same color. Once a color is selected for the custom emergency response type, a "Save" button 1606 may be used to save the selection of the color for the emergency response type. As can be seen in FIG. 18, the button 324 for the custom emergency response type depicted in the preview module 314 is updated to the saved color.

Figure 17:
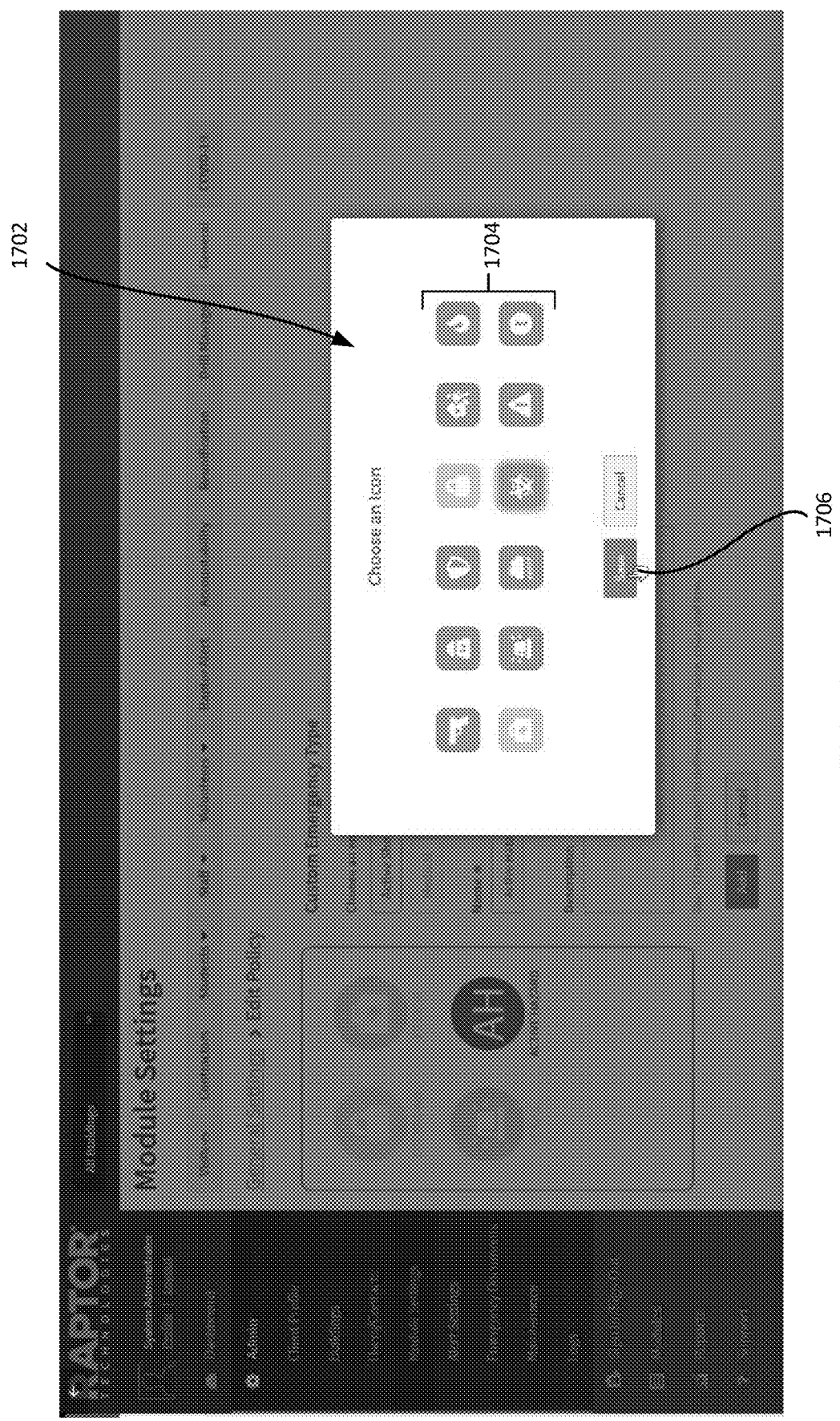

Referring to FIG. 17, in response to selection of the third entry field 1408, an icon selection window 1702 is provided within the user interface 300. As can be seen in FIG. 17, the icon selection window 1702 includes one or more icons 1704 that can be used for the button 324 for the custom emergency response type. In some implementations, if a particular icon 1704 in the icon selection window 1702 was previously selected for another emergency response type for the custom policy 312, a user will be prevented from selecting the previously-used icon in order to prevent multiple buttons of the configured application 204 from having the same icon 1704. Once an icon 1704 is selected for the custom emergency response type, a "Save" button 1706 may be used to save the icon selection for the custom emergency response type. As can be seen in FIG. 18, the button 324 depicted in the preview module 314 for the custom emergency response type is updated to include the saved icon.

As can be seen in FIGS. 15 and 18, the emergency type selection page 902 also includes an entry field 1410 for a user to provide a description of the custom emergency response type. For example, the description provided in entry field 1410 can be used to document the creation of the particular emergency response type 904, such as how the emergency response type 904 relates to an institution's 122 operations and procedures.

Once the relevant information has been provided for the custom emergency response type using the entry fields 1404, 1406, 1408, 1410, an "Add" button on the emergency type selection page 902 can be used to save the information related to the custom emergency response type and add the custom emergency response type to the custom policy 312. In some implementations, a name and color must be provided for the custom emergency response type in order to add the custom emergency response type to the custom policy 312. As will be described in further detail herein, each emergency response type can be linked to one or more sets of actions to be executed (e.g., one or more notifications to be transmitted) upon initiation of the respective emergency response type.

In addition to selecting the emergency response types 904 to include in the custom policy 312, in some implementations, a user 118 can select the arrangement of buttons on the home screen of the application 204 for each emergency response type 904. The preview module 314 can depict a preview of the selected arrangement of the buttons for the custom policy 312.

Figure 19:
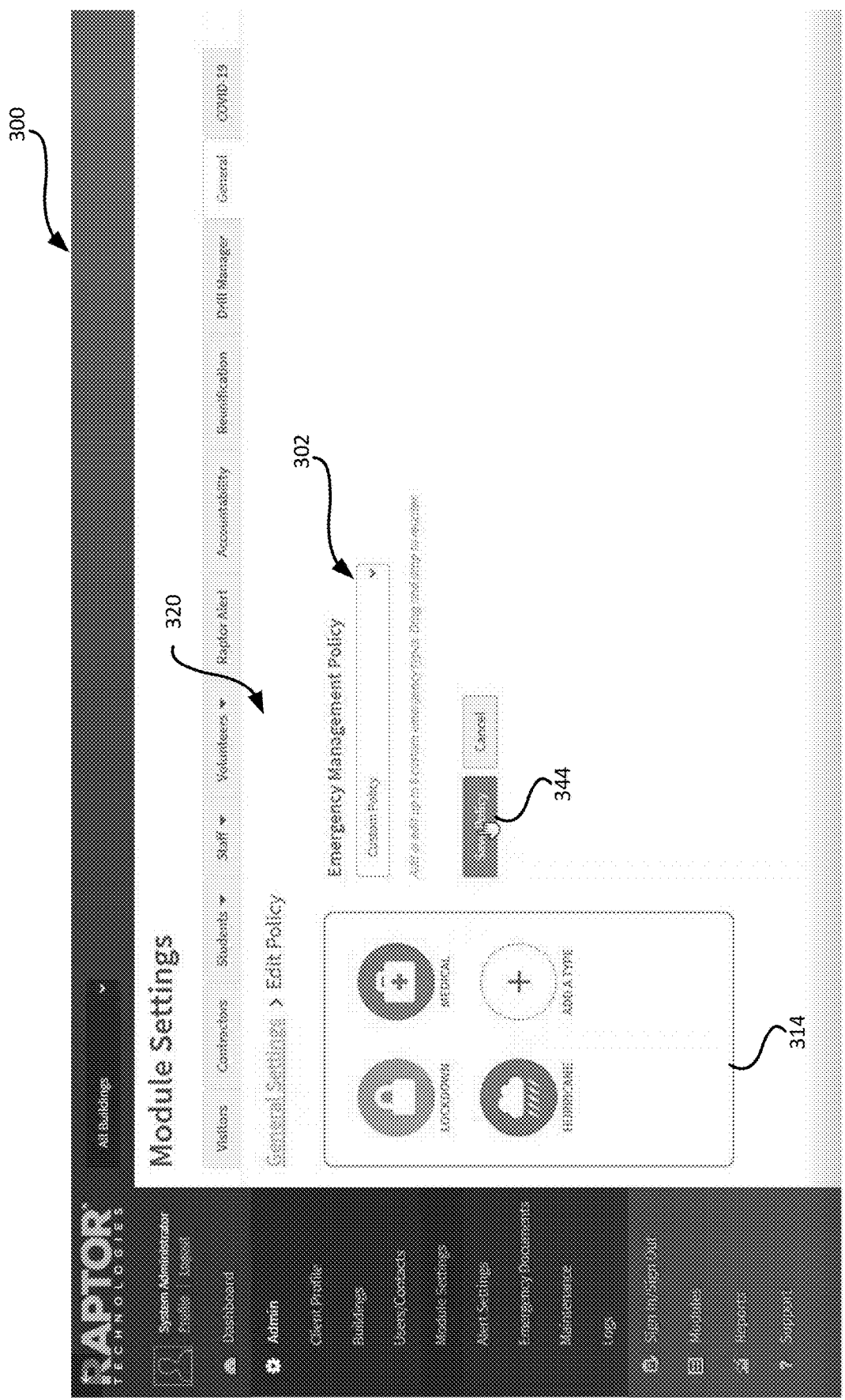
Figure 20:
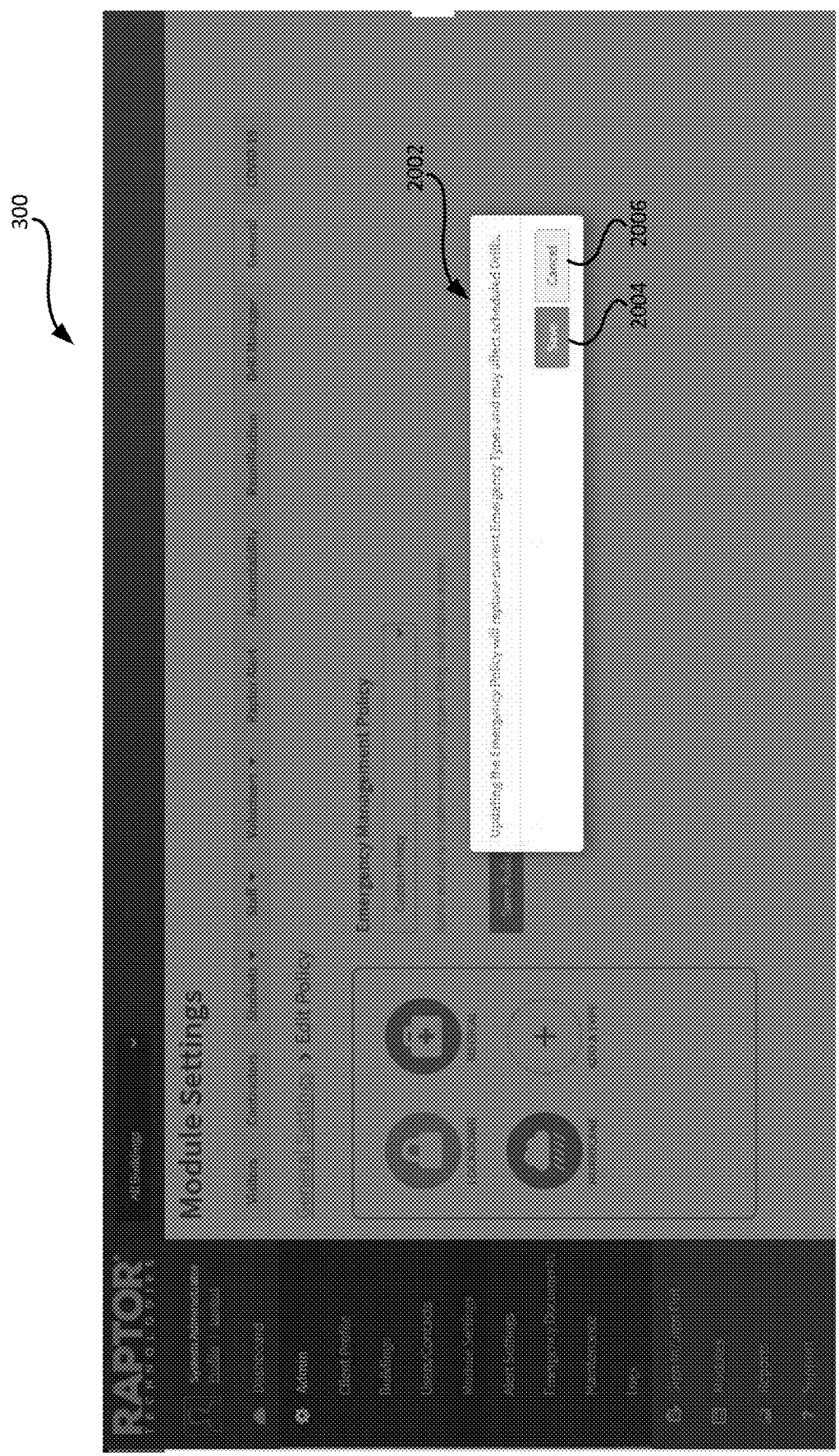

Referring to FIG. 19, once all desired emergency response types have been added to the custom policy 312, or the desired predefined emergency response policy 304, 306, 308, 310 has been selected, the selected emergency response policy 304, 306, 308, 310, 312 for the configuration of the application 204 can be saved using a "Save Policy" button 344 on the policy editing page 320. Referring to FIG. 20, in some implementations, the user interface 300 displays a confirmation screen 2002 that prompts a user to confirm that they would like to save the updated emergency response policy 304, 306, 308, 310, 312 selected for the application 204. The user can confirm their selection using a "Save" button 2004 presented on the confirmation screen 2002. Alternatively, the user can cancel the changes to the emergency response policy 304, 306, 308, 310, 312 by selecting a "Cancel" button 2006 on the confirmation screen 2002.

Once confirmed, the user's selection of an emergency response policy 304, 306, 308, 310, 312, as well any customization choices for custom policies 312, can be transmitted from the user's computing device (e.g., from device 106 of FIG. 1) to a data store (e.g., data store 160) for storage of the selected emergency response policy. For example, the emergency response policy 304, 306, 308, 310, 312 selected for the configuration of the application 204 can stored in data store 160 together with information related to an account associated with the configuration of the application 204 (e.g., the institution 122 associated with configuration of the application 204). In addition, the data store 160 can store the associated software required for executing each of the emergency response protocols defined by the emergency response policy for the institution 122. For example, each GUI button 210, 212, 214, 216, 218 (show in in FIG. 2) in the emergency response application 204 can be linked to the execution of software instructions that initiate a series of emergency response protocols defined by an emergency response policy 304, 306, 308, 310, 312 for the particular emergency response associated with the particular button 210, 212, 214, 216, 218. In some implementations, the software instructions execute a ruleset particular to each emergency response policy 304, 306, 308, 310, 312, thus providing a user with a rapid and accurate means to initiate proper emergency protocols while under stress.

For example, referring to FIG. 1, if the application 204 is configured for a particular institution 122, the specific software code required to execute the application 204 and the corresponding emergency response policy 304, 306, 308, 310, 312 selected for the institution are stored in the data store 160 and re associated with the institution 122. As a result, whenever a user associated with the institution 122 (e.g., user 112 or 114) accesses the application 204, the emergency response policy stored in the data store 160 will be accessed and the application 204 presented to the user associated with the institution 122 will be configured to execute the emergency response policy selected for the institution 122. Further, if a user associated with the institution 122 initiates an emergency response using the application 204, the emergency response will be executed by the incident management service 142 in accordance with the emergency response policy selected for the institution 122 and stored in the data store 160.

In addition to configuring an emergency response policy and application for a particular institution 122, 124, individual users 112, 114, 116, 118 can further configure the application for the user's particular user device 102, 104, 106, 108. For example, as described above, the application 204 can be configured for a particular institution 122 in order to execute an emergency response policy selected for the institution 122. Once the emergency response policy and application 204 have been configured for the particular institution 122, individual users 112, 114 associated with the institution 122 can further configure the emergency response application 204 for execution on their individual user devices 102, 104. A process for configuring an application 204 for a particular user device 102, 104 will now be described with reference to FIGS. 1 and 39-47.

Figure 39:
FIGS. 39-47 depict an example process for configuring an emergency response application for a particular user device in accordance with implementations of the present disclosure.

FIG. 39 depicts a user interface 3900 for initiating a process of setting up and customizing the emergency response application 204 for a user device 102. A user 112 can begin the process of configuring the application 204 for the user's device 102 by selecting the "Get Started" button 3902 on the user interface 3900.

Figure 40:
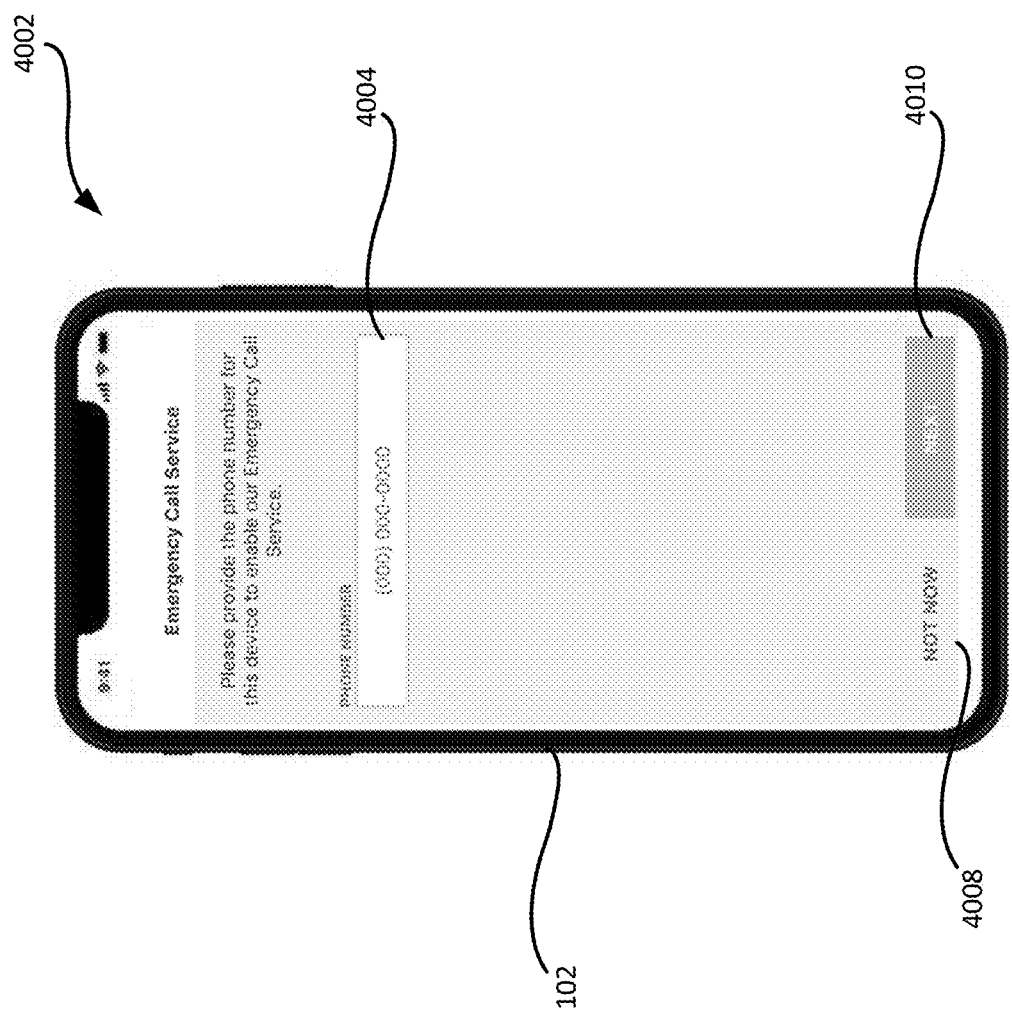
Figure 41:
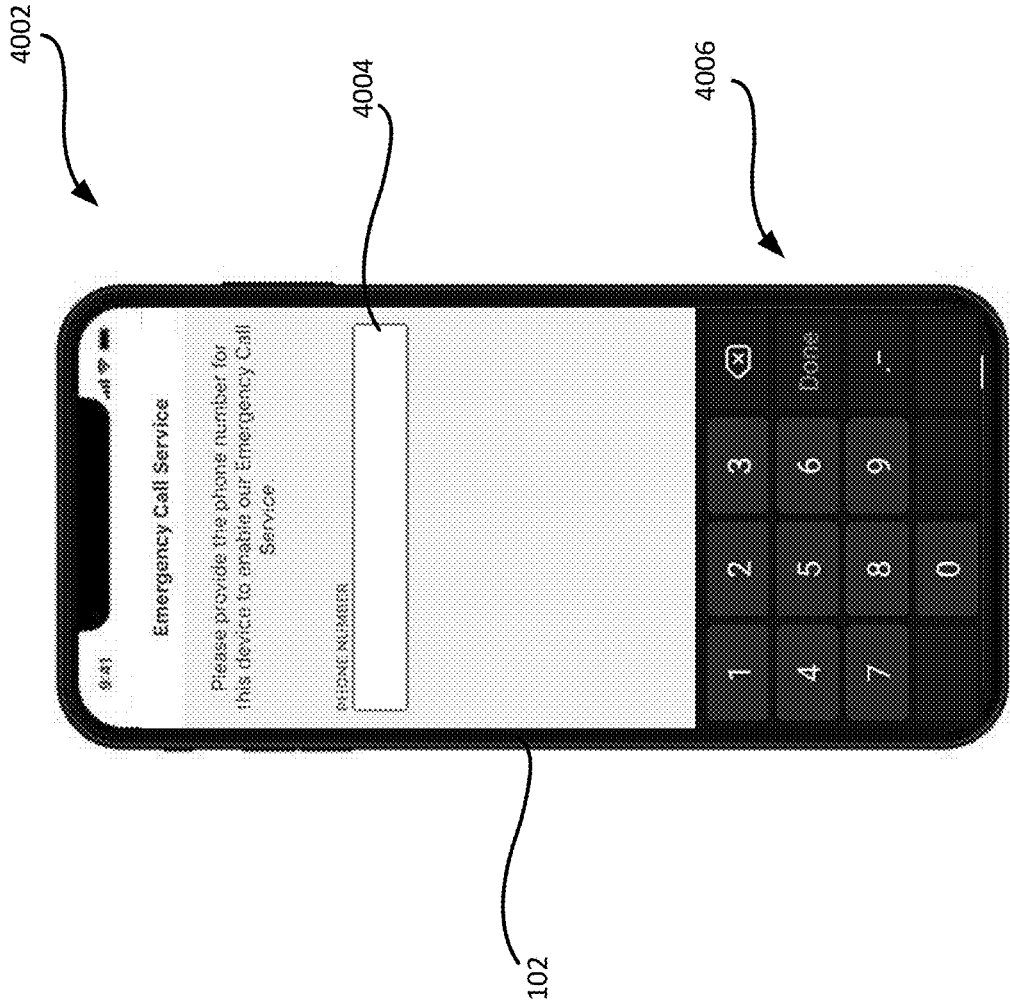

As depicted in FIG. 40, in response to selection of the "Get Started" button 3902, the user device 102 displays an emergency call service setup page 4002 that prompts the user 112 to enter the phone number for the user device 102 into an entry window 4004 displayed on page 4002. Referring to FIG. 41, in response to the user's selection of the entry window 4004, the emergency call service setup page 4002 displays a keyboard 4006 that can be used to enter the phone number of the user device 102 into the entry window 4004.

Figure 42:
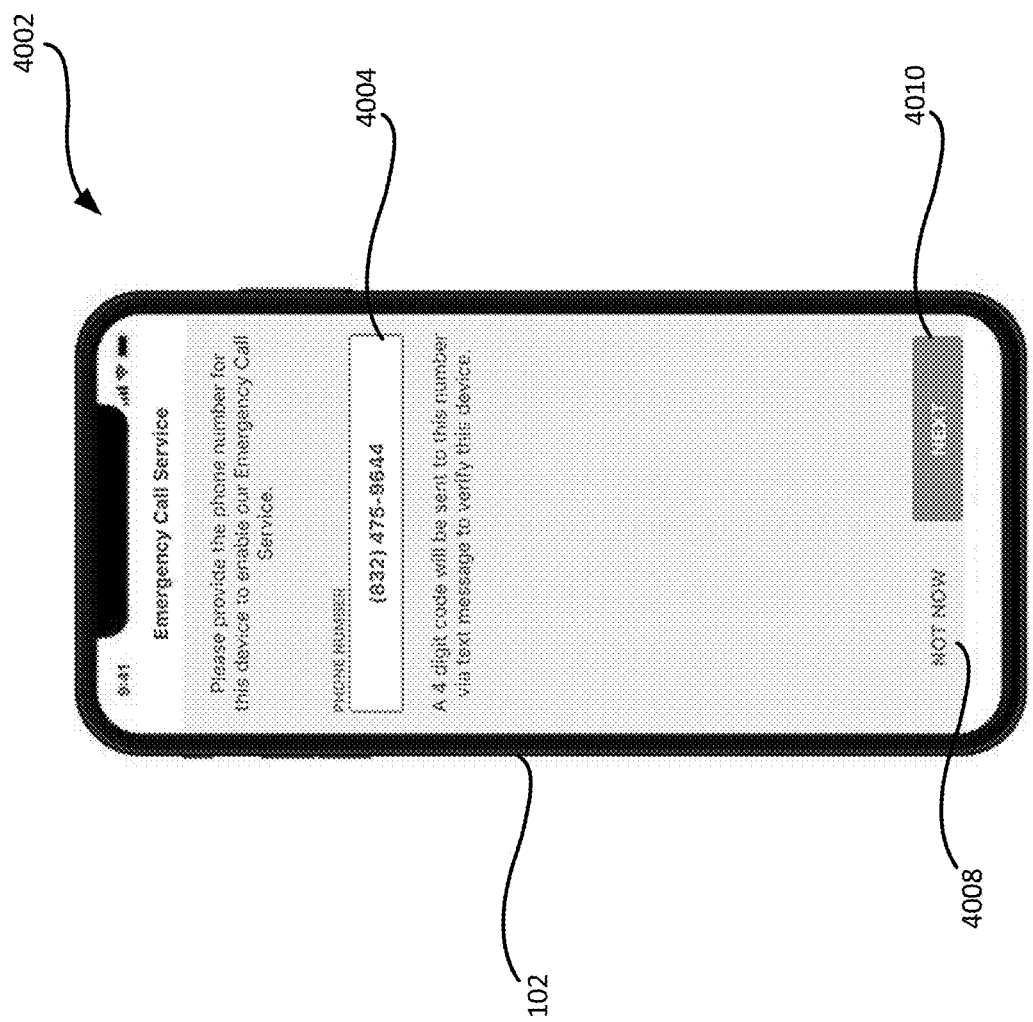

As can be seen in FIGS. 40 and 42, the emergency call service setup page 4002 also includes a "Not Now" button 4008 and a "Next" button 4010. In response to selection of the "Not Now" button 4008, the user device 102 continues with the application configuration process and presents the user 112 with the next configuration step without collecting, storing, or transmitting a phone number for the user device 102. In some implementations, a user 112 can use the application 204 to provide the phone number for the user device 102 at a later time if the "Not Now" button 4008 is selected during configuration of the application.

As depicted in FIG. 40, the "Next" button 4010 is shaded out and disabled if a phone number has not been entered into the entry window 4004. Thus, a user 112 must either provide a phone number in the entry window 4004 or select the "Not Now" button 4008 in order to proceed with the next step of configuring the emergency response application for the user's device 102. As depicted in FIG. 42, the "Next" button 4010 is enabled once a phone number has been entered into the entry window 4004. In some implementations, the phone number entered using the emergency call service setup page 4002 is saved locally on the user device 102 for local retrieval by the emergency response application 204.

In response to entering the phone number of the user device 102 on the emergency call service setup page 4002 and selecting the "Next" button 4010, the phone number entered in the entry window 4004 of the emergency call service setup page 4002 is transmitted from the user device to a server device 140 and is stored in a data store 160. In response to receiving the phone number from the user device 102, the server device 140 transmits a message containing a verification code to the received phone number. For example, the server device can send an email message, SMS text message, or a voice message containing the verification code to the received phone number.

Figure 43:
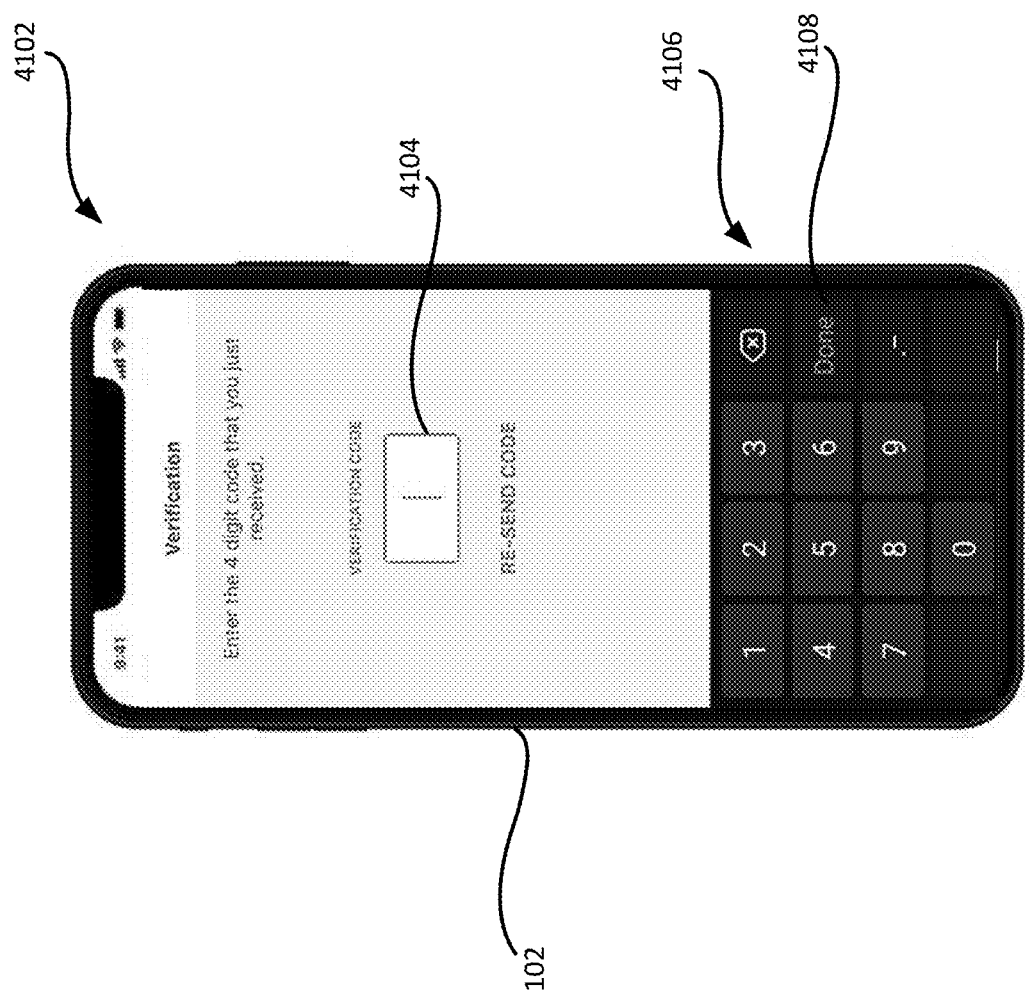

As depicted in FIG. 43, a verification page 4102 is presented on the user device 102 in response to selection of the "Next" button 4010 on the emergency call service setup page 402. In response to receiving a message containing the verification code at the user device 102 associated with the phone number provided at the emergency call service setup page 4002, a user 112 of the device 102 can enter the received verification code in the entry window 4104 displayed on the verification page 4102. As can be seen in FIG. 43, the verification page 4102 includes a keypad 4106 for entering the received verification code into the entry window 4104. A user 112 can indicate that the verification code has been entered into the entry window 4104 by selecting the "Done" button 4108 on the keypad 4106.

Figure 44:
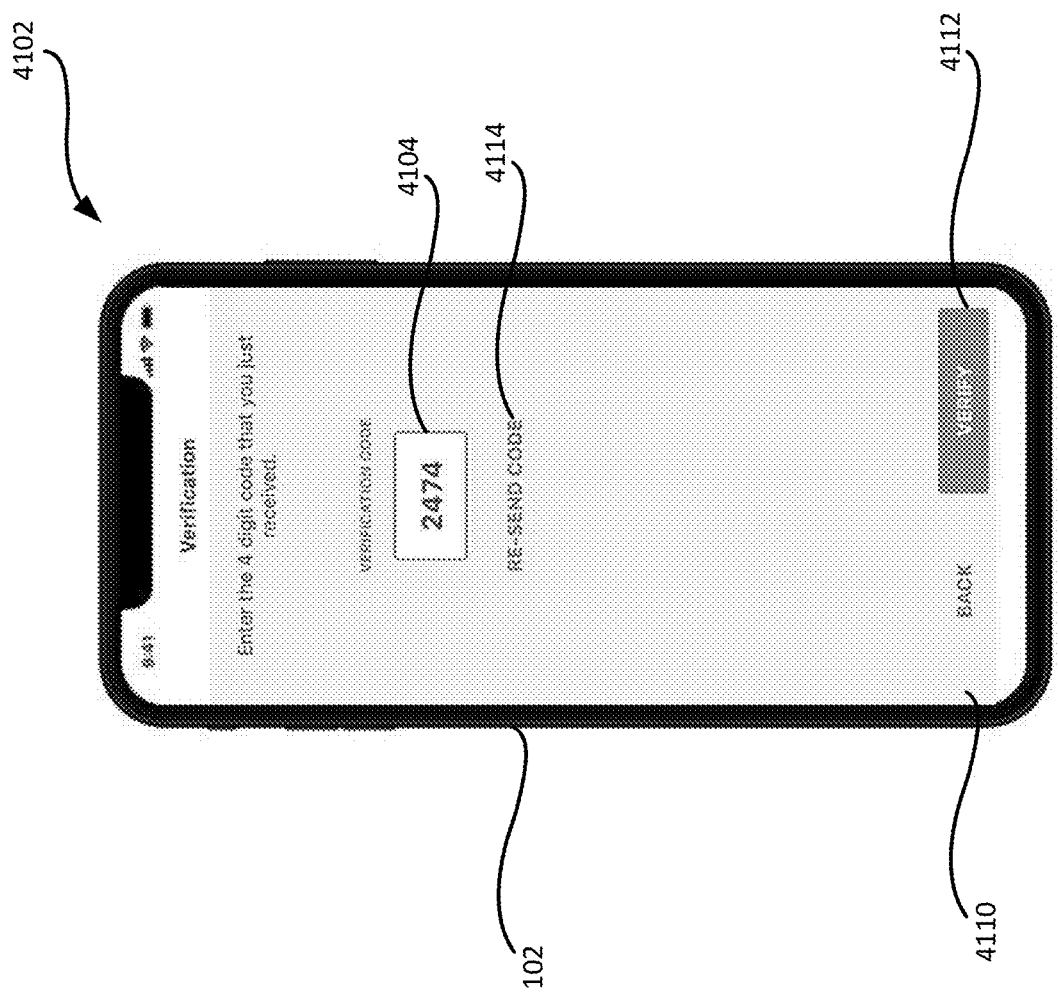

As depicted in FIG. 44, once the verification code has been entered into the entry window 4104 and the user 112 has selected the "Done" button 4108 on the keypad 4106, the verification page 4102 is updated to display a "Back" button 4110, a "Verify" button 4112, and a "Re-Send Code" button 4114. The "Back" button 4110 can be selected to re-display the keypad 4106, which allows the user 112 to modify or retype the verification in the entry window 4104 (e.g., in case the user 112 made an typographical error in entering the verification code in the entry window 4104).

Selection of the "Re-Send Code" button 4114 causes the server device 140 to re-transmit the message containing the verification code to the phone number entered on the emergency call service setup page 4002. For example, in response to a user 112 selecting the "Re-Send Code" button 4114, the user device 102 transmits a signal to the server device 140 that causes the server device 140 to re-transmit the message containing a verification code to the phone number received from the user device 102. The "Re-Send Code" button 4114 can be selected by the user 112 if the original message containing the verification code was misplaced or inadvertently deleted, or was never receive by the user device 102.

Once the verification code 140 has been entered into the entry window 4104, the "Verify" button 4112 can be selected in order to verify the verification code and confirm that the phone number provided in the emergency call service setup page 4002 was accurate. For example, in response to a user 112 selecting the "Verify" button 4112 on the verification page 4102, a signal containing the verification code entered into the entry window 4104 and the phone number entered in the emergency call service setup page 4002 is transmitted from the user device 102 to the server device 140. In response to receiving the signal, the server device 140 confirms that the verification code transmitted from the user device 102 indicated in the signal matches the verification code that was sent by the server device 140 to the phone number indicated in the signal. Based on this verification process, the server device 140 can confirm that the phone number provided on the emergency call service setup page 4002 is in fact the phone number associated with the user device 102. Verifying that the phone number provided on the emergency call service setup page 4002 is the correct number for contacting the user device 102 helps ensure that emergency service providers will have the correct number to contact the user 112 in case of an emergency initiated using the emergency response application 204.

Figure 45:
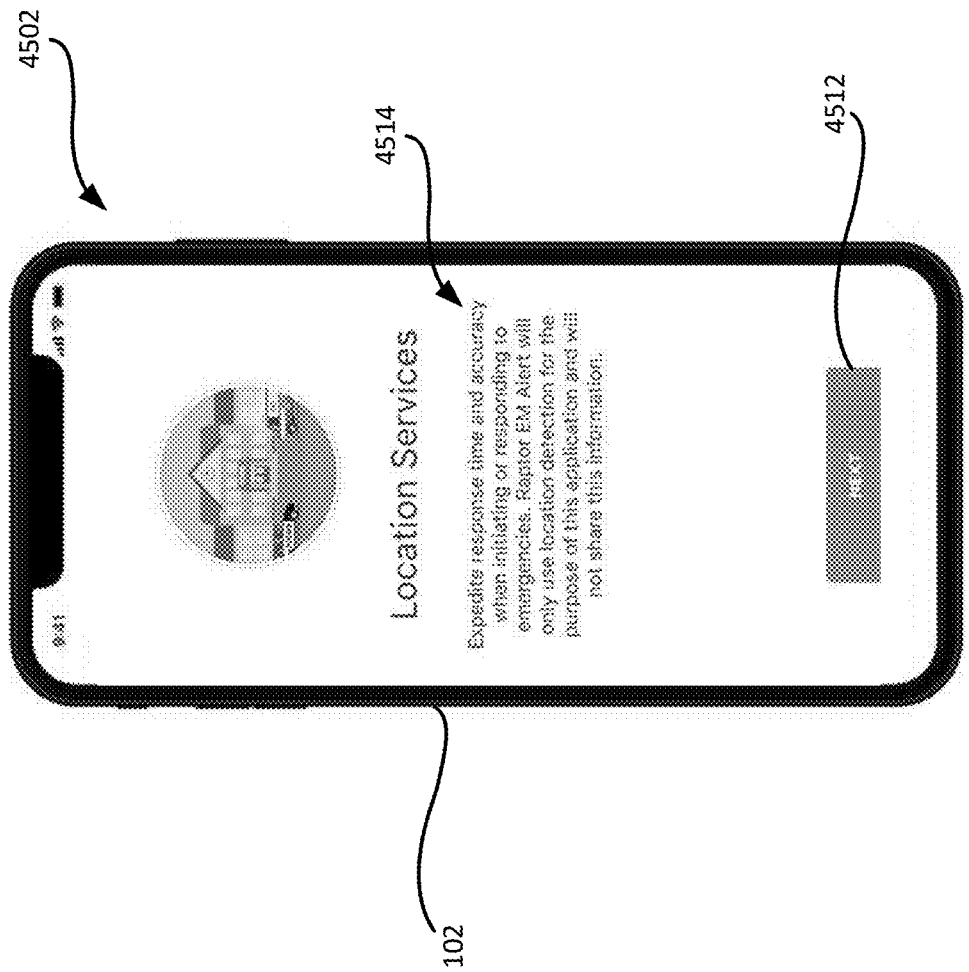

As depicted in FIG. 45, after the phone number provided on the emergency call service setup page 4002 has been verified (or in response to selection of the "Not Now" button 4008 on the emergency call service setup page 4002), the user device 102 displays a location services setup page 4502. The location services setup page 4502 includes an explanation 4514 of the use of device location detection within the emergency response application 204.

Figure 46:
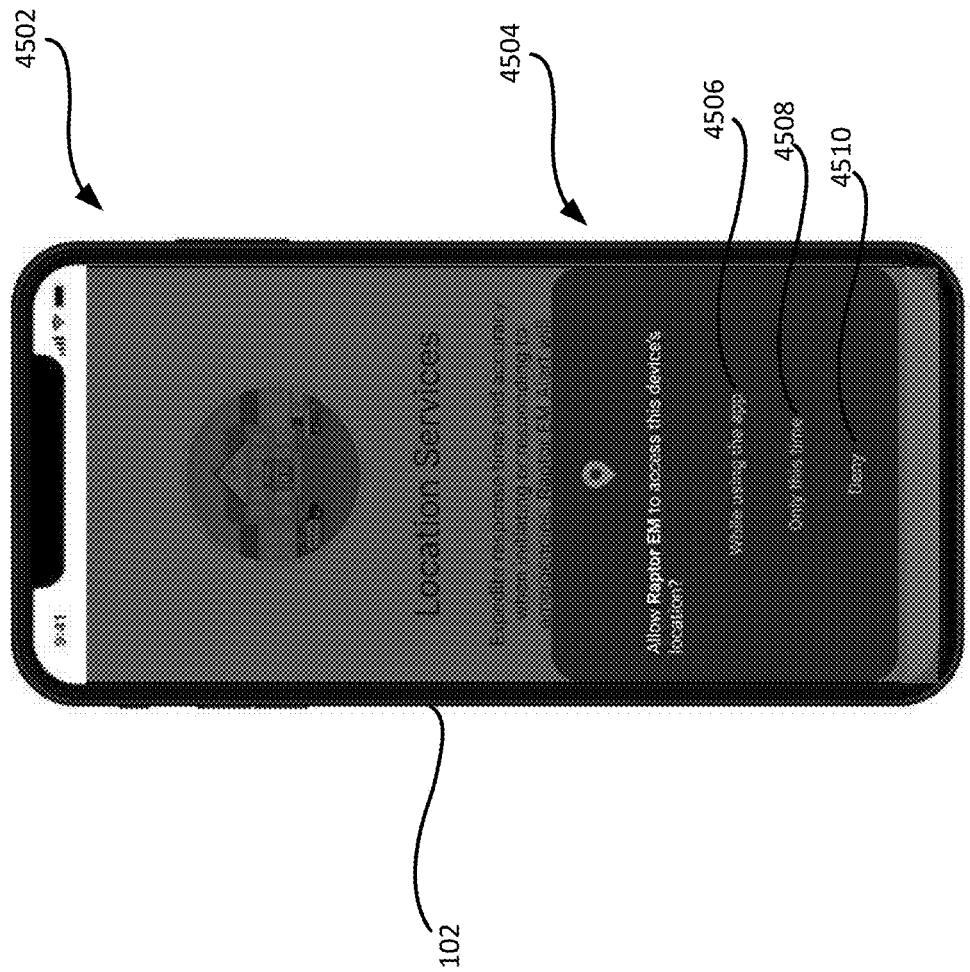

As depicted in FIGS. 45 and 46, in response to selection of the "Next" button 4512 displayed on the location services setup page 4502, a menu 4504 is displayed within the location services setup page 4502. The menu 4504 depicts one or more options related to access of the location of the user device 102 by the emergency response application 204. For example, the menu 4504 includes a "While using the app" button 4506, an "Only this time" button 4508, and a "Deny" button 4510. In response to selection of the "While using the app" button 4506, the application 204 and the user device 102 will each be configured to allow the emergency response application 204 to be able to access the location of the user device 102 whenever the user device 102 is running the emergency response application 204. In response to selection of the "Only this time" button 4508, the application 204 and the user device 102 will each be configured to only allow the emergency response application 204 to access the location of the user device 102 during the current, active session of the application 204 on the user device 102. If the "Only this time" button 4508 is selected, the e application 204 will not be able to access the location of user device 102 during subsequent sessions of the application 204 once the current session of the application 204 has ended. In response to selection of the "Deny" button 4510, the emergency response application 204 will be prevented from accessing the location of the user device 102 at any time. In some implementations, the selection of location service settings from the menu 4504 is transmitted from the user device 102 to the server device 140 and is stored in the data store 160. In some implementations, the selection of location service settings from the menu 4504 is stored locally on the user device 102.

Figure 47:
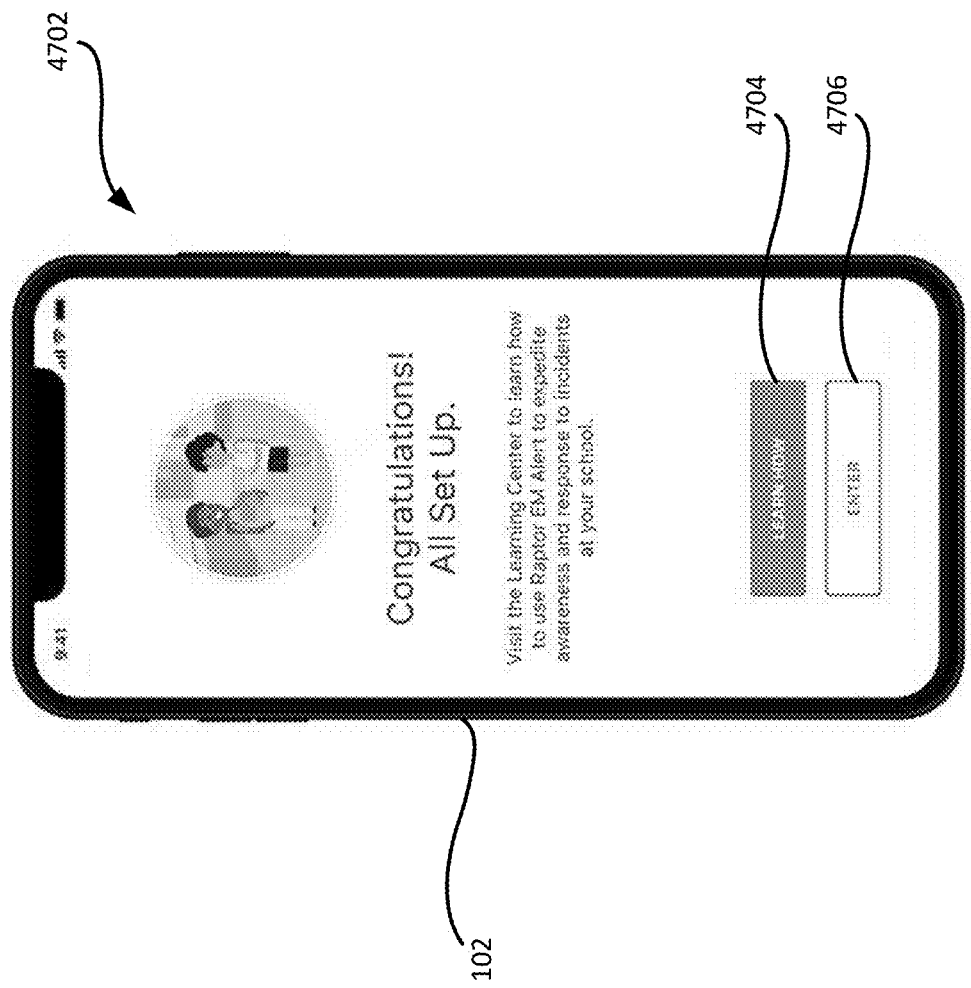

As depicted in FIG. 47, after a location services setting is selected using the location services setup page 4502, configuration of the emergency response application 204 for the particular user device 102 is complete and a completion page 4702 is displayed by the user device 102. In some implementations, the completion page 4702 includes a "Learn How" button 4704 for accessing a learning center that provides instructional information about the emergency response application 204. In some implementations, the completion page 4702 also includes an "Enter" button 4706 that can be used to access the emergency response application 204.

Figure 48:
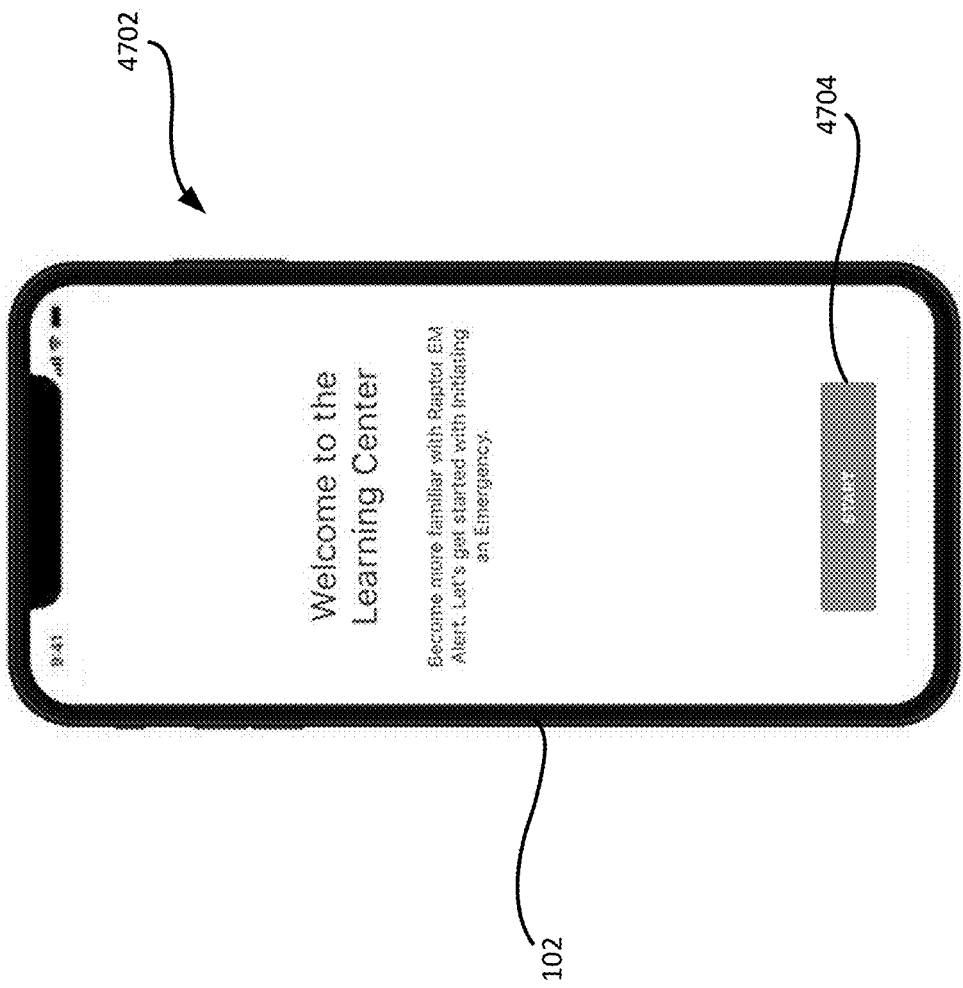
FIGS. 48-53 depict an example computing device executing a learning center program of an emergency response application in accordance with implementations of the present disclosure.

Upon selecting the "Learn How" button 4704, the user device 102 displays a learning center of the emergency response application 204. FIG. 48 depicts an introductory page 4802 of the learning center that provides a brief overview of the learning center. The introductory page 4802 includes a "Start" button 4804 for accessing the modules of the learning center. The learning center can include a library of modules that provide information on a variety of topics related to the emergency response application 204. For example, the learning center can include modules providing information on one or more of the following topics: initiating an emergency response using the application, initiating a team response event using the application, performing group messaging using the application, performing location sharing using the application, performing accountability functions (e.g., taking class attendance) using the application, performing a guardian greeter role using the application during an emergency response, performing a reunifier role for reunifying students with their respective guardians using the application during an emergency response, and performing a runner role for managing transportation of students between various locations during an emergency response using the application. FIGS. 49-52 depict the example computing device 102 presenting a learning center module about initiating an emergency response using the application 204.

Figure 49:
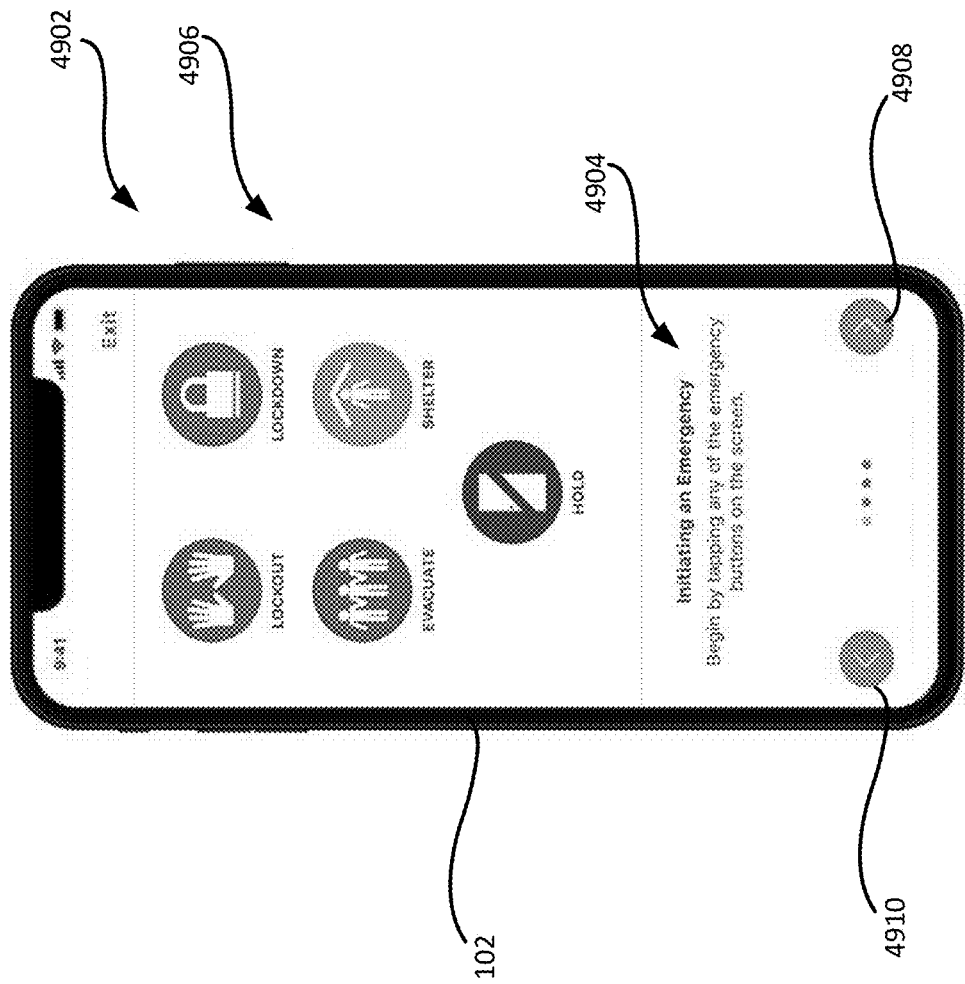

FIG. 49 depicts a first instructional page 4902 with instructions 4904 for initiating an emergency response in the emergency response application 204. The first instructional page 4902 includes a display 4906 that represents the layout of home page of the emergency response application 204 for initiating an emergency response, including each of the emergency response icons presented on the home page of the emergency response application 204 and used to initiate a particular type of emergency response. The first instructional page 4902 also includes a forward button 4908 and a backward button 4910 that can be used to switch between different instructional pages of the learning center module being presented by the user device 102. For example, once a user 112 has finished reviewing the instructions 4904 presented on the first instructional page 4902, the user 112 may press the forward button 4908 to move onto the next page of the learning center module.

Figure 50:
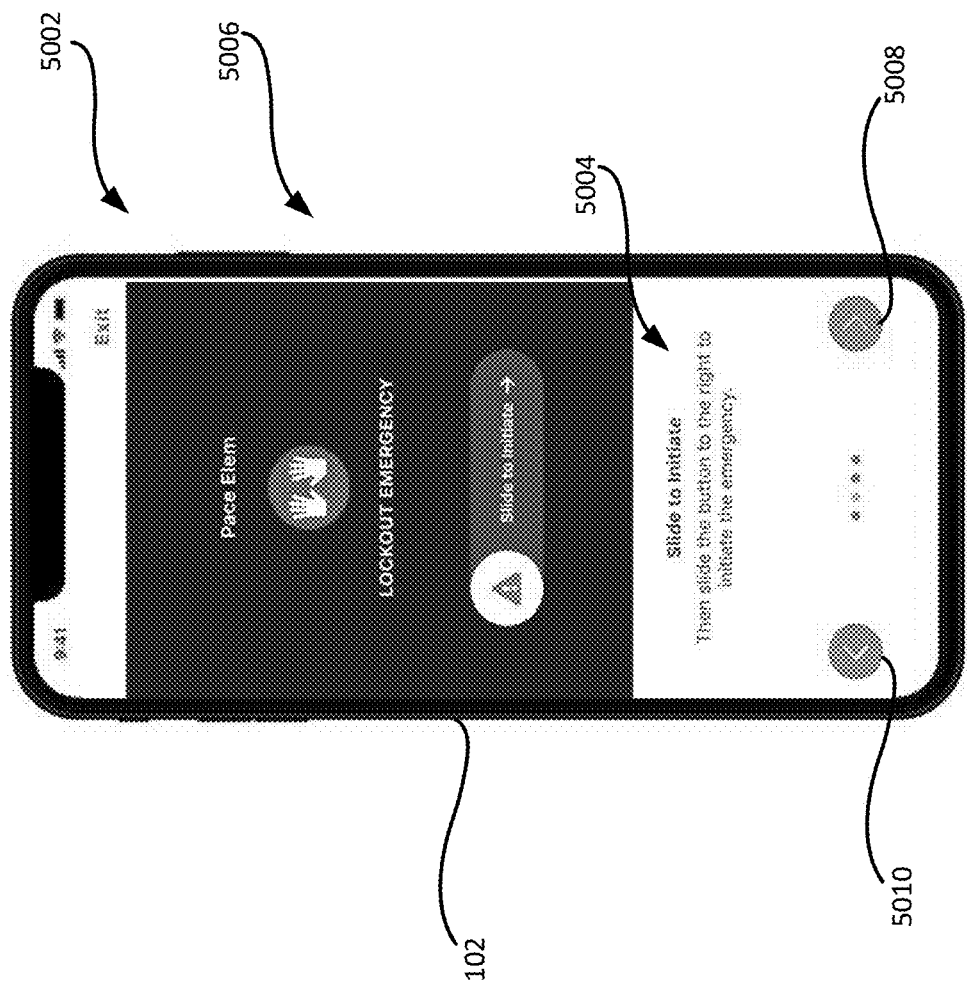

In response to selection of the forward button 4908 on the first instructional page 4902, the user device 102 presents a second instructional page 5002 of the learning center module, as depicted in FIG. 50. As can be seen in FIG. 50, the second instructional page 5002 displays a second set of instructions 5004 about using a slider button to initiate an emergency response selected from the home screen of the emergency response application 204. The second instruction page 5002 also includes a display 5006 representing the layout of the emergency response application 204 interface for initiating an emergency response. The second instructional page 5002 also includes a forward button 5008 and a backward button for switching between different instructional pages of the learning center module. For example, once a user 112 has finished reviewing the instructions 5004 presented on the second instructional page 5002, the user may press the forward button 5008 to move onto the next instructional page of the learning center module.

Figure 51:
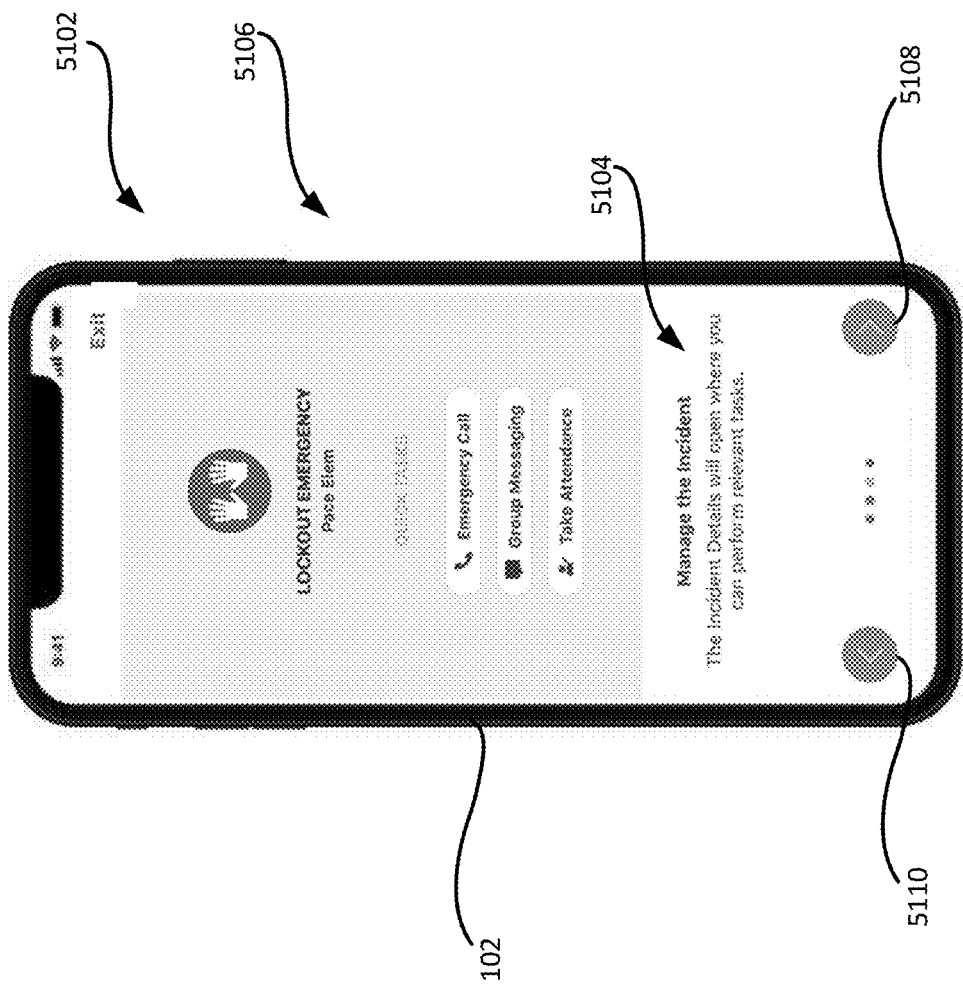

In response to selection of the forward button 5008 on the second instructional page 5002, the user device 102 presents a third instruction page 5102 of the learning center module, as depicted in FIG. 51. As can be seen in FIG. 51, the third instruction page 5102 displays a third set of instructions 5104, which provide information about the incident details page of the emergency response application 204 used for managing an ongoing emergency response initiated using the emergency response application 204. The third instruction page 5102 also includes a display 5106 representing the layout of the incident details page of the emergency response application 204 interface. The third instructional page 5102 also includes a forward button 5108 and a backward button 5110 for switching between different instructional pages of the learning center module. For example, once a user 112 has finished reviewing the instructions 5104 presented on the third instructional page 5102, the user may press the forward button 5108 to move onto the next instructional page of the learning center module.

Figure 52:
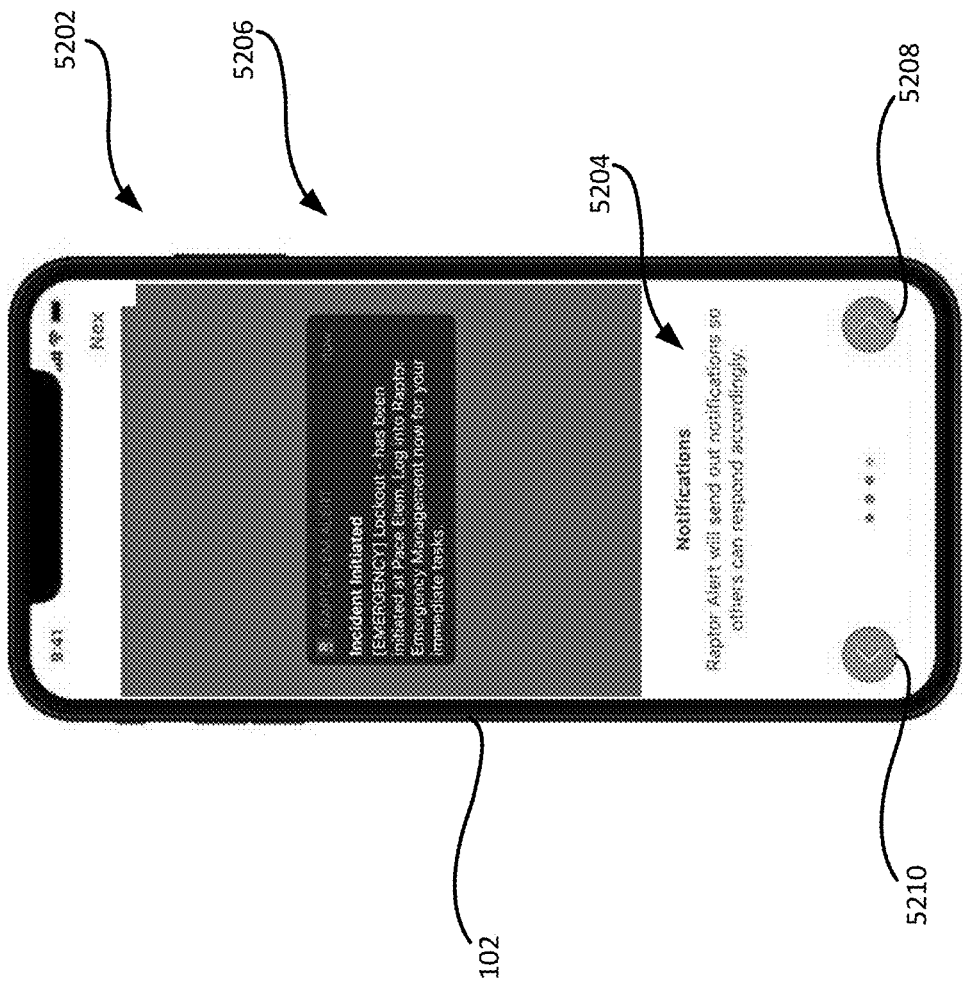

In response to selection of the forward button 5108 on the third instructional page 5102, the user device 102 presents a fourth instructional page 5202 of the learning center module, as depicted in FIG. 52. As can be seen in FIG. 52, the fourth instructional page 5202 displays a fourth set of instructions 5204, which provide an information about the notifications that will be provided by the emergency response application 204 during an emergency response initiated using the emergency response application 204. The fourth instructional page 5202 also includes a display 5206 representing an example notification provided by the emergency response application 204. The fourth instructional page 5202 also includes a forward button 5208 and a backward button 5210 that can be used to switch between different instructional pages of the learning center module.

Figure 53:
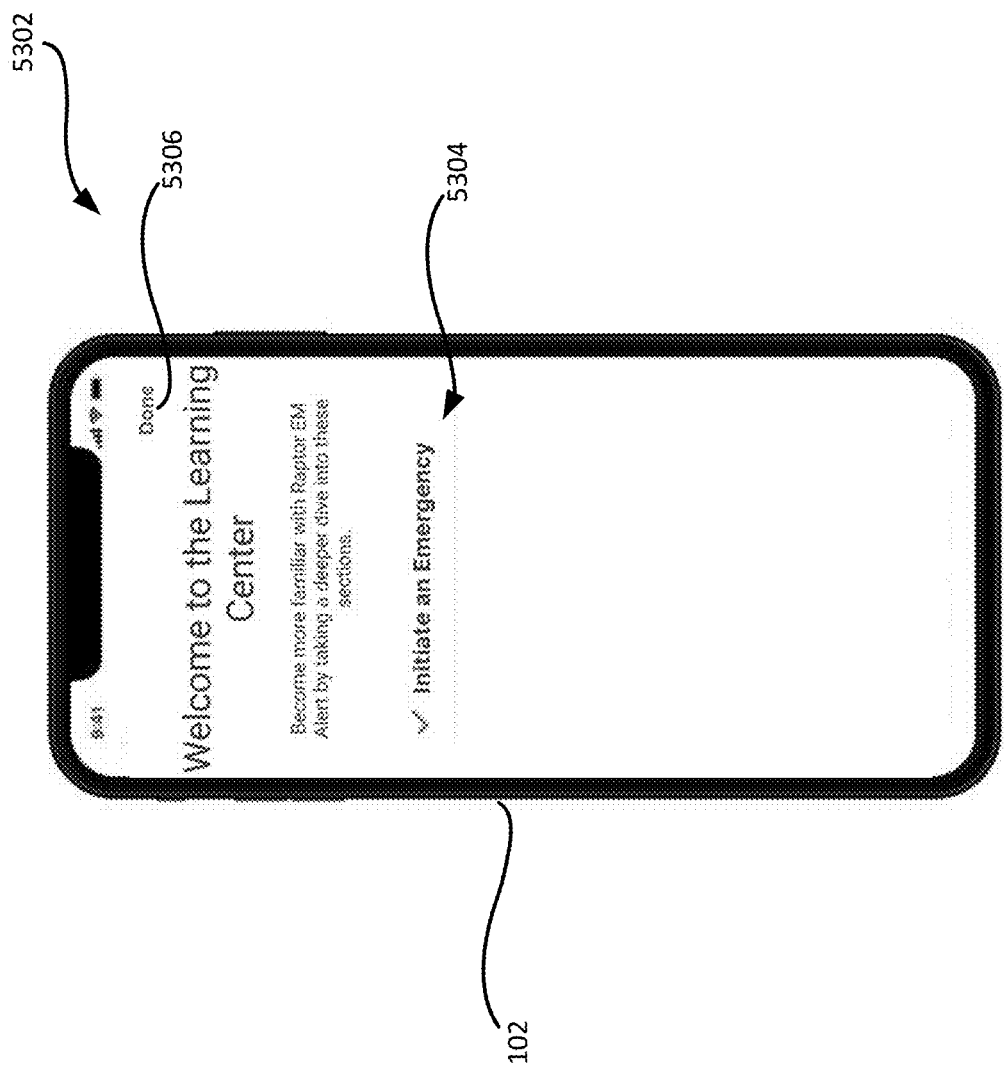

Once the user 112 has reviewed each of the instructional pages 4902, 5002, 5102, 5202 of the learning center module, the module is completed and the user 112 is presented with a learning center home page 5302, as depicted in FIG. 53. As can be seen in FIG. 53, the learning center home page 5302 includes a list 5304 of each of the completed learning center modules. In some implementations, the learning center home page 5302 also includes a list of available learning center modules that have not yet been completed by the user 112. In some implementations, the user 112 may access and review (or re-review) any of learning center modules by selecting the module from the list(s) 5304 presented on learning center home page 5302. The learning center home page 5302 also includes a "Done" button 5306 that can be selected to exit the learning center.

A process for initiating and managing an emergency response using an application in accordance with implementations of the present disclosure will now be described with reference with FIGS. 1, 21, and 22.

Figure 21:
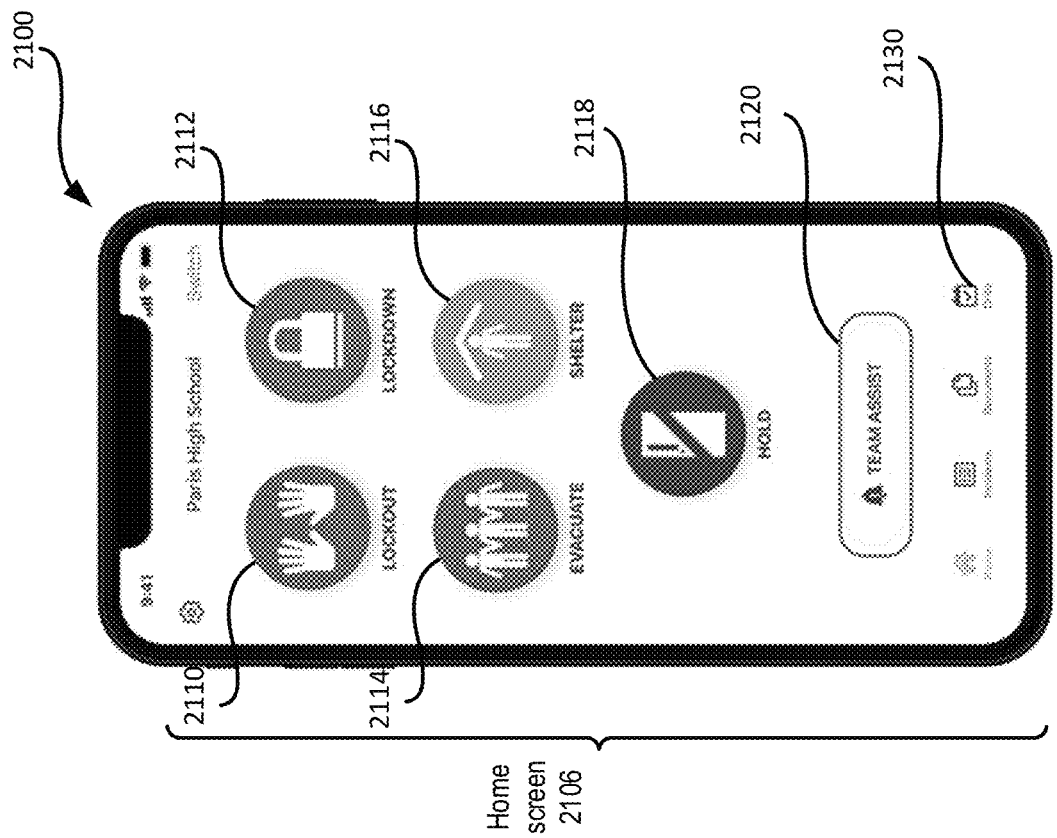
FIGS. 21-24, 25A, 25B, 25C, and 26-37 depict an example computing device executing an emergency response application in accordance with implementations of the present disclosure.

Referring to FIGS. 1 and 21, a user associated with an institution can use a computing device to launch an emergency response application 2100 to initiate an emergency response. For example, user 118 can use a computing device 108 to launch an emergency response application 2100 on the computing device 108. In some implementations, the emergency response application 2100 is configured to present a home screen 2106 with buttons 2110, 2112, 2114, 2116 that correspond to emergency response types defined by an emergency response policy associated with the institution 124. For example, if the institution 124 has selected an emergency response policy that defines a lockout emergency protocol, a lockdown emergency protocol, an evacuate emergency protocol, a shelter emergency protocol, and a hold emergency protocol, the home screen 2106 of the application 2100 launched by the user 118 will include a lockout emergency button 2110, a lockdown emergency button 2112, an evacuate emergency button 2114, a shelter emergency button 2116, and a hold emergency button 2118.

In some implementation, a user must provide login information and be authenticated by the incident management service 142 in order to access the application 2100 and initiate an emergency response. For example, in some implementations, a user must provide a password or other information associated with the user in order to access the application 2100. For example, when a user 118 first uses the application 2100, the user 118 must provide a username and password to access the application 2100. The user-provided username and password can be stored in the data store 160 of the data center 180, and whenever the user 118 makes subsequent attempts to access the application 2100, the username and password provided by the user 118 are checked against the stored username and password. If the user 118 provides a username and password that matches a username and password stored in the data store 160, the user 118 is logged into and granted access to the application 2100.

In some implementations, biometric information of the user 118 is used to authenticate the user 118 and provide the user 118 access to the application 2100. Biometric information used for user authentication can include, but is not limited, face information, fingerprint information, and retina scan information. In some implementations, the application 2100 accesses biometric information previously stored on the user's 118 computing device 108 as authentication information. The biometric information provided by the user 118 when attempting to log into the application 2100 is compared with biometric information previously provided by the user 118 and stored on the user's computing device 108. If the biometric information provided by the user 118 at login matches the previously stored biometric information for the user 118, the user 118 is granted access to the application 2100.

In some implementations, a directory of the institution 124 associated with the user 118 is cross-referenced to confirm the user's 118 association with the institution 124 prior to granting the user 118 access to an application 2100 configured for the institution 124. For example, if the user 118 is associated with a particular institution 124, each time the user 118 attempts to access the application 2100 (as configured for the institution 124), an active directory for the institution 124 stored in the data store 160 and listing all persons currently employed by the institution is checked to confirm that the user 118 is still associated with the institution 124. If the user 118 is not listed in the directory for the institution 124 stored in the data store 160 (e.g., because the user 118 is no longer employed at the institution 124), the user 118 will be declined access to the application 2100. In some implementations, after confirming that the user 118 is listed in the directory for the institution 124 stored in the data store 160, the user 118 will be required to provide one or more additional items of authentication information, such as a password or biometric information. In some implementations, the directory for an institution 124 is transmitted to the data store 160 (e.g., via network 130) whenever a change is made to the directory to ensure that the directory stored in the data store 160 is accurate and up-to-date. In some implementations, an updated directory is transmitted (e.g., via network 130) from the institution 124 to the data center 181 for storage in the data store 160 periodically (e.g., daily, weekly, monthly, etc.).

In some implementations, each user 116, 118 corresponding to a particular institution 124 is assigned a particular role, and the permissions that a particular user 116, 118 has within the application 2100 are determined based on the role assigned to the user 116, 118. For example, an institution 124 may be a school and users 116, 118 corresponding to the institution 124 may be assigned to a teacher role or an administrator role. In addition, the emergency response policy of the institution 124 may define a first level of permissions corresponding to users assigned a first role (e.g., administrators) and a second level of permissions corresponding to users assigned a second role (e.g., teachers). For example, in some implementations, the emergency response policy of the institution 124 may specify that one or more emergency response types can only be initiated by users with a particular role (e.g., administrators).

In addition, the functionality of the application 2100 presented to a particular user 116, 118 can be based on the role of the user 116, 118 and the permissions granted to the corresponding role of the user as defined in the emergency response policy of the institution 124. For example, the application 2100 can be configured to only present buttons for emergency response types 904 for which a particular user 116, 118 has permission to initiate based on the user's 116, 118 role and the institution's 124 emergency response policy. For example, in some implementations, a teacher user 116 utilizing the application 2100 will only be presented with buttons corresponding to emergency response types 904 that the institution's 124 emergency response policy defines as types that can be initiated by users assigned a teacher role.

In some implementations, the role assigned to each user 116, 118 and stored in the data store 160 is based on roles of personnel listed in a directory provided to the data center 180 by the institution 124. In some implementations, if an institution 124 updates its directory to revise the role of one or more persons, the roles of the corresponding application users 116, 118 stored in the data store 160 are automatically updated to align with the roles listed in the updated directory.

To initiate an emergency response using the application 2100, the user 118 can press one of the emergency buttons 2110, 2112, 2114, 2116 on the home screen 2106 of the application 2100. For example, in order to initiate a lockout emergency response in accordance with the institution's 124 emergency response policy, the user 118 can press the lockout emergency button 2110 depicted on the home screen 2106 of the application 2100.

Figure 22:
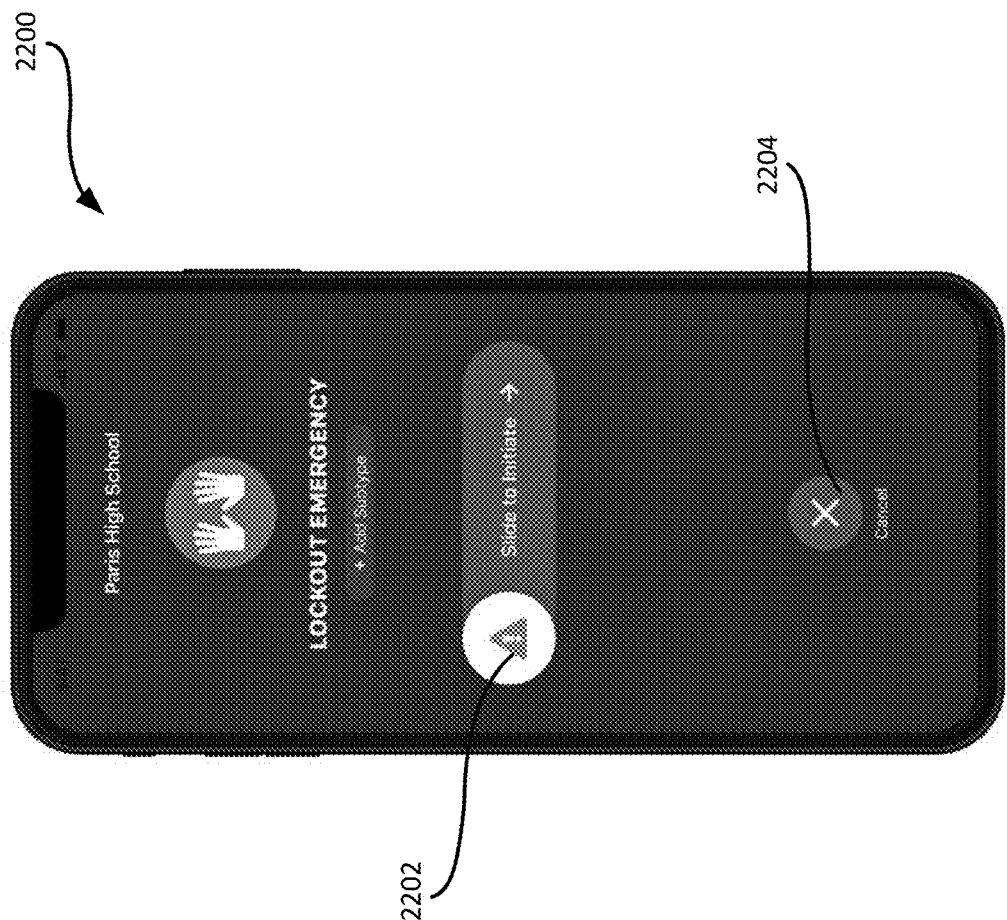

Referring to FIG. 22, in response to the user pressing one of the emergency response buttons, an emergency response initiation page 2200 is displayed on the computing device 108. For instance, as depicted in FIG. 22, in response to pressing the lockout emergency button 2110, an emergency response initiation page 2200 for initiating a lockout emergency response across the institution 124 is displayed on the computing device 108. The emergency response initiation page 2200 includes a slider 2202 for confirming the user's request to initiate the selected emergency response. For example, user 118 can slide slider 2202 left to right to initiate the selected lockout emergency response. As depicted in FIG. 22, the emergency response initiation page 2200 also includes a button 2204 to cancel initiation of the selected emergency response.

Referring to FIG. 1, in response to a user 118 initiating an emergency response a signal is transmitted from the computing device 108 to the server device(s) 140 of the incident management service 142 indicating that a particular emergency response was initiated by the user 118. Based on receiving a signal from a computing device 108 indicating initiation of a particular emergency response, server(s) 140 access data store 160 to identify the stored association between the computing device 108 and a particular institution 124. Once the institution 124 associated with the initiating computing device 108 is determined, the emergency response policy for the institution 124 can also be determined based on the emergency response policy stored for the institution 124 in the data store 160. As such, software linked to and stored for the emergency response protocol for the particular emergency initiated by the user 118 using the application 2100 icon 2110 can be selected and the software can be initiated across all devices 106, 108 associated with the institution 124. As previously discussed, the emergency response protocol for the initiated emergency response can be defined by the emergency response policy of the institution 124. For example, the server devices(s) 140 can transmit a signal to all computing devices 106, 108 associated with the institution 124 notifying the corresponding users 116, 118 that the selected emergency response has been initiated within and can be accessed by the application 2100 according to the institution's predefined emergency response policy.

In some implementations, only a single emergency response can be initiated for a particular institution 124 at once. For example, once a user 116, 118 has initiated an emergency response for the institution 124, another emergency response cannot be initiated for the institution 124 until the previously-initiated emergency response is completed.

In some implementations, notifications are automatically sent to one or more recipients in accordance with an institution's selected emergency response policy in response to initiation of an emergency response for the institution. For example, a particular predefined emergency response policy 304, 306, 308, 310 can include template messages and notifications for each emergency response type defined in the policy, and these messages can be automatically transmitted in response to a user initiating the corresponding emergency response type. In some implementations, an institution can designate a list of recipients to receive notifications based on the emergency response type. For institutions 122, 124 with a custom emergency response policy 312, the institution 122, 124 can generate a custom notification for each type of emergency response included in the custom policy 312, and can designate a list of recipients to receive a notification for each type of emergency response included in the custom policy 312. In some implementations, in response to initiation of an emergency response 2306, notifications are also transmitted to one or more external systems associated with the institution 124 (such as, such as surveillance systems, fire panel systems, and public address (PA) systems associated with the institution 124 and/or other external emergency management systems) using a Common Alerting Protocol (CAP) or other custom JSON integration.

The notifications transmitted by the server device(s) 140 of the incident management service 142 can be any suitable type of notification format including, but not limited to, email messages, SMS text message, and voice messages. In some implementations, the computing devices of the one or more users identified as recipients for a particular notification will receive the notification automatically as a push notification. The notification messages can be transmitted from server device(s) 140 of the data center 180 to the computing devices of the one or more designated recipient users over the network 130. In some implementations, during configuration of the application 2100 for the user's device 102, 104, 106, 108, a user 112, 114, 116, 118 can elect whether the user 112, 114, 116, 118 would like to receive "standard" push notifications or "critical" notifications from the application 2100. If the user 112, 114, 116, 118 elects to receive "standard" push notifications from the application 2100, push notifications will not be presented on the user device 102, 104, 106, 108 when the device 102, 104, 106, 108 is set to a mode that restricts the receipt of messages (e.g., when the user device 102, 104, 106, 108 is set to "do not disturb" mode). In contrast, if the user 112, 114, 116, 118 elects to receive "critical" push notifications from the application 2100, push notifications will be presented on the user device 102, 104, 106, 108 even when the device 102, 104, 106, 108 is in a restricted, "do not disturb" mode.

In some implementations, all users 116, 118 associated with the institution 124 are notified in response to initiation of an emergency response for the institution 124. In some implementations, each user 112, 114, 116, 118 of the application 2100 for a particular institution 122, 124 is assigned a particular role, and the recipients for notifications are determined based on roles of the users. For example, an institution 122 may be a school and users 112, 114 corresponding to the institution 122 may be assigned to a teacher role or an administrator role. The emergency response policy of the institution 122 may define a first notification corresponding to a first emergency response type and second notification corresponding to a second emergency response type. The emergency response policy of the institution 122 may further define administrator role users as being recipients of notifications for the first emergency response type and all users as being recipients of notifications for the second emergency response type. As a result, when a user 112, 114 associated with the institution 122 uses the application 2100 to initiate an emergency response of the first type, only users associated with the institution 122 that have been assigned the administrator role will receive the notification. If a user 112, 114 associated with the institution 122 uses the application 2100 to initiate an emergency response of the second type, all users 112, 114 associated with the institution 122 will receive the notification regardless of role.

In some implementations, the role assigned to each user 112, 114 and stored in the data store 160 is based on roles of personnel listed in a directory provided to the data center 180 by the institution 122. In some implementations, if an institution 122 updates its directory to revise the role of one or more persons, the roles of the corresponding application users 112, 114 stored in the data store 160 are automatically updated to align with the roles listed in the updated directory.

Figure 23:
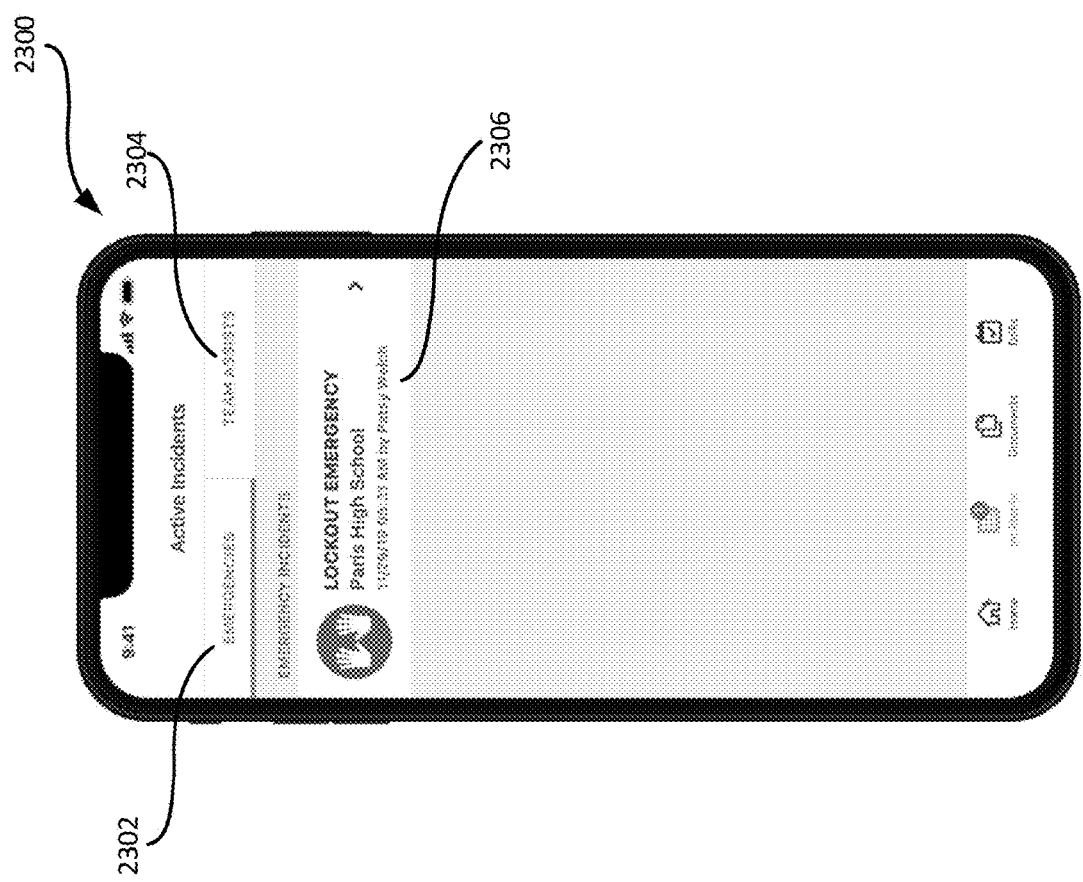

Referring to FIGS. 21 and 23, in some implementations, once the emergency response for an institution 124 has been initiated, computing devices 106, 108 associated with the institution 124 can access information regarding the emergency response under an active incidents page 2300 of the application 2100. For example, as depicted in FIG. 23, once the lockout emergency has been initiated for the institution 124, the active incidents page 2300 of the application 2100 is updated to display information regarding the initiated lockout emergency response 2306. For example, the active incidents page 2300 can display the time the emergency response was initiated, a name of the institution and/or building for which the emergency response was initiated, and a name of the user 118 that initiated the emergency response. In some implementations, additional information about the emergency response 2306, such as accountability figures, response progress, and access to the group messaging for the response 2306, are also displayed on the active incidents page 2300 of the application 2100.

As will be discussed in further detail herein, the application 2100 can also be used to initiate one or more drills of emergency events, and any initiated drill for the institution 124 may also be displayed in the active incidents page 2300, along with the name of the user that initiated the corresponding drill.

Figure 24:
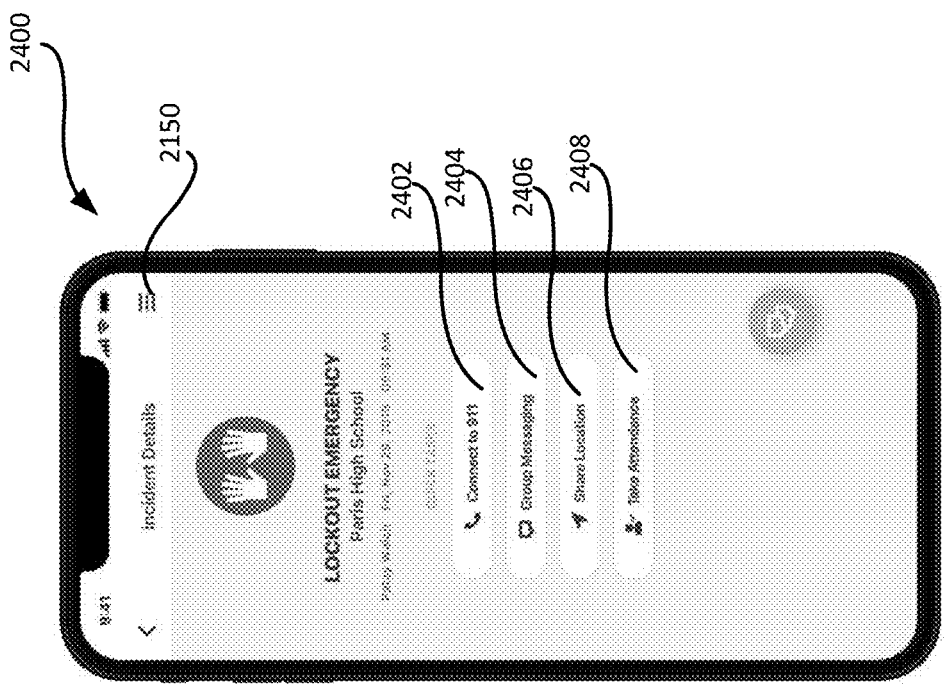

In some implementations, the active incidents page 2300 of the application 2100 includes an emergencies tab 2302 and a team assists tab 2304. In some implementations, all active emergency responses 2306 (as well as any active emergency response drills) for the institution 124 are displayed under the emergencies tab 2302 of the active incidents page 2300 and all active team assists for the institution 124 are listed in the team assists tab 2304. Referring to FIG. 24, in some implementations, a user can select a particular ongoing emergency response listed on the active incidents page 2300 (e.g., the lockout emergency response 2306) to access an incident details page 2400 and further manage the ongoing emergency response 2306.

As can be seen in FIG. 24, the incident details page 2400 includes a button 2402 to place a call to an emergency service provider using the user's computing device 108. For example, in response to a user 118 pressing button 2402, a call is placed to a public-safety answering point (PSAP) (e.g., a 9-1-1 call) using the network of the computing device 108. In some implementations, in response to a user 118 pressing button 2402, a call is automatically placed with a public-safety answering point corresponding to the user's current location using the computing device's native operating system dialer. In some implementations, in response to a user 118 pressing button 2402, additional information can be transmitted to the PSAP including, but not limited to, profile information for the initiating user 118, the location of the user 118, the type of emergency response initiated, and any other information that may assist the PSAP in responding to the emergency. In some implementations, direct communication between the user 118 and a PSAP operator and/or dispatched emergency responders is automatically initiated in response to initiating an emergency response using the application 2100.

In some implementations, the incident details page 2400 includes a button 2404 to provide the user with access to a group messaging feature of the application 2100. The group messaging feature allows users of the application 2100 to exchange messages with one or more predefined groups of users.

Figures 25A, 25B, 25C:
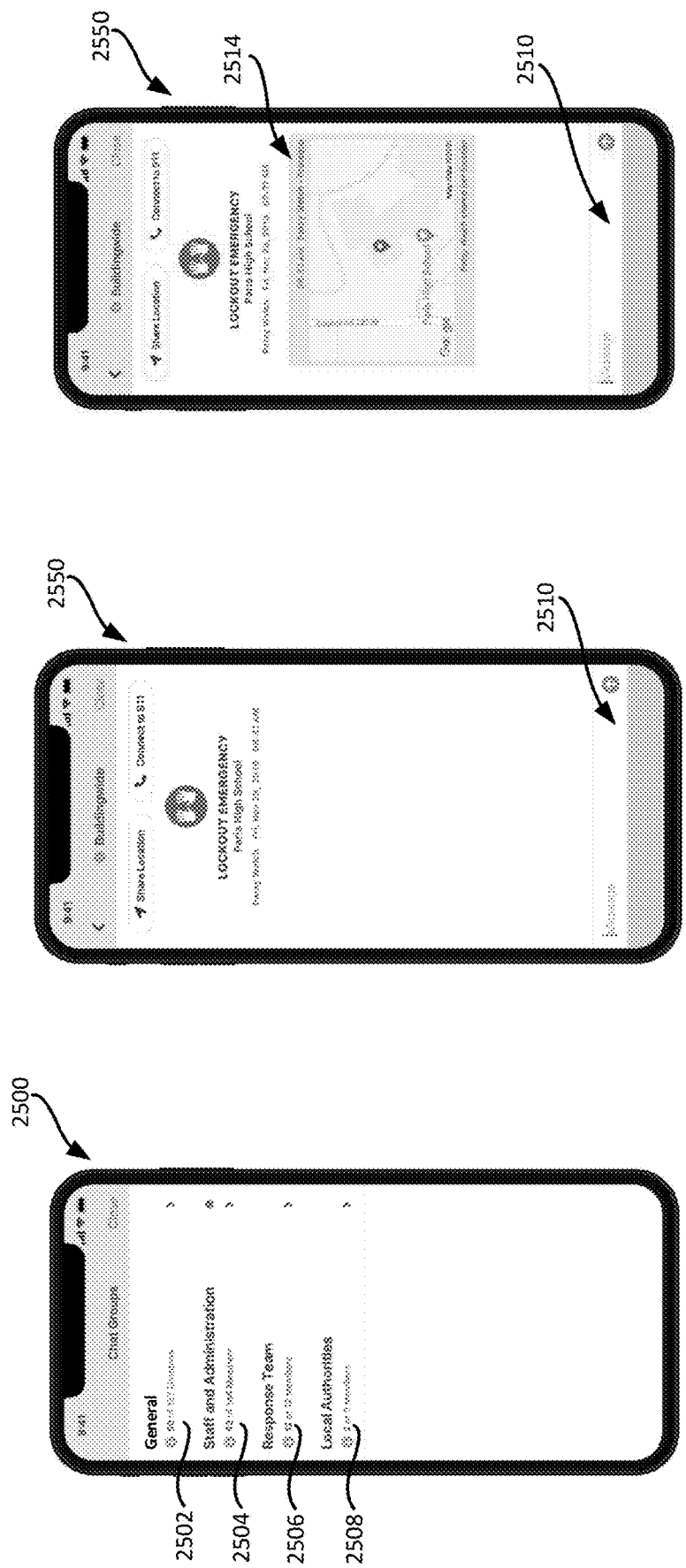

For example, as depicted in FIG. 25A, in response to selecting the group messaging feature using the button 2404, the application 2100 presents a group selection page 2500. The group selection page 2500 includes one or more groups 2502, 2504, 2506, 2508 to which the user 118 can transmit a message. For example, as depicted in FIG. 25B, if the user 118 selects the "General" group 2502 listed in the group selection page 2500, the application 2100 presents a group chat page 2550 with a text entry field 2510 that can be used to compose and send a message to all users in the "General" group 2502.

In some implementations, the users associated with each of the groups 2502, 2504, 2506, 2508 for group messaging for a particular institution 124 are stored in the data store 160, and messages submitted using the group messaging feature of the application 2100 are managed by the incident management service 142. For example, if user 118 generates a group message using text entry field 2510 to the "General" group 2502, the message is transmitted via network 130 to the server device(s) 140. In some implementations, the message transmitted by the user 118 using the group messaging feature of the application is received by an application program interface (API) of the incident management service 142. The server device(s) 140 can then transmit ("push") the message received from the user 118 to each of the computing devices associated with the users in the "General" group 2502, as defined and stored in the data store(s) 160, via network(s) 130. In some implementations, the computing devices of the one or more users in the group selected to receive the group messages receive the messages automatically as push notifications.

In some implementations, in response the server device(s) 140 receiving a message submitted by a user 118 through the group messaging feature of the application 2100, the server device(s) 140 transmits a signal over network(s) 130 to each of the computing devices associated with the users in the identified group 2502, 2504, 2506, 2508 indicating the receipt of the group message and stores the group message in a data store (e.g., data store 160). In response to receiving a signal from the server device(s) 140 indicating the receipt of the group message, the computing devices associated with the users in the respective group communicate with the server device(s) 140 over the network(s) 130 to retrieve ("pull") the message from the data store 160.

Upon receiving the group message sent by the user 118, one or more users associated with the selected group 2502 can send a message in reply using the group messaging feature of the application 2100. For example, if user 116 is in the "General" group 2502, user 116 will receive the group message sent by user 118 at computing device 106 associated with user 116, and can send a group message in reply using the text entry field 2510 of the group messaging feature of the application 2100.

Figure 56:
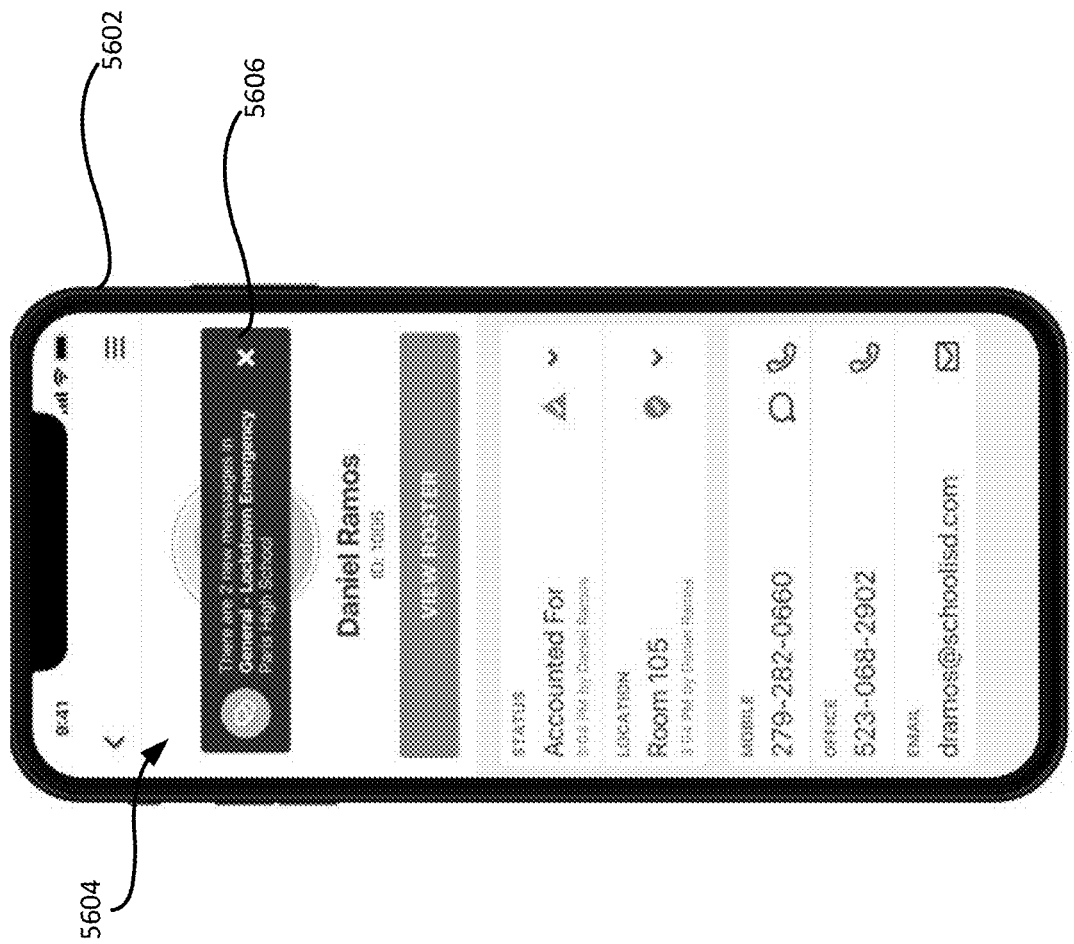
FIG. 56 depicts an example computing device displaying an alert presented within an emergency response application in accordance with implementations of the present disclosure.

In some implementations, the application 2100 provides an alert within the application 2100 that notifies the user 116 that he or she has received a new message. For example, the application 2100 can provide the user 116 with a pop up alert within the application 2100 that notifies the user 116 that a new message has been received within the application 2100. For example, FIG. 56 depicts an example computing device 5602 executing the emergency response application 2100. As can be seen in FIG. 56, whenever a user interface 5604 of the emergency response application 2100 is open and active on the computing device 5602 and the user associated with the device 5602 receives a message within the emergency response application 2100, a notification 5606 is displayed within the active user interface 5604 of the application 2100 in order to notify the user of the new message(s).

In some implementations, messages sent using the group messaging feature of the application 2100 include metadata identifying one or more items of information related to the message including, but not limited to, the identity of the sending user 118, the group 2502, 2504, 2506, 2508 selected as recipient for the message, the institution 124 associated with the user 118, etc. The types of messages exchanged between users using the group messaging feature of the application 2100 include, but are not limited to, SMS text messages, emails, voice messages, etc. The messages exchanged using the group messaging feature of the application 2100 can include any suitable format of data, including, but not limited to, text, images, video data, audio data, or location data. For example, as depicted in FIGS. 25B and 25C, in some implementations, application 2100 includes a "Share Location" button 2512, and in response to activation of the "Share Location," the location of the computing device is transmitted as a message to the selected group 2502. For example, as depicted in FIG. 25C, a map 2514 identifying the location the computing device transmitting the message, along with the identity of the user 118, can be transmitted to the selected group 2502 as a group message.

In some implementations, the group messaging feature of the application 2100 can be used to exchange messages between users 116, 118 across different platforms of the application 2100. For example, a group message generated by a user 118 accessing the application 2100 via a mobile application on a mobile device 108 can be transmitted to and received by a second user 116 accessing the application 2100 via a web application.

In some implementations, as depicted in FIG. 24, the incident details page 2400 includes a "Share Location" button 2406 that a user 118 can use to share their current location with other users (e.g., user 116) of the application 2100. For example, using computing device 108, user 118 can press the "Share Location" button 2406, and the location of the computing device 108 is shared with one or more other users of the application 2100 associated with the same institution 124 as user 118 (e.g., user 116). In some implementations, the location of a computing device shared using the "Share Location" button 2406 is transmitted to a predetermined group of users, which is stored in the data store 160 of the data center 180. For example, each of the application 2100 users associated with a particular institution 124 can also be associated with a particular role (e.g., teacher, administrator, parent, etc.), and the application 2100 can be configured to transmit a user's 118 shared location to only users of the application 2100 assigned to a particular role (e.g., administrator users) or group.

In some implementations, the application 2100 can be configured to automatically transmit the location of the computing device 108 used to initiate an emergency response to other users 116 of the application 2100 upon initiation of the emergency. For example, in response to user 118 initiating an emergency response using the application 2100, the location of the computing device 108 that the user 118 used to initiate the response is automatically transmitted to server devices(s) 140 via network 130, and server device(s) 140 transmit the location information to one or more users 116 of the application 2100 associated with the same institution 124 as the initiating user 118. In some implementations, the emergency response policy selected for an institution 124 defines whether or not a location of the user device 106, 108 is automatically shared in response to initiation of one or more of the emergency response types.

In some implementations, the location information for a computing device 108 is transmitted to the server device(s) 140 and/or other users as a map of the current location of the computing device 108. In some implementations, the location information for a computing device 108 is transmitted to the server device(s) 140 and/or other users as GPS coordinates corresponding to the location of the computing device 108. For example, if the user 118 of the computing device is located in a large building, such as a large school campus, during the emergency response, the coordinates of the user's computing device 108 can be transmitted to one or more other users of the application 2100, such as administrator users of the institution 124 or emergency responders, to enable a more efficient emergency response. For example, based on the coordinates of the user's computing device 108, the location of the user's computing device 108 can be depicted on a mapping interface that is shared with one or more other users.

Referring to FIG. 24, in some implementations, the incident details page 2400 also includes a "Take Attendance" button 2408 that allows a user 118 to transmit and record attendance during the emergency response. For example, the user 118 may be a teacher and the "Take Attendance" button 2408 can be employed by the user 118 to access one or more student rosters assigned to the user 118 and stored in the data store 160. The user 118 can then use the appropriate roster to take attendance and transmit the attendance via network 130 to be recorded as incident data 170 in the data store 160.

Referring to FIG. 24, in some implementations, the application 2100 includes a button 2150 that can be used to access a menu 2602 of additional information that may be relevant to the emergency response 2306 selected from the active incidents page 2300. For example, referring to FIGS. 24 and 26, in response to pressing button 2150, the application 2100 can be configured to display a menu 2602 that provides access to various items of information relevant to the lockout emergency 2306. For example, button 2150 may be used to access one or more emergency management modules integrated with the application 2100.

Figure 27:
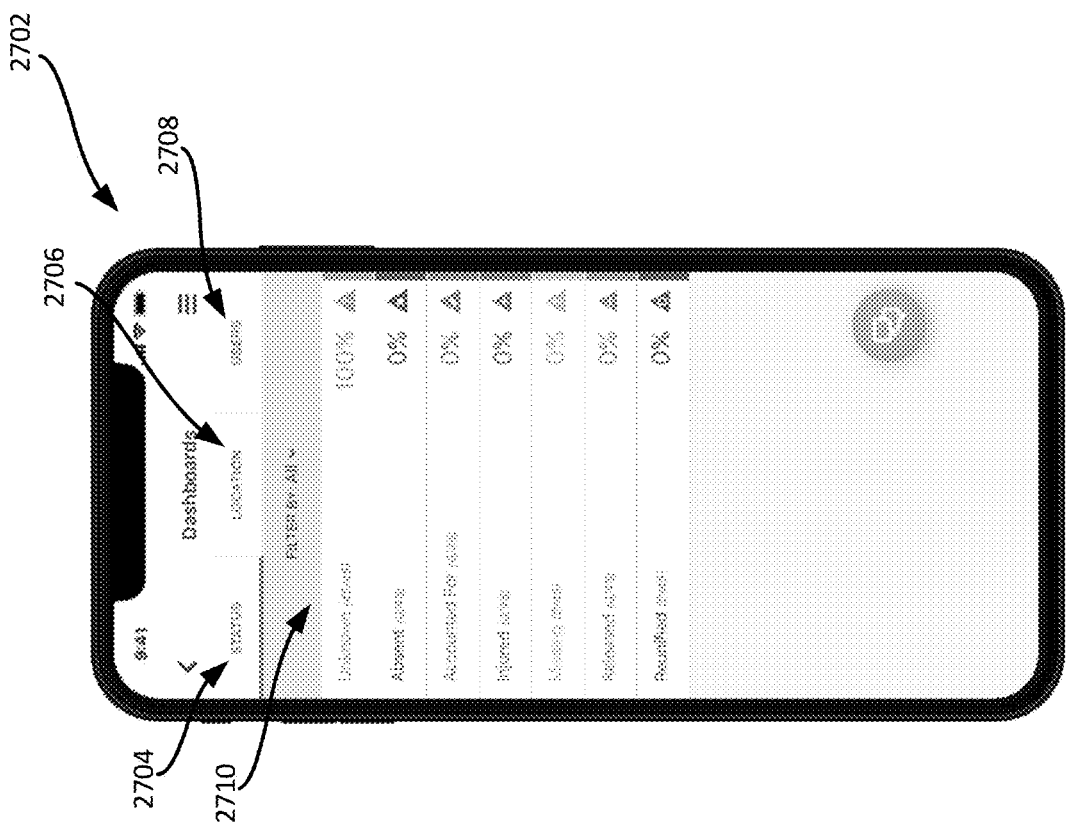

In some implementations, the menu 2602 includes a button 2604 to access one or more dashboards depicting incident data. For example, as depicted in FIG. 27, the button 2604 can provide the user 118 with access to a dashboard page 2702 with tabs 2704, 2706, 2708 for displaying various dashboards. For example, a first tab 2704 is provided for displaying a dashboard 2710 indicating the various statuses of individuals associated with the institution 124. A second tab 2706 is provided for displaying a dashboard indicating the locations of individuals associated with the institution 124. A third tab 2708 is provided for displaying a dashboard indicating the status and/or location of each various users 116, 118 associated with the institution 124. In some implementations, the user dashboard displayed under the third tab 2708 also provides information regarding one or more actions taken by each of various users 116, 118 in assisting with the ongoing emergency response.

Figure 28:
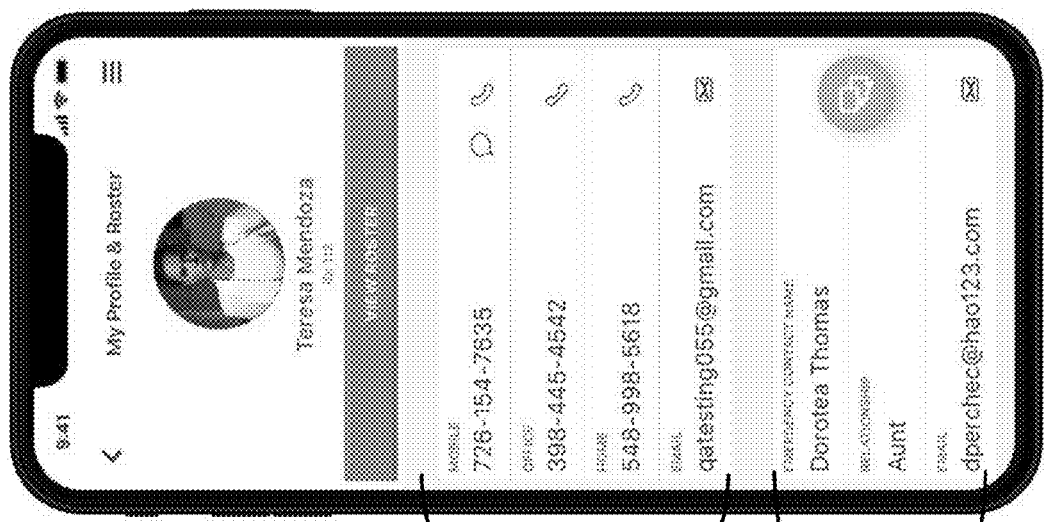

In some implementations, the menu 2602 includes a button 2606 to access a profile and roster corresponding to the user 118. For example, if the user 118 is a teacher, the user 118 can use button 2606 to access her classroom roster. Referring to FIG. 28, button 2606 can also be used to display a profile page 2802 with account information for the user 118 including, but not limited to, the contact information 2804 associated with the user's account (e.g., telephone numbers, email address, etc.) and emergency contact information 2806 for the user 118.

Figure 29:
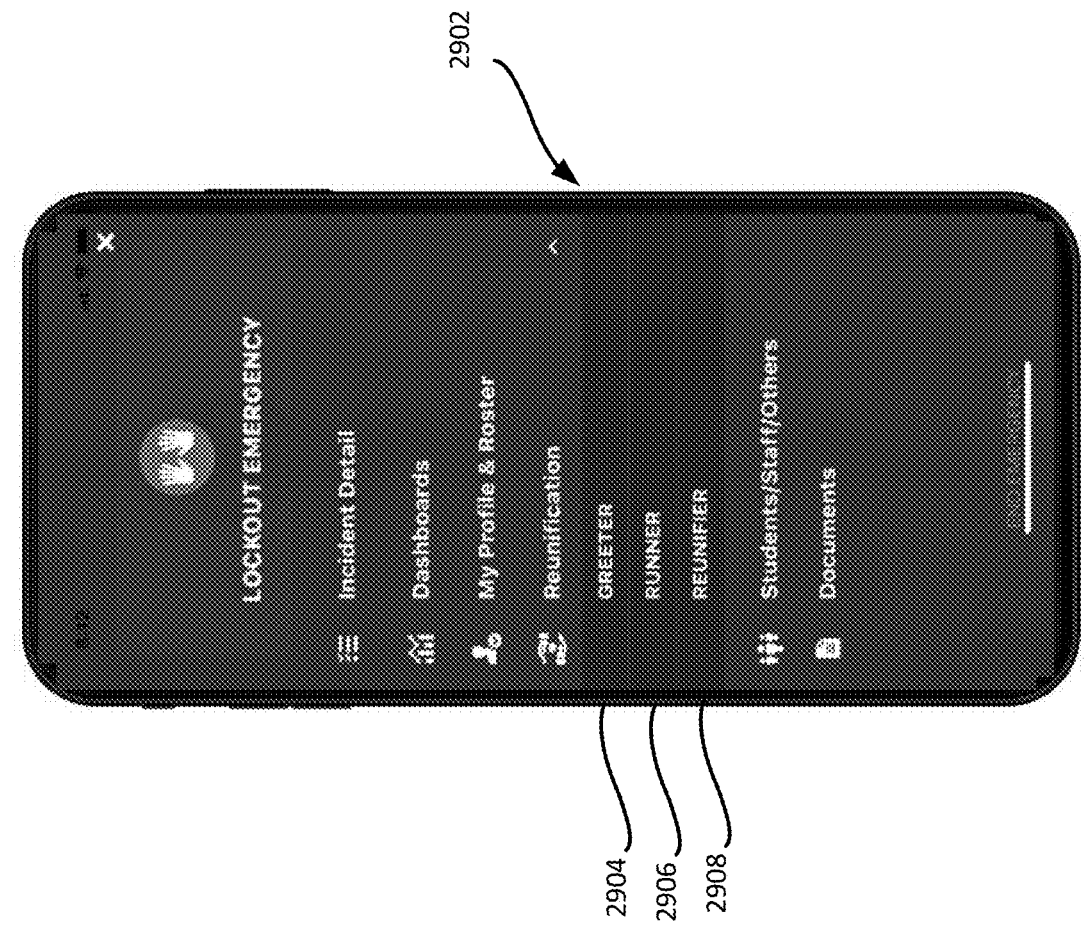

In some implementations, a reunification software module is integrated into the emergency response application 2100 and can be accessed from the application 2100. For example, in some implementations, the menu 2602 includes a button 2608 for initiating a reunification process. For example, button 2608 can be used to access a reunification menu 2902. For example, as depicted in FIG. 29, the reunification menu 2902 can include buttons 2904, 2906, 2908 for the user 118 of the computing device 108 to access a greeter interface, a runner interface, and a reunifier interface, respectively, of a reunification module. The reunification module interfaces accessed using the buttons 2904, 2906, 2908 of the reunification menu 2902 in the application 2100 can enable the user 118 to assist in reunifying a student with a guardian and tracking the reunification process.

Figure 30:
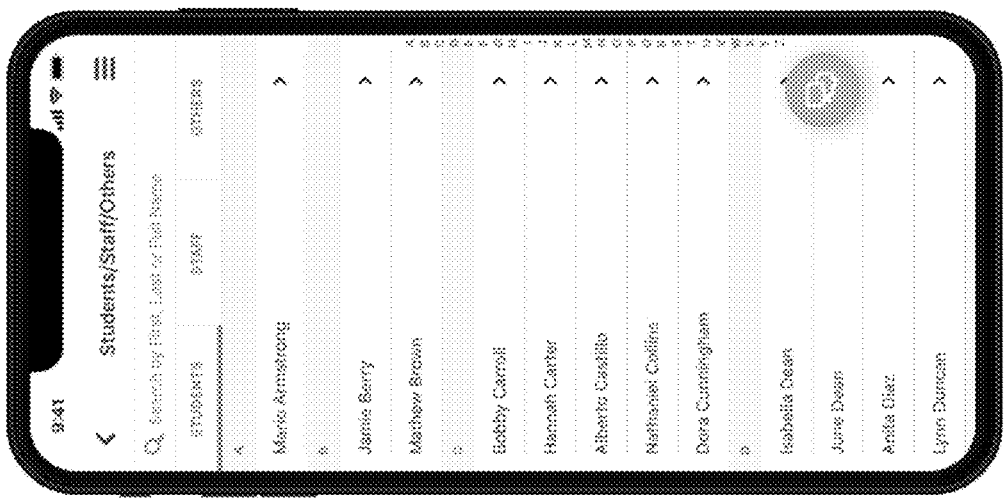

The menu 2602 can also include a button 2610 for accessing a list 3002 of persons (e.g., students, employees, visitors, parents, contractors, volunteers, etc.) associated with the institution 124, as depicted in FIG. 30.

In some implementations, the menu 2602 also includes a button 2612 that provides the user 118 with access, through the application 2100, to one or more documents relevant to the initiated emergency response.

In some implementations, the various items of information accessed through the menu 2602 are stored in the data store 160 and transmitted from the server device(s) 140 to the user's 118 computing device 108 via network 130 in response to the user 118 pressing one or more of the buttons 2604, 2608, 2610, 2612 in the menu 2602.

Figure 26:
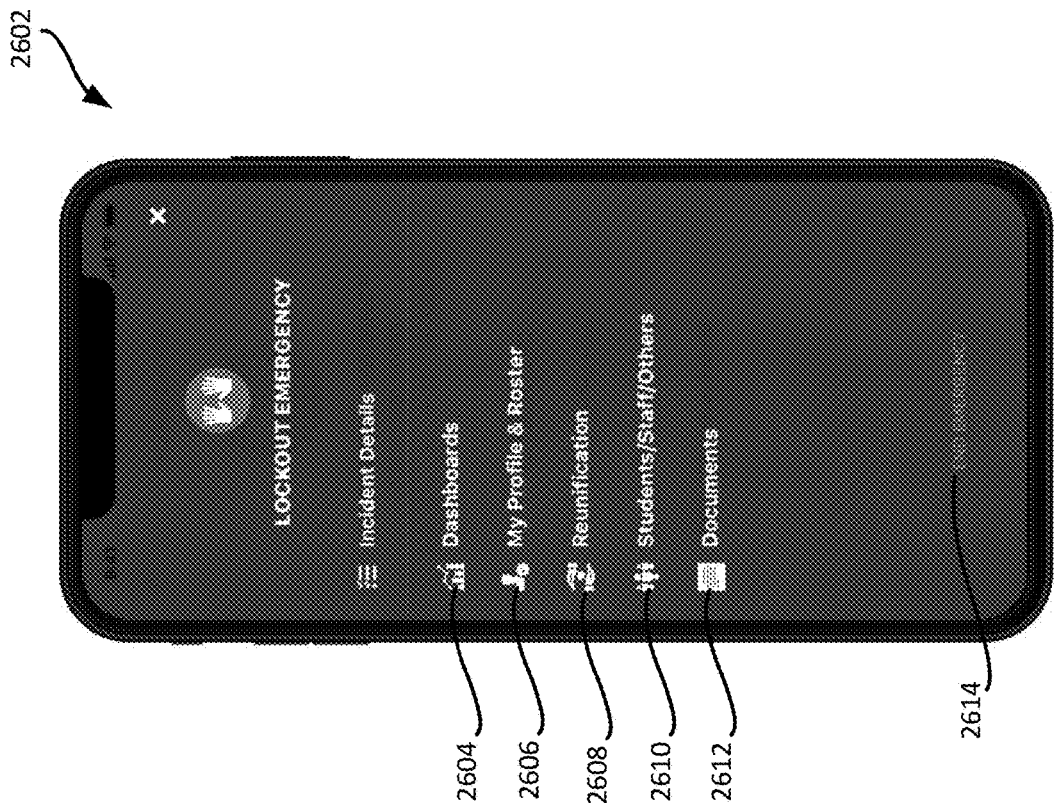
Figure 31:
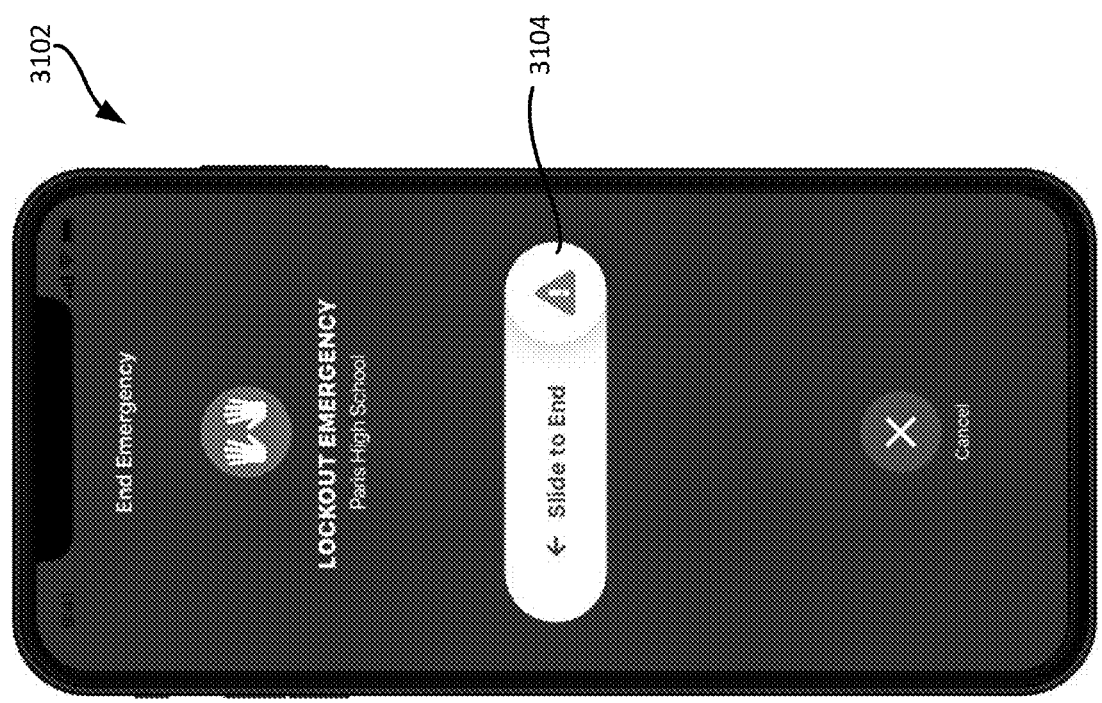

In addition to using the application 2100 to initiate an emergency response, a user can also use the application to end the initiated emergency response. For example, as depicted in FIG. 26, the menu 2602 includes a button 2614 that can be used to end the initiated emergency response 2306 selected from the active incidents page 2300. In some implementations, a confirmation page 3102 is displayed in response to a user's 118 selection of the end emergency button 2614. For example, as depicted in FIG. 31, in response to user 118 pressing the end emergency button 2614 displayed in the menu 2602 for the ongoing lockout emergency 2306, a confirmation page 3102 is displayed and requires the user to slide a slider button 3104 as confirmation of the request to end the emergency response 2306 prior to ending the lockout emergency response 2306.

In some implementations, once an emergency response 2306 has been ended by a user 118, the server device(s) 140 transmit a message to some or all of the users 116, 118 associated with the same institution 124 as user 118 indicating that the emergency response 2306 has ended. In some implementations, once ended, the emergency response 2306 is removed from the active incidents page 2300 of the application 2100 for all users 116, 118 associated with the institution 124 for which the emergency response 2306 was initiated. In some implementations, any incident data provided to the respective user computing device 106, 108 as part of the initiated emergency response 2306 is automatically deleted from the device 106, 108 once the emergency response 2306 has ended to ensure data privacy and security is maintained. In some implementations, once an emergency response 2306 has been ended by a user 118, the server device(s) 140 transmit an integrated API, JSON, or CAP message to the external systems associated with the institution 124 (such as, such as surveillance systems, fire panel systems, and public address (PA) systems associated with the institution 124 and/or other external emergency management systems) notifying the external systems of the ending of the emergency response 2306.

In some implementations, the emergency response policy for an institution 124 can designate particular users 116, 118 permissions to initiate and/or end an emergency response using the application 2100. For example, as previously discussed, in some implementations the users 116, 118 associated with an institution 124 can be assigned a role, and permissions to initiate an emergency response or cancel an emergency response can be outlined in the emergency response policy for the institution 124 based on user roles. For example, institution 124 may be a school and the users 116, 118 associated with the institution 124 may be assigned to either a teacher role or an administrator role. The emergency response policy may specify that only administrators are granted permission to initiate or end an emergency response. As such, only users 116, 118 assigned an administrator role will be able to use the application 2100 to initiate or end an emergency response. Other users of the application (e.g., those assigned a teacher role) may be able to use other features of the application 2100, such as viewing the incident details page 2400 and menu 2602 of incident information, but cannot initiate an emergency response or end an emergency response using the application 2100. In some implementations, all users 116, 118 associated with the institution 124 can initiate an emergency response, end an emergency response for the institution 224 using the application 2100, or any combination thereof.

In addition the initiating and managing emergency responses, the application 2100 can be used to initiate and manage a team assist event. Team assist events can include any events that are more localized than emergencies and do not relate to the entire institution 122, 124. As can be seen in FIG. 21, in some implementations, the application 2100 includes a button 2120 on the home screen 2106 of the application 2100 to initiate a team assist event.

Figure 32:
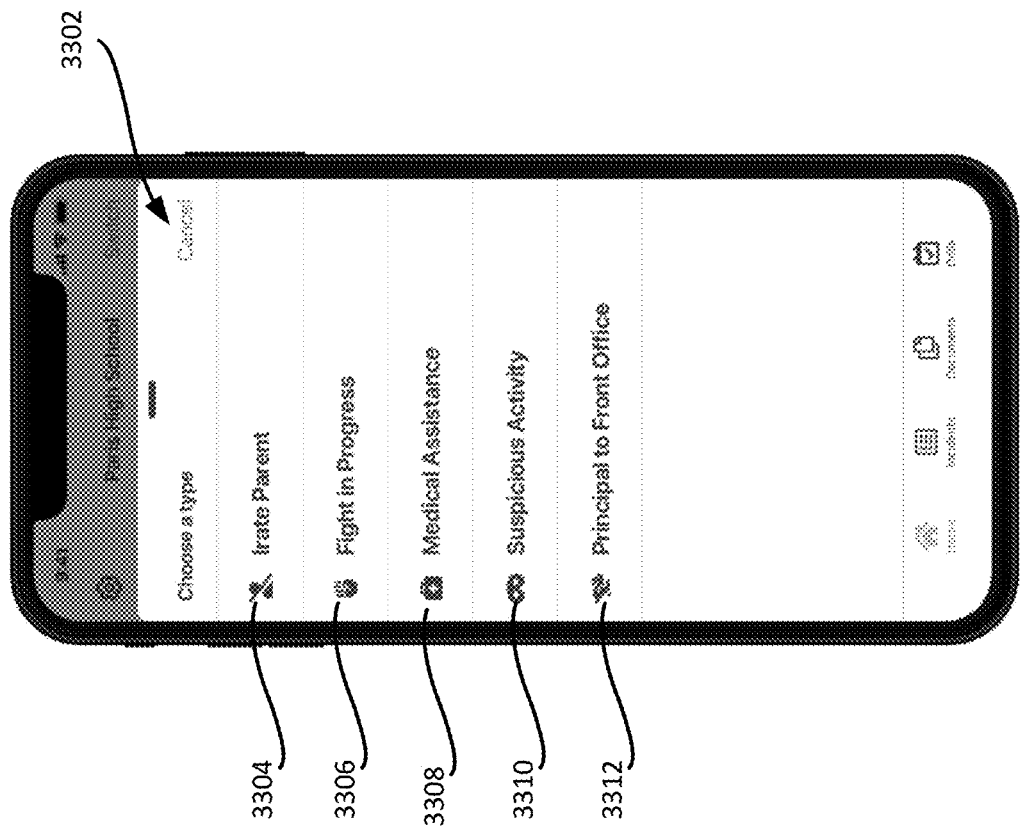

Referring to FIGS. 21 and 32, in response to a user 118 pressing the team assist button 2120 on the home screen 2106, the application 2100 displays a team assist selection window 3302. As can be seen in FIG. 32, the team assist selection window 3302 includes buttons for various team assist events that can be initiated. For example, the team assist selection window 3302 includes an irate parent event button 3304, a fight in progress event button 3306, a medical assistance event button 3308, a suspicious activity event button 3310, and a principal to front office button 3312.

In some implementations, an institution 124 can customize and define one or more team assist events that can be initiated using the application 2100. For example, in some implementations, a customization user interface can be provided to a user representing an institution 124 and the customization interface can be used to select and/or define one or more team assist events that can be initiated for the institution 124 using the application 2100. In some implementations, the application 2100 can be configured such that one or more team assist events are only displayed through a web-based interface of the application 2100 or through a mobile interface of the application 2100.

In addition, as will be described in further detail below, one or more users can be designated as a recipient for notifications regarding a particular team assist event type. For example, for a "principal to office" team assist event type, the data store can identify a user designated as a principal of the institution 124 as the recipient of the notifications for "principal to office" team assist events.

Figure 33:
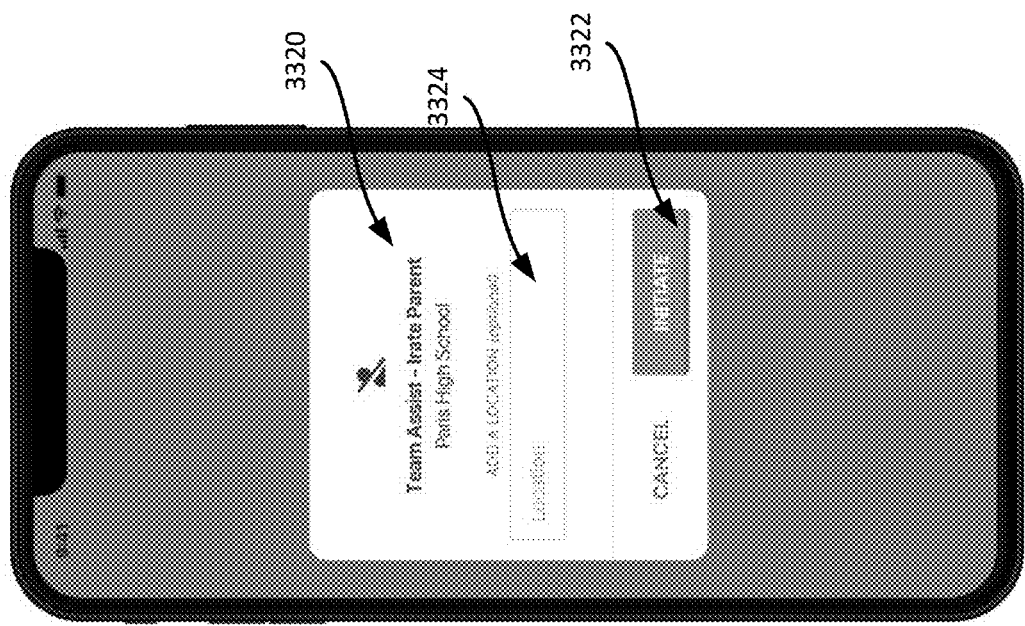
Figure 34:
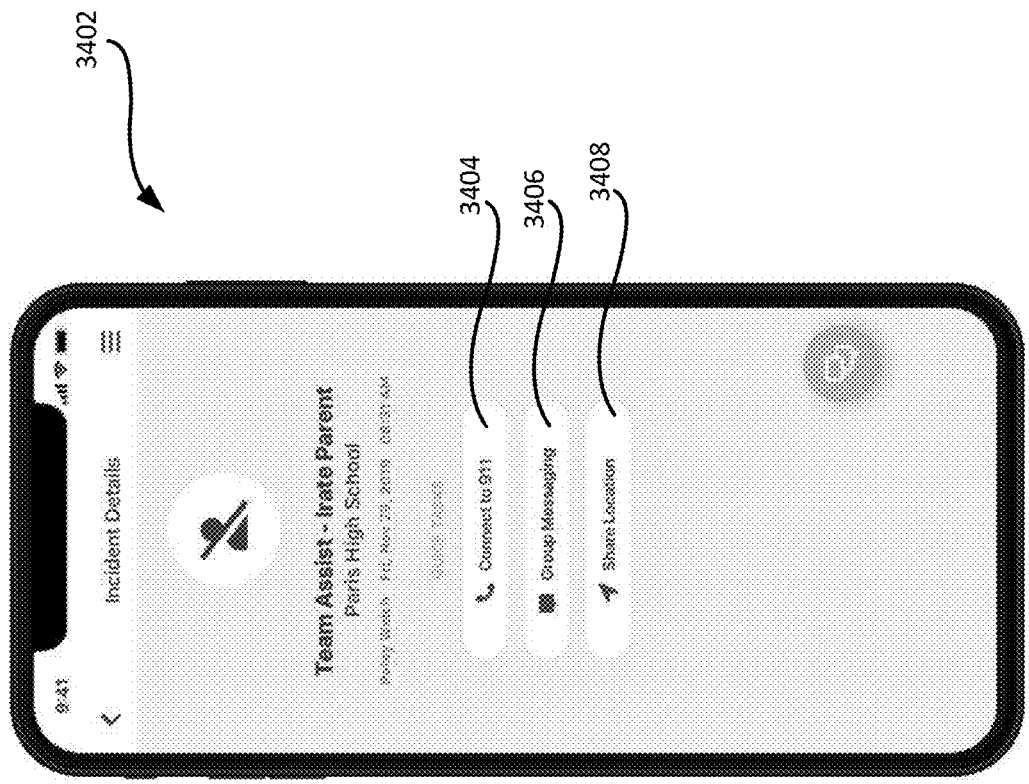

Referring to FIG. 33, a team assist event is initiated in response to a user's selection of one of the team assist event buttons 3304, 3306, 3308, 3310, 3312 provided in the team assist selection window 3302. For example, as depicted in FIG. 34, in response to a user's selection of the irate parent event button 3304, a confirmation page 3320 is displayed in the application 2100 with a button 3322 to initiate the irate parent team assist event.

As can be seen in FIG. 33, in some implementations, the confirmation page 3320 also includes an entry box 3324 for the user 118 to enter the location of the selected team assist event. For example, the user 118 can use the entry box 3324 to indicate the current location of the person that is the subject of the irate parent event. In some implementations, the location for the team assist event provided in entry box 3324 is included in a notification message notifying one or more users 116, 118 of the team assist event.

In some implementations, an institution 124 can designate particular users 116, 118 as having permission to initiate a team assist event using the application 2100. For example, as previously discussed, in some implementations the users 116, 118 associated with an institution 124 can be assigned a role, and permissions to initiate team assist event can be assigned based on user roles. For example, institution 124 may be a school and the users 116, 118 associated with the institution 124 may be assigned to either a teacher role or an administrator role. The protocol defined by the institution for a particular team assist event type may specify that only administrators are granted permission to initiate the particular type of team assist event. As such, only users 116, 118 assigned an administrator role will be able to use the application 2100 to initiate the particular type of team assist event. Other users of the application (e.g., those assigned a teacher role) may be able to use other features of the application 2100, such as viewing the incident details page 3402 (as depicted in FIG. 34), but cannot initiate the particular type of team assist event using the application 2100. In some implementations, all users 116, 118 associated with the institution can initiate any team assist event for the institution 224 using the application 2100.

Referring to FIG. 1, in response to a user 118 initiating a team assist event using the application 211, a signal is transmitted from the computing device 108 to the server device(s) 140 of the incident management service 142 indicating the particular team assist event initiated by the user 118. Based on receiving a signal from a computing device 108 indicating initiation of a particular team assist event, server device(s) 140 access data store 160 to determine the stored association between the user 118 and a particular institution 124. Once the institution 124 associated with the initiating user 118 is determined, a policy for the institution 124 defining the protocol for the particular team assist event type can be retrieved from the data store 160, and the team assist event protocol can be initiated across one or more computing devices 106, 108 associated with the institution 124.

In some implementations, notifications are automatically sent to one or more recipients in accordance with an institution's 124 stored protocol for the particular type of team assist event initiated by the user 118. For example, in some implementations, an institution 124 can designate a list of recipients to receive notifications based on team assist event type. In addition, the institution 124 can generate a template notification for each type of team assist event, and can designate a list of recipients to receive a notification for each team assist event type. The users designated to receive notifications for each team assist event type can be stored in the data store 160 and accessed by the server device(s) 140 in response to the server device(s) receiving a signal indicating that a user 118 of the institution 124 has initiated an a particular type of team assist event. In some implementations, if the user 118 initiating the team assist event provides a location for the event using entry box 3324 at initiation, the location information provided by the initiating user 118 using the entry box 3324 is included in the team assist event notification.

The notifications transmitted by the server device(s) 140 indicating the initiation of a team assist event can be any suitable type of notification format including, but not limited to, email messages, SMS text message, and voice messages. In some implementations, the computing devices 106, 108 of the one or more users 116, 118 identified as recipients for a particular notification will receive the notification automatically as a push notification. The notification messages can be transmitted from server device(s) 140 of the data center 180 to the computing devices of the one or more designated recipients over the network 130.

As previously discussed, in some implementations, each user 112, 114, 116, 118 of the application 2100 for a particular institution 122, 124 is assigned a particular role, and the recipients for notifications are determined based on roles of the users. For example, an institution 124 may be a school and users 116, 118 corresponding to the institution 124 may be assigned to a teacher role or an administrator role. An institution 124 may define a first protocol corresponding to a first team assist event type and second protocol corresponding to a second team assist event type. The institution 124 may further define administrator role users as being recipients of notifications for the first team assist event type and all users as being recipients of notifications for the second team assist event type. As a result, when a user 116, 118 associated with the institution 124 uses the application 2100 to initiate an team assist event of the first type, only users associated with the institution 124 that have been assigned the administrator role will receive the notification of the initiated team assist event. If a user 116, 118 associated with the institution 124 uses the application 2100 to initiate a team assist event of the second type, all users 116, 118 associated with the institution 124 will receive the notification of the initiated team assist event, regardless of role.

In some implementations, the role assigned to each user 116, 118 and stored in the data store 160 is based on roles of personnel listed in a predefined directory provided to the data center 180 by the institution 124. In some implementations, if an institution updates its directory to revise the role of one or more persons, the roles of the corresponding application users 116, 118 stored in the data store 160 are automatically updated to align with the roles listed in the updated directory.

In response to initiation of a team assist event, the initiated team assist event is added to the active incidents page 2300 under the team assists tab 2304, as depicted in FIG. 23. In some implementations, multiple team assist events can be simultaneously initiated for a single institution 124 and added to the active incidents page 2300.

The incident details page for a particular team assist event can be accessed through the active incidents page 2300 by any user 116, 118 of the application 2100 associated with the institution 124. For example, FIG. 34 depicts an incident details page 3402 for the irate parent event initiated by the user 118. As can be seen in FIG. 34, the incident details page 3402 includes a button 3404 to place a call to an emergency service provider. For example, in response to a user 118 pressing button 3404, a call is placed to a public-safety answering point (PSAP) (e.g., a 9-11 call) using the network of the user's computing device 108. In some implementations, in response to a user pressing button 2402, a call is automatically placed with a public-safety answering point corresponding to the user's current location using the computing device's native operating system dialer.

In some implementations, the incident details page 3402 includes a button 3406 to provide the user with access to a group messaging feature of the application 2100. The group messaging feature allows users of the application 2100 to provide messages to one or more predefined groups of application users. The group messaging feature of the application 2100, which can be accessed using button 3406, is described above in reference to FIGS. 24 and 25A-25C.

In some implementations, as depicted in FIG. 34, the incident details page 3402 includes a "Share Location" button 3408 that a user 118 can use to share their current location with other users (e.g., user 116) of the application 2100. For example, using computing device 108, user 118 can press the "Share Location" button 3406 to share the location of the computing device 108 with one or more other users of the application 2100 associated with the same institution 124 as user 118 (e.g., user 116). In some implementations, the location of a computing device 108 shared using the "Share Location" button 3406 is transmitted to a predetermined group of users stored in the data store 160 of the data center 180. For example, each of the application 2100 users associated with a particular institution 124 can also be associated with a particular role (e.g., teacher, administrator, parent, etc.), and the application 2100 can be configured to transmit a user's 118 shared location to only users of the application 2100 assigned to a particular role (e.g., administrator users) when the user's 118 location is shared using the "Share Location" button 3406.

In some implementations, the application 2100 can be configured to automatically transmit the location of the computing device 108 used to initiate a team assist event to other users 116 of the application 2100 upon initiation of the team assist event. For example, in response to a user 118 initiating team assist event using the application 2100, the location of the computing device 108 used to initiate the team assist event is automatically transmitted to server devices(s) 140 via network 130, and server device(s) 140 transmits the location information to one or more users 116 of the application 2100 associated with the same institution 124 as the initiating user 118. In some implementations, the emergency response policy selected for an institution 124 defines whether or not a user's 116, 118 location is automatically shared in response to initiation of one or more of the team assist events.

In some implementations, the location information for a computing device 108 is transmitted to the server device(s) 140 and/or other users as a map of the current location of the computing device 108. In some implementations, the location information for a computing device 108 is transmitted to the server device(s) 140 and/or other users as GPS coordinates corresponding to the location of the computing device 108. For example, if the user 118 of the computing device 108 is located in a large building, such as a large school campus, during the team assist event, the coordinates of the user's computing device 108 can be transmitted to one or more other users of the application 2100, such as administrator users of the institution 124 or emergency responders, to enable a more efficient team assist event. For example, based on the coordinates of the user's computing device 108, the location of the user's computing device 108 can be depicted on a mapping interface that is shared with one or more other users.

In some implementations, the location of the user's computing device 108 may be different than the location provided in the entry box 3324 at initiation of the team assist event by the initiating user 118. For example, upon noticing an incident, a user 118 may initiate a team assist event and indicate a location where the incident is occurring using entry box 3324 and may walk away from the incident. As a result, the current location of the user's computing device 108 may be different than the location of the incident indicated using the entry box 3324.

In some implementations, the application 2100 determines the location of an initiating user's computing device at the time an emergency response or team assist event is initiated, and controls the response or event partially based on the user's location. For example, in some implementations, an institution 124 can define a geographic boundary ("geofence") within which all emergency responses and/or team assist events can be initiated without review by personnel. In addition, the institution 124 can select one or more users to act as reviewers for emergency responses and team assist events initiated outside the institution's geofence, and the list of designated reviewers can be stored in the data store 160 of the data center 180.

As such, whenever a user 118 associated with the institution 124 initiates an emergency response or a team assist event, the user's 118 computing device 108 transmits a signal to the server device(s) 140 indicating the location of the computing device 108 (e.g., GPS location), and the server device(s) 140 determine whether or not the computing device 108 is located within the geofence set by the institution 124 and stored within the data store 160. If the server device(s) 140 determine that the computing device 108 was located within the institution's geofence at the time the emergency response or team assist event was initiated, notifications regarding the emergency response or team assist event are automatically transmitted in accordance with the institutions emergency response policy, as described above. However, if the server device(s) 140 determine that the computing device 108 was located outside of the institution's geofence at the time the emergency response or team assist event was initiated, a notification regarding the initiated emergency response or team assist event will only be sent to the one or more user(s) 116, 118 designated as reviewers by the institution 124, as identified in the data store 160.

In some implementations, the notification sent to user(s) 116, 118 designated as reviewers by the institution 124 in response to an emergency event or team assist event initiated outside the geofence of the institution 124 includes the location of the initiating computing device 108 at the time of initiation. In some implementations, the notification that is sent to designated reviewer(s) in response to an emergency event or team assist event initiated outside the geofence of the institution 124 includes a button which the reviewers can use to confirm the emergency response or team assist event, or cancel the emergency response or team assist event. In some implementations, if one or more of the reviewers confirms the emergency response or team assist event, the emergency response or team assist event proceeds with initiation throughout the system and notifications regarding the emergency response or team assist event are distributed in accordance with the institution's 124 emergency response policy, as described above. In some implementations, if one or more of the reviewers confirms the emergency response or team assist event, the emergency response or team assist event proceeds within the system, but does not result in notifications being provided to the entire institution 124. In some implementations, if one or more of the reviewers confirms the emergency response or team assist event, the initiating user 118 is prompted to cancel and re-initiate the emergency response or team assist event in for the emergency response or team assist event to proceed with initiation throughout the system.

Conversely, if one or more of the reviewers cancels the emergency response or team assist event (e.g., because the reviewer determines that the response or event was initiated by accident), further notifications regarding the emergency response or team assist event are not transmitted to other users 116, 118.

In some implementations, the application 2100 can use the location of the user device at the time the emergency response application is accessed in order to determine the appropriate context for the application 2100. For example, a user 116 can be associated with two buildings within an institution 124, such as "Building A" and "Building B" of institution 124. Based on the location of the user device 106 when the user 116 accesses the application 2100, the application 2100 can determine whether to present the application configuration for Building A or the application configuration for Building B on the user device 106 based on whether the user 116 is presently located in Building A or Building B. For example, if the user device 106 is currently located within a geofence designated for Building A when the application 2100 is opened on the user device 106, the application 2100 will display a configuration for initiating and managing an emergency response for Building A. If the user 116 changes location during the day such that the user device 106 is later located within the geofence designated for Building B, the application 2100 is automatically updated to display a configuration for initiating and managing an emergency response for Building B.

In some implementations, the one or more building or locations within a particular institution 124 that are associated with a user 116 are stored in the data store 160 and are based on buildings or locations that are listed as being associated with the user 116 in a directory provided to the data center 180 by the institution 124. In some implementations, if an institution 124 updates its directory to revise the building(s) associated with one or more persons, the buildings associated with the corresponding users 116, 118 stored in the data store 160 are automatically updated to align with the building associations listed in the updated directory.

Figure 54:
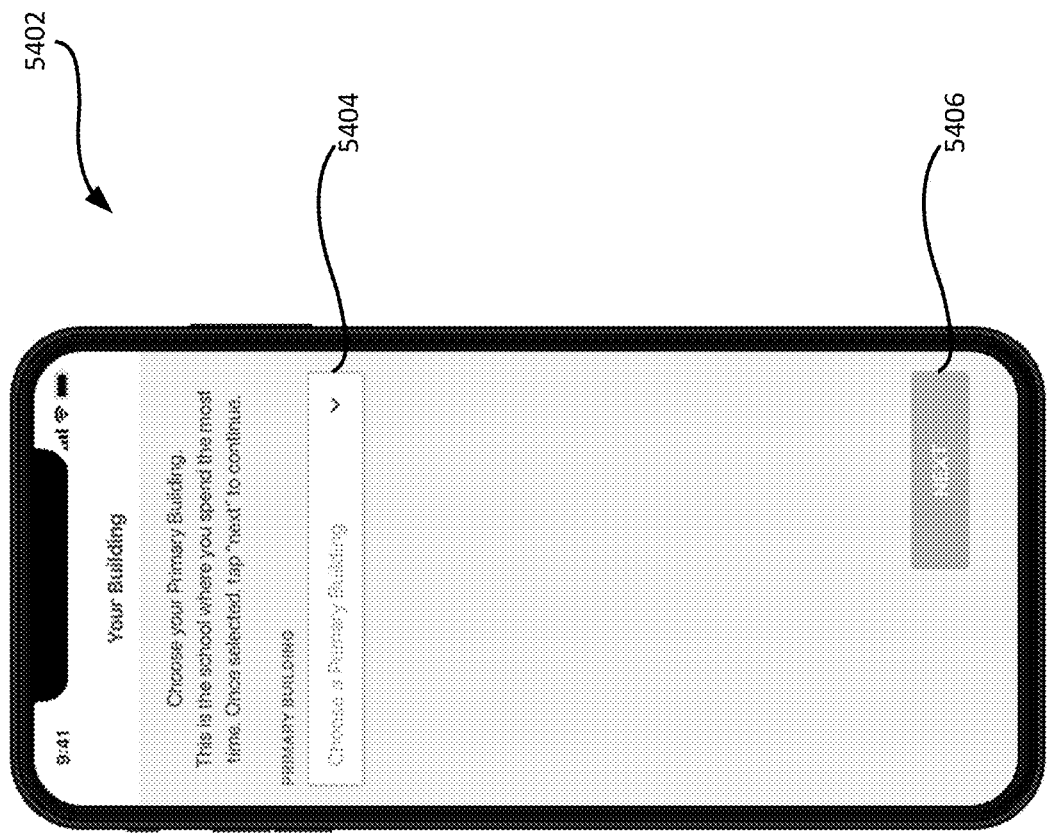
FIGS. 54 and 55 depict an example process for designating one or more locations for a user of an emergency response application in accordance with implementations of the present disclosure.

In some implementations, if the data store 160 or user device 106 does not have stored information regarding the building(s) associated with the user 116, the application 2100 will prompt the user 116 to provide this information. For example, referring to FIG. 54, in response to determining that the data store 160 and user device 106 do not have stored information regarding the building(s) associated with the user 116, the application 2100 presents the user 116 with a user interface 5402 prompting the user 116 to select a "primary building" at which the user spends the most time. The user interface 5402 includes a drop down menu 5404 that lists each of the buildings of the institution 124 associated with the user 116.

Figure 55:
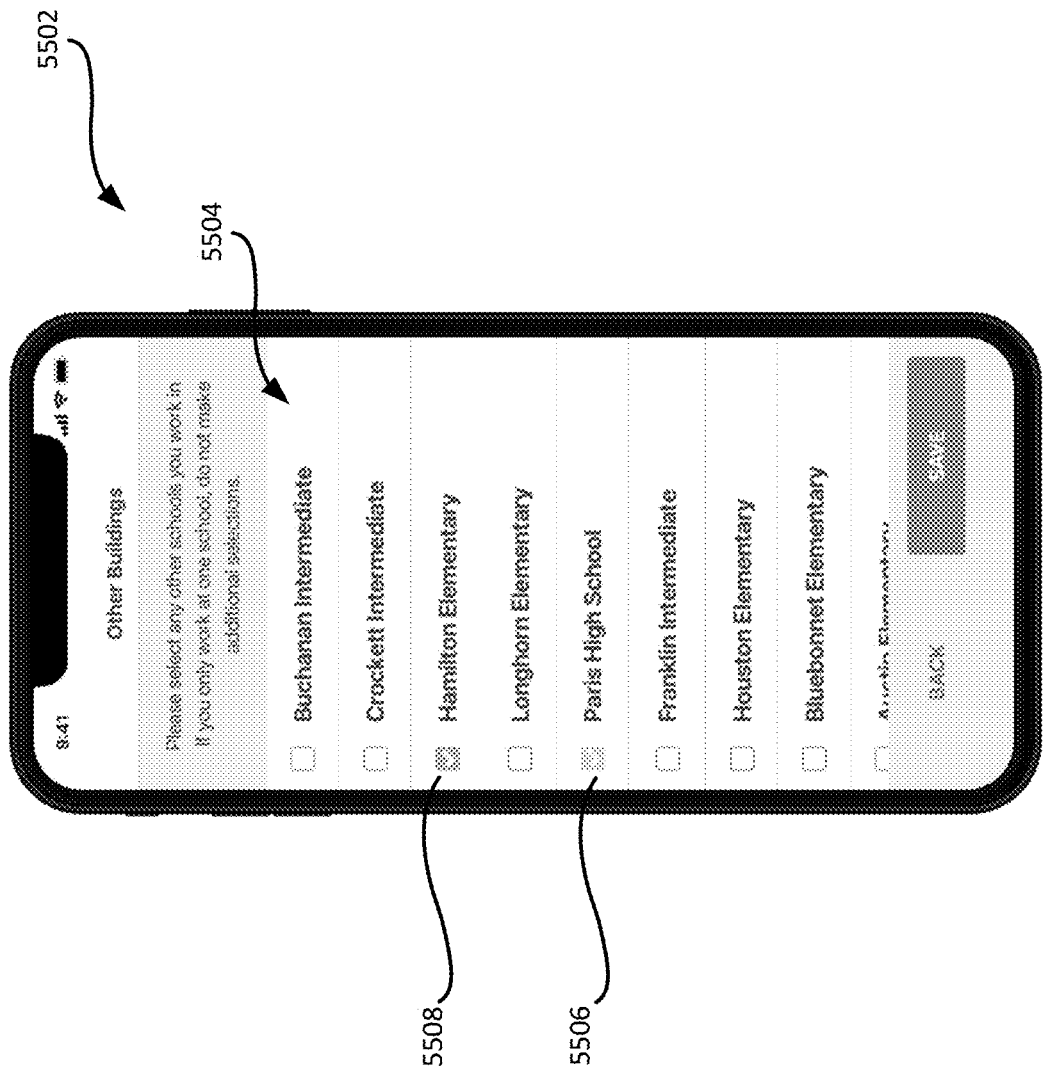

Once a "primary building" is selected from the drop down menu 5404, the user 116 can select the "Next" button 5406 to access a user interface 5502 for selecting one or more additional buildings associated with the user 116. For example, FIG. 55 depicts a user interface 5502 for selecting one or more buildings associated with the user 116 in addition to the primary building selected on user interface 5402. The user interface 5502 includes a list 5504 of the buildings associated with the particular institution 124 associated with the user 116. As can be seen in FIG. 55, the primary building 5506 selected using user interface 5402 is already checked on the list 5504, and the user 116 can select one or more other buildings associated with the user 116 from the list 5504. Once the user 116 has selected all of the buildings 5506, 5508 associated with the user 116, the user 116 can select the "Save" button to save the user's selection of associated buildings. In some implementations, the buildings 5506, 5508 identified as being associated with the user 116 (and thus the associated user device 106) are stored locally on the user device 106. In some implementations, the buildings 5506, 5508 associated with the user 116 (and thus the associated user device 106) are stored on a remote data store 160 and can be accessed by the application 2100 via network 130.

In some implementations, the application 2100 can be used to manage emergency response drills and track an institution's 124 with the scheduled drills. For example, as depicted in FIG. 21, in some implementations the home screen 2106 of the application includes a Drills button 2130 that can be used to access a schedule of drills planned for an institution 224. For example, the institution 124 can provide a schedule of upcoming emergency response drills to be performed, and the application 2100 can include a list of the scheduled drills in a drills page 3502. In some implementations, the emergency response policy defines the drill schedule for the institution 124. In some implementations, the application 2100 is integrated with a drill manager module that can be used to track and record emergency response drills scheduled for and/or performed by the institution 124.

Figure 35:
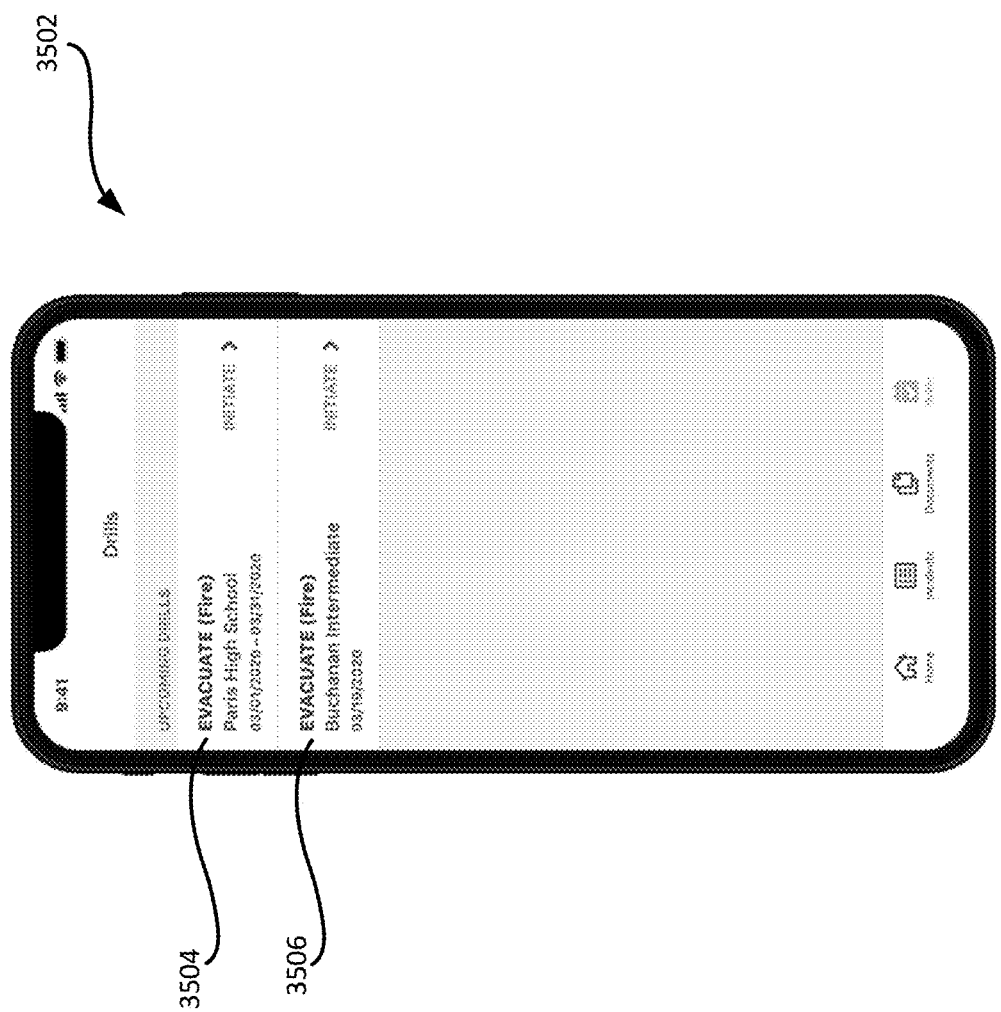

FIG. 35 depicts a drills page 3502 listing each of the upcoming drills 3504, 3506 scheduled to be performed by the institution 124. In some implementations, the drill page 3502 provides information regarding each scheduled drill, such as the scheduled date or date range for performing the drill, and a location (e.g., building) for the drill.

Figure 36:
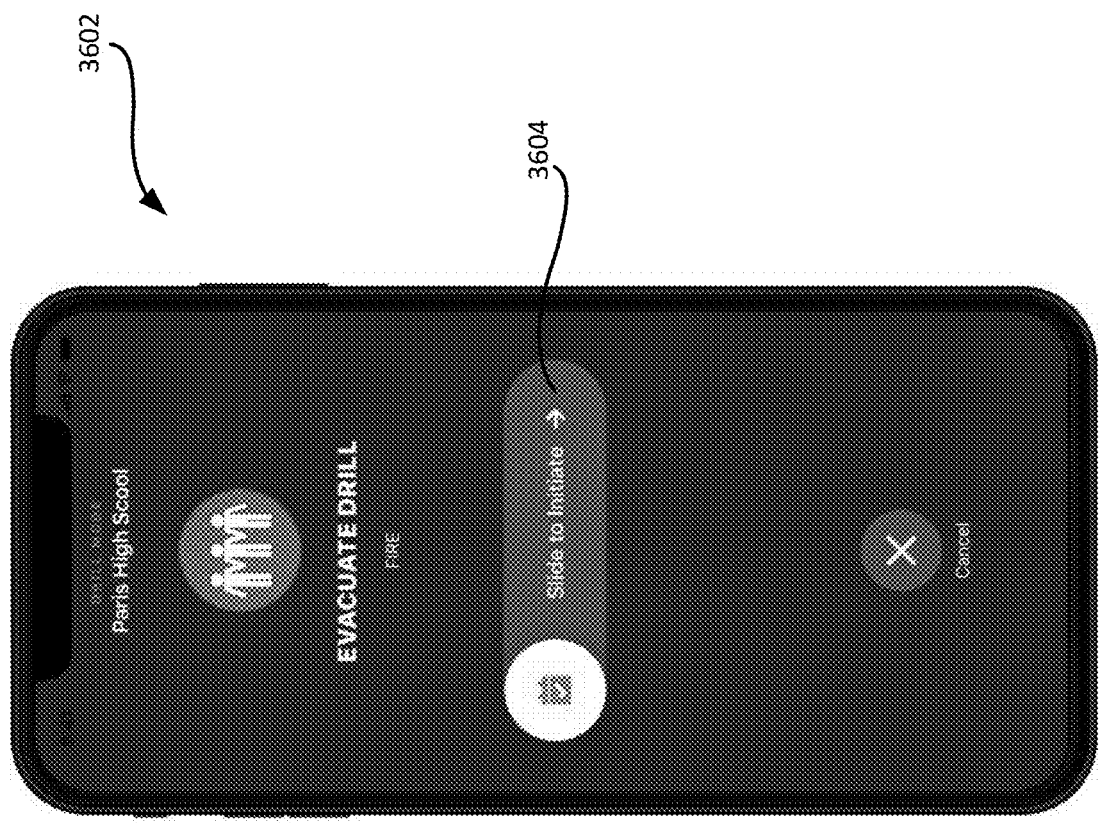

In some implementations, a drill can be executed by selecting one of the drills 3504, 3506 from the drill page 3502. For example, in response to a selection of the evacuate drill 3504, a drill initiation page 3602 with a confirmation button 3604 is presented within the application 2100, as depicted in FIG. 36.

In some implementations, an institution 124 can define one or more custom drills that can be initiated and executed using the application 2100. For example, an institution 124 can define and schedule drills for other events such as defibrillator checks and health kit checks and can utilize the application 2100 to manage compliance with these custom drills. In some implementations, the application 2100 is integrated with a compliance manager module to manage and track the institution's 124 compliance with the scheduled drills for the custom events defined for the institution 124.

In response to a user's 118 confirmation of drill initiation using the confirmation button 3604, the selected drill 3504 is executed within the system. For example, in response to receiving a signal that the evacuate drill 3504 has been initiated, the server device(s) 140 transmit one or more notifications to users 116, 118 according to the evacuate protocol defined in the emergency response policy for the institution 124.

Figure 37:
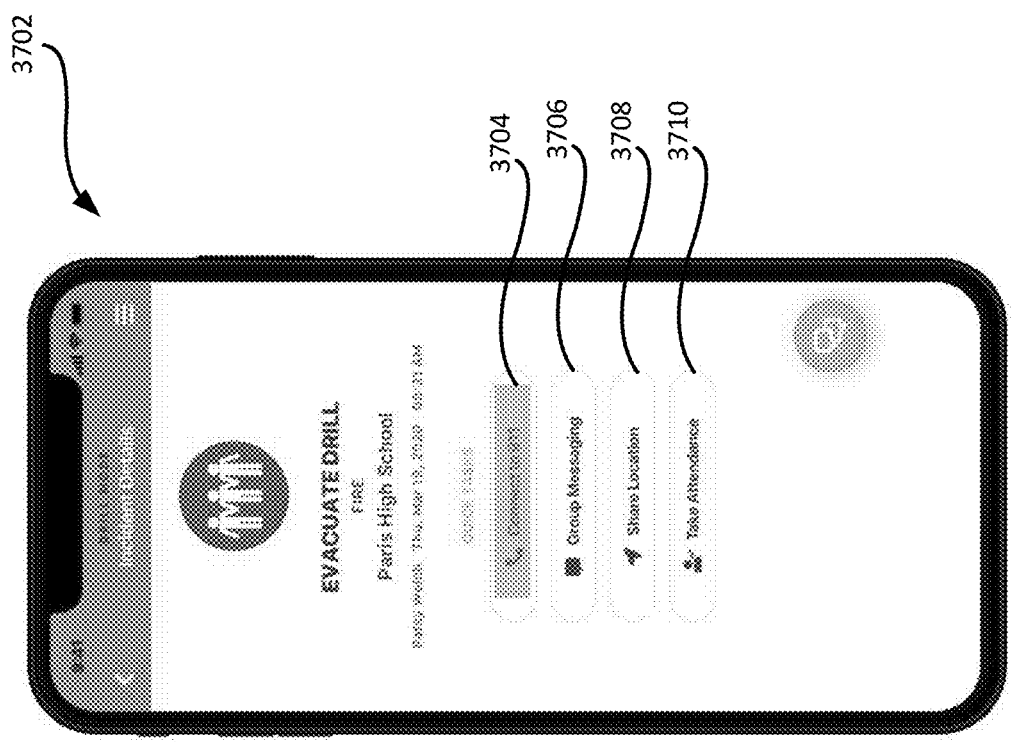

As depicted in FIG. 37, once the drill 3504 is initiated, the application 2100 presents users 116, 118 with a drill mode incident details page 3702 with the same features 3704, 3706, 3708, 3710 as those presented in the corresponding incident details page for the corresponding emergency response. For example, the drill mode incident details page 3702 for the evacuate response drill 3504 a group messaging feature 3706, a share location feature 3708, and an attendance feature 3710. As can be seen in FIG. 37, the drill mode incident details page 3702 for the evacuate response drill 3504 can also include emergency calling button 3704 that is shaded out and disabled in order to represent the emergency calling feature available for the corresponding evacuate emergency response. However, the emergency calling button 3704 depicted in the drill mode incident details page 3702 for the evacuate response drill 3504 cannot be operated to initiate an emergency call during drill 3504. The shading on the emergency calling button 3704 indicates that the emergency calling feature is disabled for the drill mode.

In some implementations, the emergency response policy for an institution 124 can designate particular users 116, 118 as having permission to initiate and/or cancel a drill using the application 2100. For example, as previously discussed, in some implementations the users 116, 118 associated with an institution 124 can be assigned a role, and permissions to initiate a drill or cancel a drill can be outlined in the emergency response policy for the institution 124 based on user roles. For example, institution 124 may be a school and the users 116, 118 associated with the institution 124 may be assigned to either a teacher role or an administrator role.

The emergency response policy may specify that only administrators are granted permission to initiate or end a drill. As such, only users 116, 118 assigned an administrator role will be able to use the application 2100 to initiate or end a drill. Other users of the application (e.g., those assigned a teacher role) may be able to use other features of the application 2100, such as viewing the drill mode incident details page 3702, but cannot initiate an drill or end n drill using the application 2100.

In some implementations, once a drill 3504 has been ended, the server device(s) 140 transmit a message to some or all of the users 116, 118 associated with the same institution 124 indicating that the drill 3504 has ended. In some implementations, once ended, the drill 3504 is removed from the drill mode incident details page 3702 of the application 2100 for all users 116, 118 associated with the institution 124 for which the drill 3504 was initiated. In some implementations, once a drill 3504 has been ended by a user 118, the server device(s) 140 transmit an integrated API, JSON, or CAP message to the external systems associated with the institution 124 (such as, such as surveillance systems, fire panel systems, and public address (PA) systems associated with the institution 124 and/or other external emergency management systems) notifying the external systems of the ending of the drill 3504.

In some implementations, the application 2100 includes a practice mode that allows users 116, 118 associated with an institution 124 to explore the features of the application 2100 without the transmission of notifications defined in the emergency response policy for the institution 124. In some implementations, 9-1-1 calling features provided through the application 2100 are disabled when the application is in practice mode.

Figure 38:
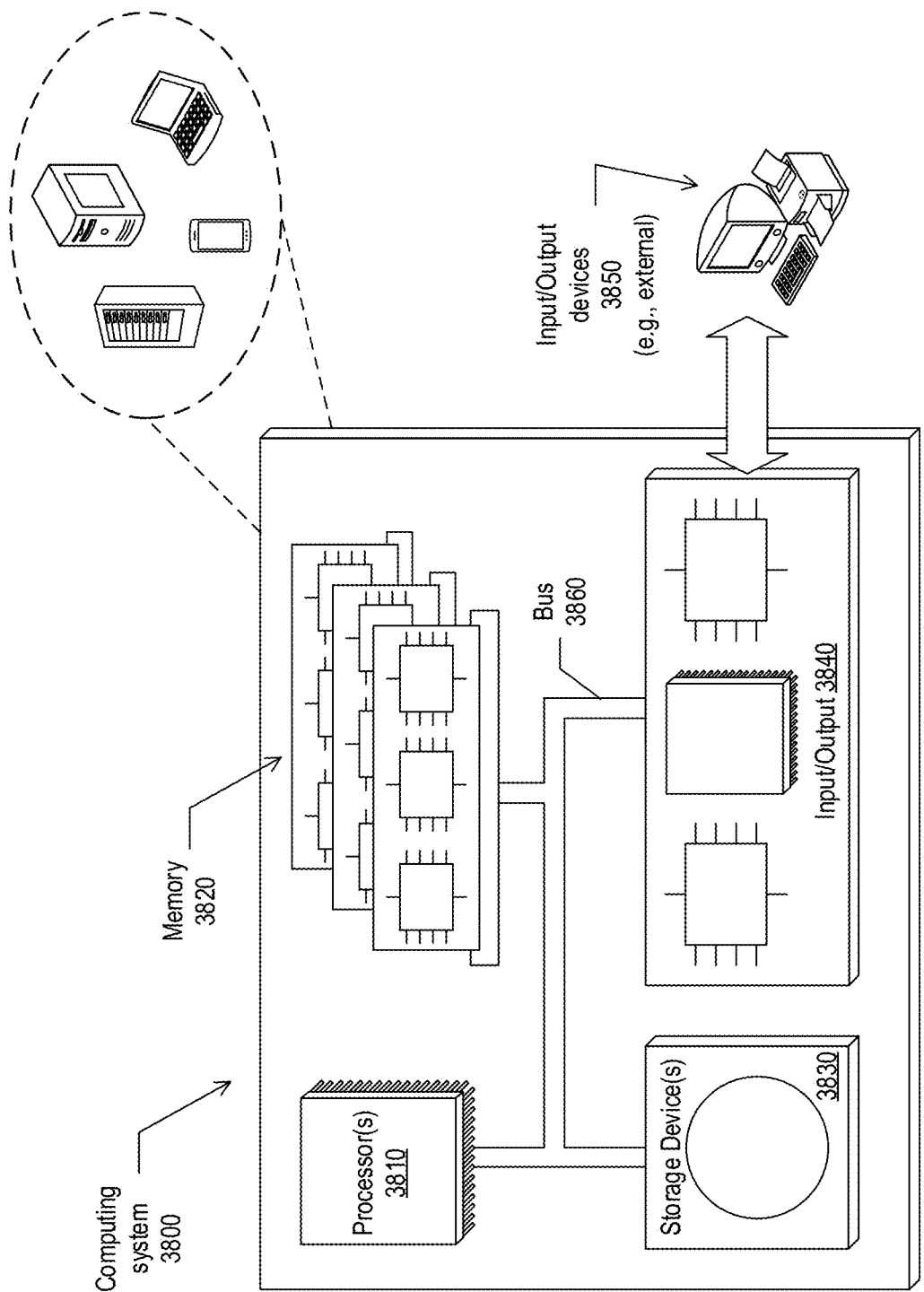
FIG. 38 depicts an example computing system architecture in accordance with implementations of the present disclosure.

FIG. 38 depicts an example computing system 3800 in accordance with implementations such as those of the present disclosure. The system 3800 may be used for any of the operations described with respect to the various implementations discussed herein. For example, the system 3800 may be included, at least in part, in one or more of the computing devices 102, 104, 106, 108 or the server device(s) 140 described herein. The system 3800 may include one or more processors 3810, a memory 3820, one or more storage devices 3830, and one or more input/output (I/O) devices 3850 controllable via one or more I/O interfaces 3840. Two or more of the components 3810, 3820, 3830, 3840, or 3850 may be interconnected via at least one system bus 3860, which may enable the transfer of data between the various modules and components of the system 3800.

The processor(s) 3810 may be configured to process instructions for execution within the system 3800. The processor(s) 3810 may include single-threaded processor(s), multi-threaded processor(s), or both. The processor(s) 3810 may be configured to process instructions stored in the memory 3820 or on the storage device(s) 3830. The processor(s) 3810 may include hardware-based processor(s) each including one or more cores. The processor(s) 3810 may include general purpose processor(s), special purpose processor(s), or both.

The memory 3820 may store information within the system 3800. In some implementations, the memory 3820 includes one or more computer-readable media. The memory 3820 may include any number of volatile memory units, any number of non-volatile memory units, or both volatile and non-volatile memory units. The memory 3820 may include read-only memory, random access memory, or both. In some cases, the memory 3820 may be employed as active or physical memory by one or more executing software modules.

The storage device(s) 3830 may be configured to provide (e.g., persistent) mass storage for the system 3800. In some implementations, the storage device(s) 3830 may include one or more computer-readable media. For example, the storage device(s) 3830 may include a floppy disk device, a hard disk device, an optical disk device, or a tape device. The storage device(s) 3830 may include read-only memory, random access memory, or both. The storage device(s) 3830 may include one or more of an internal hard drive, an external hard drive, or a removable drive. The storage device(s) 3830 may implement the data store(s) 150.

One or both of the memory 3820 or the storage device(s) 3830 may include one or more computer-readable storage media (CRSM). The CRSM may include one or more of an electronic storage medium, a magnetic storage medium, an optical storage medium, a magneto-optical storage medium, a quantum storage medium, a mechanical computer storage medium, and so forth. The CRSM may provide storage of computer-readable instructions describing data structures, processes, applications, programs, other modules, or other data for the operation of the system 3800. In some implementations, the CRSM may include a data store that provides storage of computer-readable instructions or other information in a non-transitory format. The CRSM may be incorporated into the system 3800 or may be external with respect to the system 3800. The CRSM may include read-only memory, random access memory, or both. One or more CRSM suitable for tangibly embodying computer program instructions and data may include any type of non-volatile memory, including but not limited to: semiconductor memory devices, such as EPROM, EEPROM, and flash memory devices; magnetic disks such as internal hard disks and removable disks; magneto-optical disks; and CD-ROM and DVD-ROM disks. In some cases, the processor(s) 3810 and the memory 3820 may be supplemented by, or incorporated into, one or more application-specific integrated circuits (ASICs).

The system 3800 may include one or more I/O devices 3850. The I/O device(s) 3850 may include one or more input devices such as a keyboard, a mouse, a pen, a game controller, a touch input device, an audio input device (e.g., a microphone), a gestural input device, a haptic input device, an image or video capture device (e.g., a camera), or other devices. In some cases, the I/O device(s) 3850 may also include one or more output devices such as a display, LED(s), an audio output device (e.g., a speaker), a printer, a haptic output device, and so forth. The I/O device(s) 3850 may be physically incorporated in one or more computing devices of the system 3800, or may be external with respect to one or more computing devices of the system 3800.

The system 3800 may include one or more I/O interfaces 3840 to enable components or modules of the system 3800 to control, interface with, or otherwise communicate with the I/O device(s) 3850. The I/O interface(s) 3840 may enable information to be transferred in or out of the system 3800, or between components of the system 3800, through serial communication, parallel communication, or other types of communication. For example, the I/O interface(s) 3840 may comply with a version of the RS-232 standard for serial ports, or with a version of the IEEE 1284 standard for parallel ports. As another example, the I/O interface(s) 3840 may be configured to provide a connection over Universal Serial Bus (USB) or Ethernet. In some cases, the I/O interface(s) 3840 may be configured to provide a serial connection that is compliant with a version of the IEEE 1394 standard.

The I/O interface(s) 3840 may also include one or more network interfaces that enable communications between computing devices in the system 3800, or between the system 3800 and other network-connected computing systems. The network interface(s) may include one or more network interface controllers (NICs) or other types of transceiver devices configured to send and receive communications over one or more networks, such as the network(s) 130, using any network protocol.

Computing devices of the system 3800 may communicate with one another, or with other computing devices, using one or more networks such as the network(s) 130. Such networks may include public networks such as the internet, private networks such as an institutional or personal intranet, or any combination of private and public networks. The networks may include any type of wired or wireless network, including but not limited to local area networks (LANs), wide area networks (WANs), wireless WANs (WWANs), wireless LANs (WLANs), mobile communications networks (e.g., 3G, 4G, Edge, etc.), and so forth. In some implementations, the communications between computing devices may be encrypted or otherwise secured. For example, communications may employ one or more public or private cryptographic keys, ciphers, digital certificates, or other credentials supported by a security protocol, such as any version of the Secure Sockets Layer (SSL) or the Transport Layer Security (TLS) protocol.

The system 3800 may include any number of computing devices of any type. The computing device(s) may include, but are not limited to: a personal computer, a smartphone, a tablet computer, a wearable computer, an implanted computer, a mobile gaming device, an electronic book reader, an automotive computer, a desktop computer, a laptop computer, a notebook computer, a game console, a home entertainment device, a network computer, a server computer, a mainframe computer, a distributed computing device (e.g., a cloud computing device), a microcomputer, a system on a chip (SoC), a system in a package (SiP), and so forth. While examples herein may describe the execution of one or more processes as being performed by a mobile application (such as application 2100), a web-based interface or application may alternatively or additionally be used to execute the processes described herein. In addition, although examples herein may describe computing device(s) as physical device(s), implementations are not so limited. In some cases, a computing device may include one or more of a virtual computing environment, a hypervisor, an emulation, or a virtual machine executing on one or more physical computing devices. In some cases, two or more computing devices may include a cluster, cloud, farm, or other grouping of multiple devices that coordinate operations to provide load balancing, failover support, parallel processing capabilities, shared storage resources, shared networking capabilities, or other aspects.

The features described may be implemented in digital electronic circuitry or in computer hardware, software, or any combinations of hardware and software. The features may be implemented in at least one computer program product that is tangibly embodied in an information carrier (e.g., a machine-readable storage device) for execution by a programmable processor. The method or process steps may be performed by a programmable processor executing instructions to perform functions of the described implementations by operating on input data and generating output. The described features may be implemented in one or more computer programs that are executable on a programmable system including at least one programmable processor coupled to receive data and instructions from, and to transmit data and instructions to, a data storage system, at least one input device, and at least one output device. A computer program may include a set of instructions that can be used, directly or indirectly, in a computer to perform a certain activity or bring about a certain result. A computer program may be written in any form of programming language, including compiled or interpreted languages, and it may be deployed in any form, including as a stand-alone program or as a module suitable for use in a computing environment.

The logic flows depicted in the figures do not require the particular order shown, or any particular sequential order, to achieve desirable results. In some implementations, other steps may be provided or steps may be eliminated from the described flows. Moreover, the steps may be performed in parallel or serially with respect to other steps. The systems depicted in the figures do not require the particular components, or the particular arrangement of components, shown in the figures. In some implementations, the various systems may include more or fewer components than shown in the figures, and components may be arranged differently to achieve desirable results. Accordingly, implementations other than those explicitly depicted in the figures or described herein are within the scope of the following claims.

Although the example UIs herein may include various elements in an example arrangement, implementations are not limited to these examples. Any of the UIs described herein, or the various screens thereof, may include any number of elements of any type, in any arrangement. UI elements may include any number of controls such as buttons, radio buttons, sliders, menus, lists, and so forth. UI elements may include any number of dialogs to enable entry of any type of information. A UI may be presented in a single screen, page, or window, or in multiple screens, pages, or windows. A UI may present information visually. A UI may also present information as audio output, haptic output (e.g., via movements of a device), or through other methods.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method comprising:
presenting, on a first computing device associated with a first user, a first user interface comprising a first control for selecting an emergency response policy from a plurality of emergency response policies;
receiving, by a server device, a signal indicating an emergency response policy selected by the first user from the plurality of emergency response policies, the selected emergency response policy being associated with an institution and defining one or more emergency response protocols, each of the one or more emergency response protocols corresponding to a respective type of emergency;
in response to receiving the signal indicating the selected emergency response policy, storing, in a data store, the selected emergency response policy and corresponding software protocols encoding (1) one or more icons corresponding to the one or more emergency response protocols defined by the emergency response policy and (2) a ruleset for initiating each of the one or more emergency response protocols defined by the emergency response policy; and
displaying, on a second computing device associated with a second user associated with the institution, a second user interface depicting the one or more icons corresponding to the one or more emergency response protocols defined by the emergency response policy.

2. The computer-implemented method of claim 1, wherein presenting the first user interface comprising the first control for selecting an emergency response policy from a plurality of emergency response policies comprises:
displaying a list of the plurality of emergency response policies;
receiving, by the first computing device from the first user, a selection of an emergency response policy from the list of the plurality of emergency response policies; and
in response to the selection, displaying, on the first computing device, a preview of a home screen of an emergency response application corresponding to the emergency response policy selected from the list of the plurality of emergency response policies.

3. The computer-implemented method of claim 2, wherein the preview of the home screen of the emergency response application comprises one or more buttons corresponding to one or more emergency types defined by the selected emergency response policy.

4. The computer-implemented method of claim 1, wherein the plurality of emergency response policies comprises one or more predefined emergency response policies, each of the one or more predefined emergency response policies defining one or more emergency response protocols, each of the one or more emergency response protocols corresponding to a respective type of emergency or a respective type of action to be performed.

5. The computer-implemented method of claim 1, further comprising:
receiving, by the first computing device from the first user, a selection of a custom emergency response policy.

6. The computer-implemented method of claim 5, further comprising:
in response to receiving the selection of a custom emergency response policy, presenting, on the first computing device, a third user interface comprising a second control for selecting one or more emergency response types to be added to the custom emergency response policy;
receiving, by the first computing device from the first user, a selection of an emergency response type to be added to the custom emergency response policy; and
updating, on the first computing device, a preview of a home screen of an emergency response application corresponding to the custom emergency response policy to include a button representing the selected emergency response type.

7. The computer-implemented method of claim 6, wherein:
the second control comprises a list of one or more predefined emergency response types; and receiving, by the first computing device from the first user, the selection of the emergency response type to be added to the custom emergency response policy comprises receiving a selection of an emergency response type from the list of one or more predefined emergency response types.

8. The computer-implemented method of claim 6, wherein receiving, by the first computing device from the first user, the selection of the emergency response type to be added to the custom emergency response policy comprises receiving a selection of a custom emergency response type.

9. The computer-implemented method of claim 8, further comprising:
in response to receiving the selection of a custom emergency response type, presenting, on the first computing device, one or more additional controls for defining the custom emergency response type;
receiving, by the first computing device from the first user, data defining the custom emergency response type; and updating, on the first computing device based on the data defining the custom emergency response type, the preview of the home screen of the emergency response application corresponding to the custom emergency response policy to include a button representing the custom emergency response type.

10. The computer-implemented method of claim 9, wherein:
the one or more additional controls for defining the custom emergency response type comprise at least one of a control for selecting a name for the custom emergency response type, a control for selecting a color for a button corresponding to the custom emergency response type, a control for selecting an icon for the button corresponding to the custom emergency response type, or a control for providing a description of the custom emergency response type; and
the data defining the custom emergency response type comprises at least one of the name for the custom emergency response type, the color for the button corresponding to the custom emergency response type, the icon for the button corresponding to the custom emergency response type, or the description of the custom emergency response type.

11. A system comprising one or more computers and a memory storing computer program instructions that when executed by the one or more computers causes the one or more computers to perform operations comprising:
presenting, on a first computing device associated with a first user, a first user interface comprising a first control for selecting an emergency response policy from a plurality of emergency response policies;
receiving, by a server device, a signal indicating an emergency response policy selected by the first user from the plurality of emergency response policies, the selected emergency response policy being associated with an institution and defining one or more emergency response protocols, each of the one or more emergency response protocols corresponding to a respective type of emergency;
in response to receiving the signal indicating the selected emergency response policy, storing, in a data store, the selected emergency response policy and corresponding software protocols encoding (1) one or more icons corresponding to the one or more emergency response protocols defined by the emergency response policy and (2) a ruleset for initiating each of the one or more emergency response protocols defined by the emergency response policy; and displaying, on a second computing device associated with a second user associated with the institution, a second user interface depicting the one or more icons corresponding to the one or more emergency response protocols defined by the emergency response policy.

12. The system of claim 11, wherein presenting the first user interface comprising the first control for selecting an emergency response policy from a plurality of emergency response policies comprises:
displaying a list of the plurality of emergency response policies;
receiving, by the first computing device from the first user, a selection of an emergency response policy from the list of the plurality of emergency response policies; and
in response to the selection, displaying, on the first computing device, a preview of a home screen of an emergency response application corresponding to the emergency response policy selected from the list of the plurality of emergency response policies.

13. The system of claim 12, wherein the preview of the home screen of the emergency response application comprises one or more buttons corresponding to one or more emergency types defined by the selected emergency response policy.

14. The system of claim 11, wherein the operations further comprise:
receiving, by the first computing device from the first user, a selection of a custom emergency response policy.

15. The system of claim 14, wherein the operations further comprise:
in response to receiving the selection of a custom emergency response policy, presenting, on the first computing device, a third user interface comprising a second control for selecting one or more emergency response types to be added to the custom emergency response policy;
receiving, by the first computing device from the first user, a selection of an emergency response type to be added to the custom emergency response policy; and
updating, on the first computing device, a preview of a home screen of an emergency response application corresponding to the custom emergency response policy to include a button representing the selected emergency response type.

16. The system of claim 15, wherein:
the second control comprises a list of one or more predefined emergency response types; and
receiving, by the first computing device from the first user, the selection of the emergency response type to be added to the custom emergency response policy comprises receiving a selection of an emergency response type from the list of one or more predefined emergency response types.

17. The system of claim 15, wherein receiving, by the first computing device from the first user, the selection of the emergency response type to be added to the custom emergency response policy comprises receiving a selection of a custom emergency response type.

18. The system of claim 17, wherein the operations further comprise:
in response to receiving the selection of a custom emergency response type, presenting, on the first computing device, one or more additional controls for defining the custom emergency response type;
receiving, by the first computing device from the first user, data defining the custom emergency response type; and
updating, on the first computing device based on the data defining the custom emergency response type, the preview of the home screen of the emergency response application corresponding to the custom emergency response policy to include a button representing the custom emergency response type.

19. A non-transitory computer-readable storage medium comprising instructions that when executed cause a system of one or more computers to perform operations comprising:
presenting, on a first computing device associated with a first user, a first user interface comprising a first control for selecting an emergency response policy from a plurality of emergency response policies;
receiving, by a server device, a signal indicating an emergency response policy selected by the first user from the plurality of emergency response policies, the selected emergency response policy being associated with an institution and defining one or more emergency response protocols, each of the one or more emergency response protocols corresponding to a respective type of emergency;

in response to receiving the signal indicating the selected emergency response policy, storing, in a data store, the selected emergency response policy and corresponding software protocols encoding (1) one or more icons corresponding to the one or more emergency response protocols defined by the emergency response policy and (2) a ruleset for initiating each of the one or more emergency response protocols defined by the emergency response policy; and displaying, on a second computing device associated with a second user associated with the institution, a second user interface depicting the one or more icons corresponding to the one or more emergency response protocols defined by the emergency response policy.

20. The computer-implemented method of claim 1, further comprising:

receiving, by the second computing device from the second user, a selection of one of the one or more icons;

transmitting, from the second computing device to the server device, a signal indicating a request to initiate an emergency response corresponding to the selected icon; and executing, by the server device, a software protocol associated with the emergency response corresponding to the selected icon.

* * * * *